United States Patent [19]
Hanson

[11] Patent Number: 5,872,354
[45] Date of Patent: Feb. 16, 1999

[54] HAND-HELD DATA CAPTURE SYSTEM WITH INTERCHANGABLE MODULES INCLUDING AUTOFOCUSING DATA FILE READER USING THE SLOPE OF THE IMAGE SIGNAL TO DETERMINE FOCUS

[75] Inventor: George E. Hanson, Cedar Rapids, Iowa

[73] Assignee: Norand Corporation, Cedar Rapids, Iowa

[21] Appl. No.: 343,272

[22] Filed: Nov. 22, 1994

Related U.S. Application Data

[63] Continuation-in-part of Ser. No. 960,520, Oct. 13, 1992, abandoned, which is a continuation-in-part of Ser. No. 912,917, Jul. 13, 1992, abandoned, which is a continuation-in-part of Ser. No. 881,096, May 11, 1992, abandoned, which is a continuation-in-part of Ser. No. 786,802, Nov. 5, 1991, abandoned, which is a continuation-in-part of Ser. No. 305,302, Jan. 31, 1989, abandoned, Ser. No. 345,200, Apr. 28, 1989, abandoned, Ser. No. 347,602, May 3, 1989, abandoned, Ser. No. 347,849, May 3, 1989, abandoned, Ser. No. 426,135, Oct. 24, 1989, Pat. No. 5,218,188, Ser. No. 558,895, Jul. 25, 1990, abandoned, Ser. No. 561,994, Jul. 31, 1990, abandoned, Ser. No. 633,500, Dec. 26, 1990, Pat. No. 5,202,817, Ser. No. 660,615, Feb. 25, 1991, Pat. No. 5,218,817, Ser. No. 674,756, Mar. 25, 1991, abandoned, Ser. No. 719,731, Jun. 24, 1991, abandoned, Ser. No. 777,691, Oct. 10, 1991, abandoned, and Ser. No. 3,282, Jun. 19, 1990, abandoned, said Ser. No. 347,602, is a continuation-in-part of Ser. No. 346,771, May 2, 1989, abandoned, said Ser. No. 633,500, is a continuation-in-part of Ser. No. 626,711, Dec. 12, 1990, abandoned, said Ser. No. 347,849, is a continuation-in-part of Ser. No. 347,298, May 2, 1989, abandoned.

[51] Int. Cl.⁶ .................................................. C06K 7/10
[52] U.S. Cl. ............................................ 235/462; 235/472
[58] Field of Search .................................... 235/462, 472

[56] References Cited

U.S. PATENT DOCUMENTS

| | | | |
|---|---|---|---|
| 3,751,636 | 8/1973 | Coles | 235/462 |
| 3,892,950 | 7/1975 | Dodson, III | 235/462 |
| 4,136,821 | 1/1979 | Sugiura et al. | 235/462 |
| 4,845,350 | 7/1989 | Shepard et al. | 235/472 |
| 4,874,933 | 10/1989 | Sanner | 235/470 |
| 4,877,949 | 10/1989 | Danielson et al. | 235/472 |
| 5,010,241 | 4/1991 | Butterworth | 235/462 |
| 5,192,856 | 3/1993 | Schaham | 235/462 |
| 5,294,783 | 3/1994 | Hammond, Jr. et al. | 235/462 |

FOREIGN PATENT DOCUMENTS

| | | | |
|---|---|---|---|
| 91791 | 4/1988 | Japan | 235/462 |

*Primary Examiner*—John Shepperd
*Attorney, Agent, or Firm*—Suiter & Associates

[57] ABSTRACT

The present invention provides a novel hand-held data capture system with interchangeable modules including an autofocusing data file image reader. Several exemplary modules having various features are described. For example the invention teaches an apparatus and method for providing an interchangeable RF module, an interchangeable reflected image reader, two exemplary interchangeable non-scanning laser illuminated bar code reader/RF modules, and three exemplary interchangeable long range CCD reader/RF modules. Also disclosed for the described modular system are noise filtering means, a solid state laser illumination system, signal processing means, and filter, exposure control, and depth of field control means. An exemplary autofocusing system adjusts the lens to a position where the intensity change with respect to time or with respect to position is maximized. A novel focusing system employs several signal processing algorithms, including a method whereby the maximum slope of the intensity of the image signal with respect to time or with respect to position is determined. Mathematical operations may be performed by a high performance digital signal coprocessor.

33 Claims, 36 Drawing Sheets

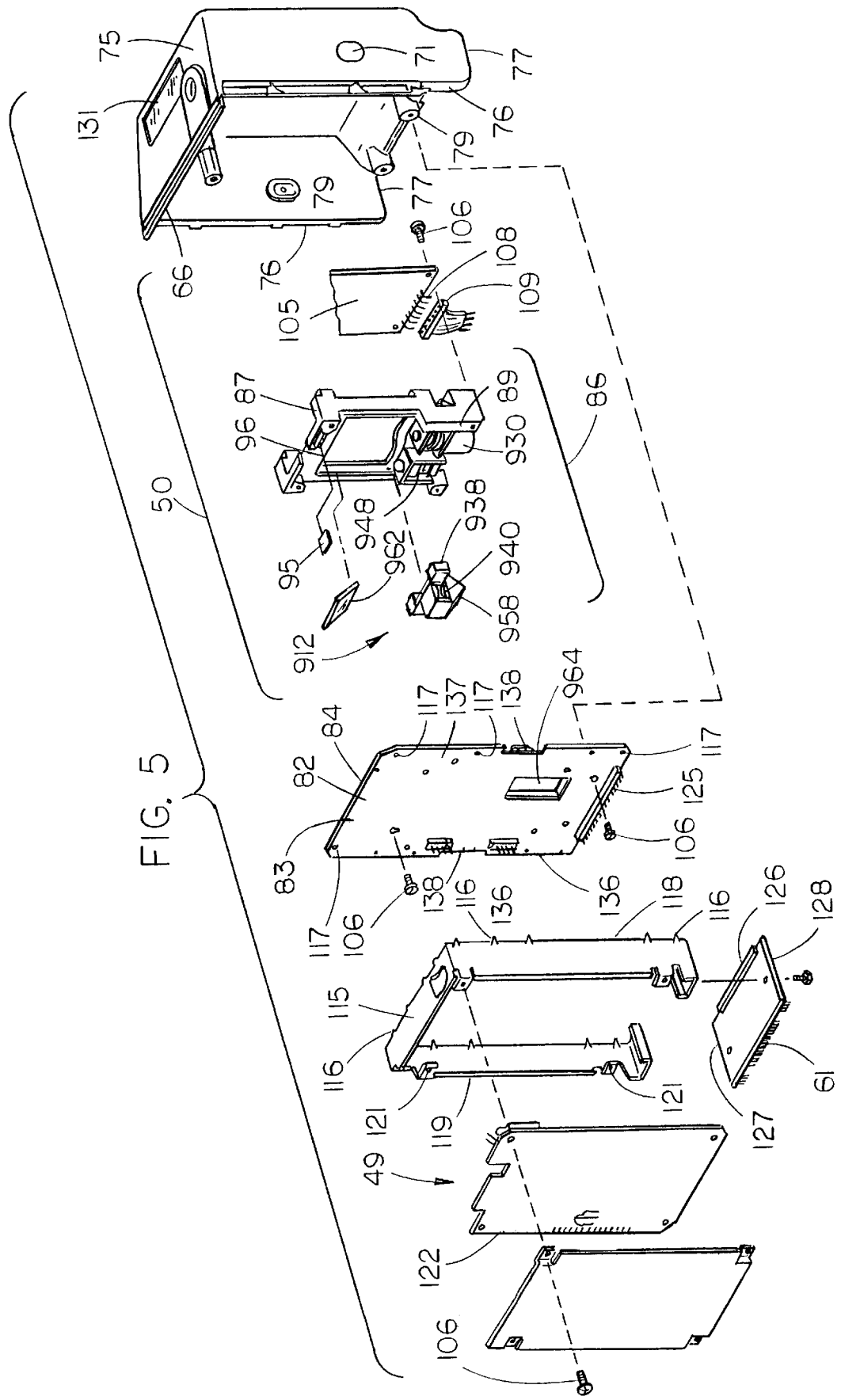

| 1-2 PHASE EXCITATION |||||||||
|---|---|---|---|---|---|---|---|---|
| STEP | 1 | 2 | 3 | 4 | 5 | 6 | 7 | 8 |
| Ø1 | ON | ON | OFF | OFF | OFF | OFF | OFF | ON |
| Ø2 | OFF | ON | ON | ON | OFF | OFF | OFF | OFF |
| Ø3 | OFF | OFF | OFF | ON | ON | ON | OFF | OFF |
| Ø4 | OFF | OFF | OFF | OFF | OFF | ON | ON | ON |

FIG. 15

| 2 PHASE EXCITATION ||||| 
|---|---|---|---|---|
| STEP | 1 | 2 | 3 | 4 |
| Ø1 | ON | OFF | OFF | ON |
| Ø2 | ON | ON | OFF | OFF |
| Ø3 | OFF | ON | ON | OFF |
| Ø4 | OFF | OFF | ON | ON |

FIG. 16

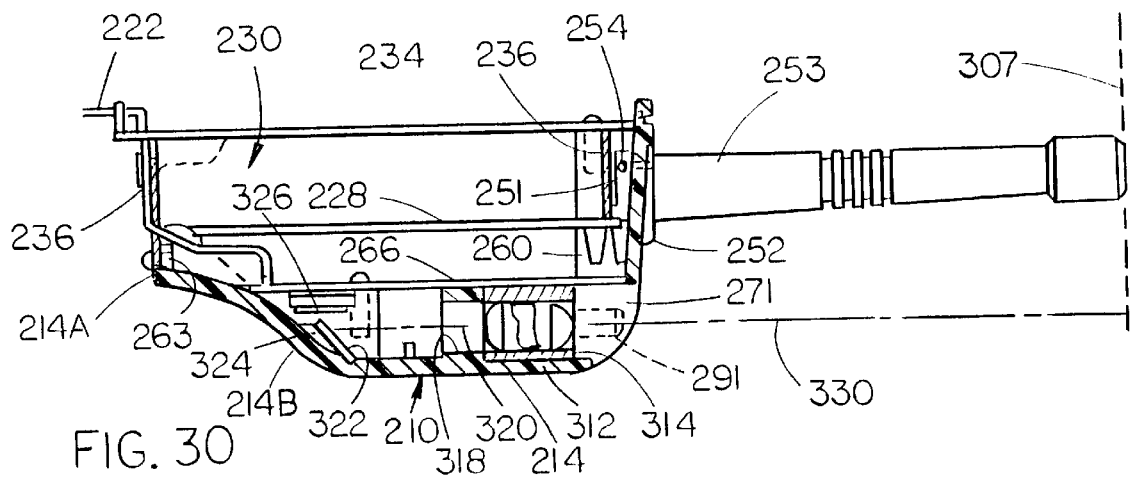
FIG. 30
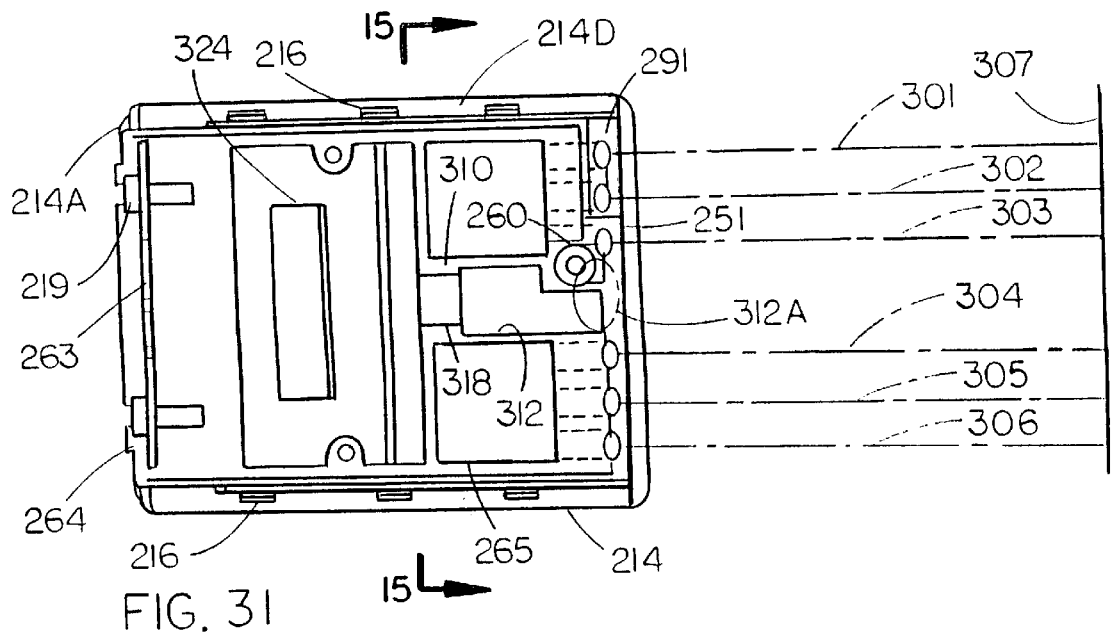
FIG. 31
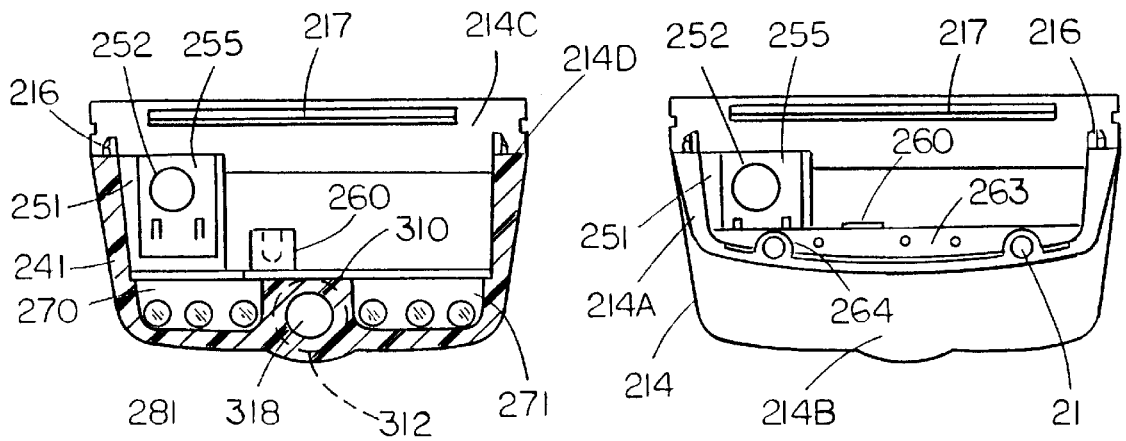
FIG. 32
FIG. 33

HAND-HELD DATA CAPTURE SYSTEM WITH INTERCHANGABLE MODULES INCLUDING AUTOFOCUSING DATA FILE READER USING THE SLOPE OF THE IMAGE SIGNAL TO DETERMINE FOCUS

CROSS REFERENCE TO RELATED APPLICATIONS

I. CLAIM FOR PRIORITY

The present application U.S. Ser. No. 08/343,272 is a continuation-in-part of U.S. Ser. No. 07/960,520 filed Oct. 13, 1992 (abandoned) which in turn is a continuation-in-part of U.S. Ser. No. 07/912,917 filed Jul. 13, 1992 (abandoned) which in turn is a continuation-in-part of U.S. Ser. No. 07/881,096 filed May 11, 1992 (abandoned) which in turn is a continuation-in-part of U.S. Ser. No. 07/786,802 filed Nov. 5, 1991 (abandoned).

Said application U.S. Ser. No. 07/786,802 is in turn a continuation-in-part of U.S. Ser. No. 07/305,302 filed Jan. 31, 1989 (abandoned); a continuation-in-part of U.S. Ser. No. 07/345,200 filed Apr. 28, 1989 (abandoned); a continuation-in-part of U.S. Ser. No. 07/347,602 filed May 3, 1989 (abandoned); a continuation-in-part of U.S. Ser. No. 07/347,849 filed May 3, 1989 (abandoned); a continuation-in-part of U.S. Ser. No. 07/426,135 filed Oct. 24, 1989 (now U.S. Pat. No. 5,218,188); a continuation-in-part of U.S. Ser. No. 07/558,895 filed Jul. 25, 1990 (abandoned); a continuation-in-part of U.S. Ser. No. 07/561,994 filed Jul. 31, 1990 (abandoned); a continuation-in-part of U.S. Ser. No. 07/633,500 filed Dec. 26, 1990 (now U.S. Pat. No. 5,202,817); a continuation-in-part of U.S. Ser. No. 07/660,615 filed Feb. 25, 1991 (now U.S. Pat. No. 5,218,187); a continuation-in-part of U.S. Ser. No. 07/674,756 filed Mar. 25, 1991 (abandoned); a continuation-in-part of U.S. Ser. No. 07/719,731 filed Jun. 24, 1991 (abandoned); a continuation-in-part of U.S. Ser. No. 07/777,691 filed Oct. 10, 1991 (abandoned); and a continuation-in-part of U.S. Ser. No. 07/003,282 filed Jun. 7, 1990 (abandoned).

Said application U.S. Ser. No. 07/347,602 is a continuation-in-part of U.S. Ser. No. 07/346,771 filed May 2, 1989 (abandoned). Said application U.S. Ser. No. 07/633,500 is a continuation-in-part of U.S. Ser. No. 07/626,711 filed Dec. 12, 1990 (abandoned). Said application U.S. Ser. No. 07/347,849 is a continuation-in-part of U.S. Ser. No. 07/347,298 filed May 2, 1989 (abandoned).

II. Related Applications

U.S. Ser. No. 08/250,316 filed May 27, 1994 (abandoned) is a continuation of said U.S. Ser. No. 07/786,802.

U.S. Ser. No. 07/820,070 filed Jan. 10, 1992 (abandoned) is a continuation-in-part of U.S. Ser. No. 07/305,302 filed Jan. 31, 1989 (abandoned).

U.S. Ser. No. 08/024,892 filed Mar. 3, 1993 (now U.S. Pat. No. 5,289,378) is a continuation of U.S. Ser. No. 07/305,302 filed Jan. 31, 1989 (abandoned).

U.S. Ser. No. 08/024,892 filed Mar. 3, 1993 (now U.S. Pat. No. 5,289,378) is a continuation of U.S. Ser. No. 07/305,302 filed Jan. 31, 1989 (abandoned).

U.S. Ser. No. 08/050,704 filed Apr. 21, 1993 (abandoned) is a continuation U.S. Ser. No. 07/909,139 filed Jul. 6, 1992 (abandoned) which is a continuation of U.S. Ser. No. 07/345,200 filed Apr. 28, 1989 (abandoned).

U.S. Ser. No. 07/784,748 filed Oct. 28, 1991 (now U.S. Pat. No. 5,195,183) is a continuation of U.S. Ser. No. 07/347,602 filed May 3, 1989 (abandoned).

U.S. Ser. No. 07/987,574 filed Dec. 8, 1992 (now U.S. Pat. No. 5,313,053) is a continuation of U.S. Ser. No. 07/674,756 filed Mar. 25, 1991 (abandoned). U.S. Ser. No. 07/965,983 filed Oct. 23, 1992 (abandoned) was continued as U.S. Ser. No. 07/719,731 filed Jun. 24, 1991 (abandoned).

Authorization Pursuant To 37 CFR 1.71(d) and (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to hand-held data capture systems and more particularly to a hand-held data capture system having interchangeable data capture modules.

BACKGROUND ART

In the data capture field, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the fields of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals, e.g., the loading of scheduling information or the like into the terminal at the beginning of a working shift. Further, where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data capture system with docking apparatus adaptable to a wide range of terminal means, and which furthermore could be quickly and simply loaded in a relatively foolproof manner, and without requiring attention and care from operators engaged in physically demanding and arduous work routines. A docking apparatus would be desirable that completely avoids the use of mating pin and socket type electrical connections, and that does not rely on a specialized configuration of the terminal, e.g., the provision of an optical scanner tip which may be used for data communication. However, pin and socket type connectors may be utilized.

In connection with the use of portable data systems it is conceived that it would be highly advantageous to be able to readily upgrade a basic hand-held terminal to incorporate bar code scan type readers and various image readers as they are progressively improved and developed. A particular goal would be the implementation of the auxiliary image reader function in a rugged configuration free of moving parts. However, in the case of autofocus readers, the current state of the art may require dynamic components for the sake of optimum compactness and economy.

Optical data file readers taught by the prior art often employed analog circuitry and analog signal processing to accomplish digitization of data file images. For example, Dodson, III, U.S. Pat. No. 3,892,950, discloses a circuit for detecting transitions in an alternating signal representing binary information. Dodson's invention is essentially a 1-bit A/D (analog-to-digital) convertor having two output states, a high or low binary output voltage. Dodson's invention uses entirely analog circuitry to calculate the mean value of the input data file signal by analog summation of the input signal and a delayed version of the input signal. The output of the analog summing circuitry is then divided by two using analog circuitry to arrive at the mean value of the input signal, which was used as a digitization threshold. A comparator circuit detected when the delayed signal crossed the threshold value and delivered the digital output signal: either a high voltage or a low voltage.

Other prior art optical data file readers also employed analog circuitry and analog signal processing to accomplish digitization of the data file signal along the same lines as the Dodson invention. In one such invention, Coles, Jr., U.S. Pat. No. 3,751,636, operated on the same principal as Dodson, except it used analog circuitry to find the peak value of the input signal, which was divided by two to arrive at the digitization threshold. As was the case with Dodson, Coles invention is essentially a 1-bit A/D converter wherein all of the mathematical computations are preformed entirely in the analog signal processing domain.

State of the art signal processing employs digital signal processing rather than analog signal processing. A discussion of the advantages of digital signal processing over analog signal processing is given in *Digital Signal Processing*, by John G. Proakis and Dimitris G. Manolakis, 1988.

There are many reasons why digital signal processing may be preferable to processing the signal directly in the analog domain . . . A digital programmable system allows flexibility in reconfiguring the digital signal processing operations simply by changing the program. Reconfiguration of an analog system usually implies a redesign of the hardware, testing, and verification that it operates properly [e.g. changing form a Coles type implementation to a Dodson type implementation]. . . Digital signal processing provides better control of accuracy requirements. Tolerances in analog circuit components make it extremely difficult for the system designer to control the accuracy of an analog signal processing system. On the other hand, a digital system provides much better control of accuracy requirements (p.5).

The digital signal processing method allows for the implementation of more sophisticated signal processing algorithms. It is usually difficult to perform precise mathematical operations on signals in analog form.

However, these operations can be routinely implemented on a digital computer [or data terminal] by means of software (p.5).

Digital signal processing provides an alternative method for processing the analog signal . . . In order to perform the processing digitally, there is a need for an interface between the analog signal and the digital processor. This interface is called an analog-to-digital (A/D) convertor. The output of the A/D converter is a digital signal that is appropriate as an input to the digital processor (p.4)

As stated in *The Electrical Engineering Handbook*, "the major factors that determine performance of D/A and A/D convertors are resolution, sampling rate, speed, and linearity." (Richard C. Dorf, *The Electrical Engineering Handbook*, p.771, 1991). Further, "in an A/D system, the resolution is the smallest change in voltage that can be detected by the system and that can produce a change in the digital code. The resolution determines the number of digital codes, or quantization levels, that will be recognized or produced by the circuit." (id., pp.771–772).

Typical digital signal processing systems employ 8-bit A/D convertors. Using an 8-bit AND convertor yields $2^8=256$ levels of amplitude quantization. Additionally, the bandwidth, or sampling rate, of the signal processors determines the number of samples of a signal that may be taken per unit time. An effective sampling rate of 5 MHz would result in 200 ns between samples. Thus an analog input signal may be converted to a discrete-time 8-bit digital signal having 256 levels of amplitude quantization wherein one sample of the input signal is taken every 200 ns.

A high performance digital signal processor (DSP) such as a Texas Instruments TMS320C51 is capable of performing mathematical computations too complex to implement with analog circuitry at high operational bandwidths. Numerous mathematical algorithms may be implemented using a DSP, and if necessary the algorithms may easily be changed by merely changing the software. The DSP implemented mathematical algorithms may be computationally more complex, more accurate, and hence more reliable than analog implemented algorithms by several orders of magnitude Thus a basic hand-held data terminal may employ a multitude of interchangeable modules each performing a unique data capturing function. Using digital signal processing technology allows for flexibility and ease of adaptation of the data terminal to an intended use in combination with a particular module. The applications of each module may include intensive digital signal processing in conjunction with a powerful digital signal coprocessor. For example a hand-held data terminal may include a bar code type optical image reader employing digital signal processing techniques to attain such functions as autofocusing by using complex mathematical algorithms.

DISCLOSURE OF THE INVENTION

The present invention discloses a novel hand-held data collection system adapted to administer the various features of interchange data collection modules. Each interchangeable module is adapted to provide differing data collection features.

Accordingly, it is an important object of the present invention to provide a portable data system wherein technologically advanced image reader devices can be readily accommodated.

In a presently preferred configuration particularly suited for forklift truck applications and the like, a portable data terminal with a rugged surface contact configuration accommodates supply of power by the vehicle when the terminal is placed in a vehicle mount; further, the terminal batteries may receive charge while the terminal is operating from the vehicle power so that full battery capacity is available when portable operation is required. However, other contact means might also be utilized.

In accordance with a further development of the invention, portable terminals, for example, may be quickly removed from the charging system by grasping of the terminal itself followed by a simple lifting extraction.

In accordance with an important aspect of the present invention, a docking apparatus removably receives portable data terminal and code reader means for purposes of data communication, e.g., with a host computer and/or for the recharging of rechargeable batteries. In one potential embodiment the terminal and reader means may have electrical contact pad means generally flush on their exterior. In such an embodiment, an abutting type engagement between the contact pad means and cooperating electrical contact means of the docking apparatus may be used for transmitting charging current such that the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring interfitting of pin and socket connectors; another type of hand-held terminal designed for route accounting applications may have, e.g., twelve external contact pads and be intended for interfacing only with systems having provision for open abutment type interconnection.

The terminal and/or reader receptacle means is preferably arranged so that with the terminal or reader secured therein, each line of the display remains visually observable in a convenient orientation relative to a driver of a vehicle. Also all of the key positions of the keyboard are manually accessible, the legends on the keyboard having an orientation so as to be conveniently readable, e.g., by the driver of the vehicle. In particular the axis of each line of the display and of each row of key positions should be generally horizontal (rather than vertical) and the alphanumeric characters of the display and keyboard legends should be upright (rather than inverted) as viewed by the operator.

Also most preferably the terminal or reader can be inserted into the receptacle with one hand and is securely retained. Ideally the terminal or reader is automatically secured with a snap type action which is perceptible, e.g., audibly and tactually to the operator.

In some instances a resilient bias may serve to firmly position the terminal or reader for steady reliable electrical contact at each abutting type contact position in spite of vehicle jarring and vibration or the like. For enhanced security of retention with the docking apparatus, e.g. in mobile applications, the terminal or reader may be automatically affirmatively retained in its receptacle, e.g., by means of a detent type action.

One exemplary embodiment of data capture terminal unit is provided with a plurality of electrically conductive pads generally coplanar with the external surface of the housing. Such electrically conductive pads may be interconnected by internal circuitry to the connector elements of a D-style connector mounted upon the housing end cap such that recharge power and data communication pathways may be made through either or both of the connector means. The electrically conductive pads are positioned such that they may be engaged with mating elements having sufficient resilience to maintain stable electrical contact therebetween while the terminal is in a docking receptacle or the like.

According to another aspect of the invention, a laser light source may provide simultaneous illumination of a complete image line or a complete image column, or a substantial linear segment thereof, facilitating the achievement of a rugged image reader unit preferably without moving parts in the illumination system. In a further development a long range CCD image reader having auto-focus capabilities may be utilized with a fan beam for simultaneously illuminating a complete image line over a substantial range of distances.

INCORPORATION BY REFERENCE

The descriptive matter of PCT International application PCT/US90/03282, filed Jun. 7, 1990, as published under International Publication N°. WO 90/16033 on Dec. 27, 1990, including forty-six pages of specification and nineteen sheets of drawings including FIGS. 1 through 37 is hereby incorporated by reference.

FEATURES OF THE INCORPORATED PUBLISHED APPLICATION

The PCT International Publication N°. WO 90/16033, which is incorporated herein by reference, in its entirety, refers to a modular hand-held data collection unit and discloses a manner of attaching one functional module to another. The use of functional modules increases the scope of use of the basic data collection terminals by allowing the substitution of a most desirable feature in a particular application for another feature which may have become redundant. The eliminated feature may be that feature least likely to be used in conjunction with the newly added feature. Without increase in size and weight of one type data collection terminal over another, respective functions may be adapted to specific situations. In certain applications, however, selected modules desirably include added features. The addition of such features in accordance with the invention is advantageously accomplished with a minimal size and weight change.

Hence, as contemplated, an image scanner utilizing an image sensor array may be incorporated in a module for a data collection terminal unit which may also include a radio frequency transceiver. In accordance with particular features of the invention, a radio transceiver and an automatic bar code reader with image sensor array and are integrated into a single module.

Various other features and advantages of the data terminal in accordance with the invention will become apparent from the following detailed description, which may be best understood when read with reference to the appended drawings.

BRIEF DESCRIPTION OF THE DRAWINGS

FIG. 5 is an exploded view of the data collection and communications module of FIG. 4;

FIG. 15 is a table illustrating the 1–2 phase excitation mode of the exemplary motor;

FIG. 16 is a table illustrating the 2 phase excitation mode of an exemplary motor;

FIG. 30 is a side sectional view of a data terminal module of the present invention utilizing a fourth CCD reader;

FIG. 31 is the top sectional view of the data terminal module of FIG. 30;

FIG. 32 is an end sectional view along line 32—32 of FIG. 31;

FIG. 33 is an end elevational view of the data terminal module of FIG. 30;

FIGS. 45A and 45B are graphical representations of the prophetic signal level of an analog-to-digital converter electrically coupled to a CCD type image sensor wherein FIG. 45A represents pure data and FIG. 45B represents linearly skewed data;

FIGS. 46A and 46B are graphical representations of the prophetic signal level of an analog-to-digital converter electrically coupled to a CCD type image sensor wherein FIG. 46A represents pure data and FIG. 46B represents corrupted data due to a periodic illumination intensity variation;

BEST MODE FOR CARRYING OUT THE INVENTION

Figure 1:
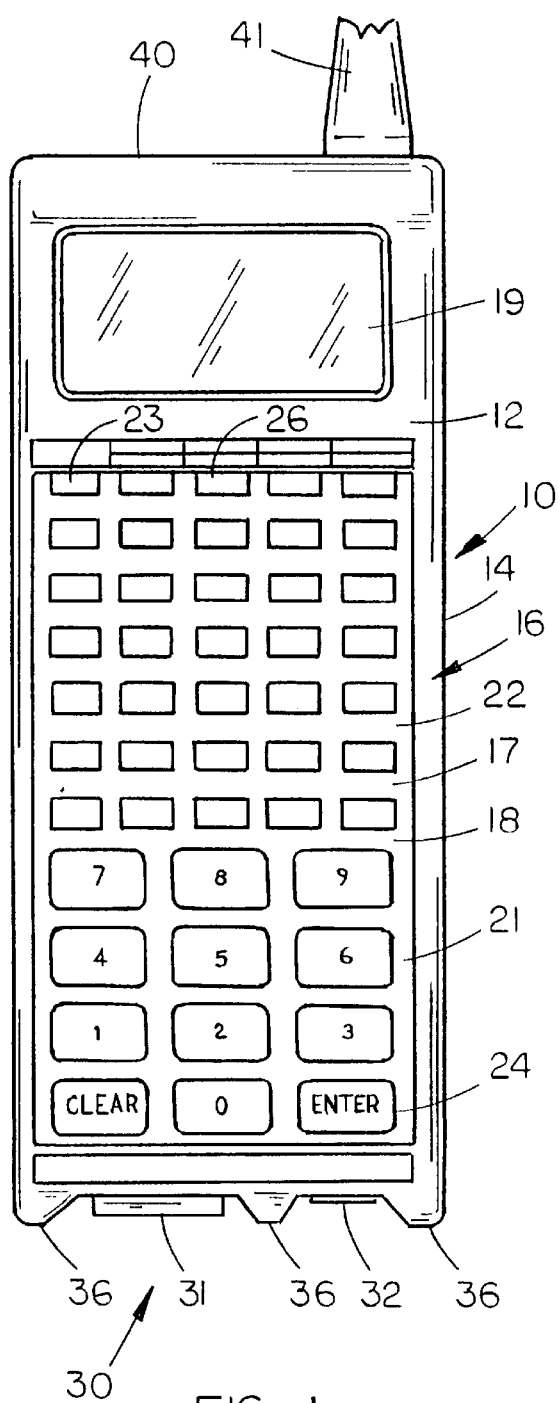
FIG. 1 is a frontal view of a modular data terminal.
Figure 2:
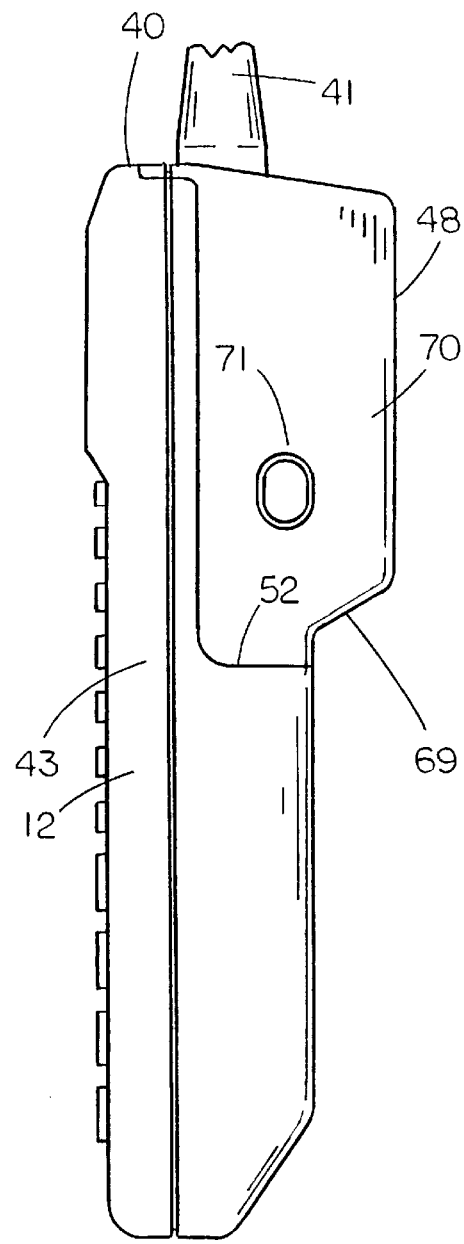
FIG. 2 is a side view of the data terminal shown in FIG. 1 illustrating a module accommodating both an RF transceiver and a bar-code reader utilizing an image sensor array.

Referring now to FIGS. 1 and 2, a data collection terminal unit, also referred to herein as a data terminal, is designated generally by the numeral 10. As shown in FIG. 1, a frontal face 12 of an elongate housing 14 of a base module 16 of the data terminal 10 typically faces upward and is accessible to the user of the data terminal. The upward facing portion of the module 16 houses a user interface module 17, including an alphanumerical keyboard 18 and a display screen 19. The display screen 19 is in a preferred embodiment described herein a 4-line by 16-character Reflective Super Twist Liquid Crystal Display (LCD). Of course, other display means may be used in its stead. The keyboard 18 includes a lower, standard numerical keyboard section 21, above which is disposed an alphabetical keyboard arrangement 22. An On-Off power key 23 is preferably placed in a left most position of an uppermost row of five keys. The outermost keys 24 in a bottom row are configured as "CLEAR" and "ENTER", while the remaining four keys in the uppermost row are preferably configured as a set of four user-defined function keys 26.

At a bottom end 30 of the housing 14, there are located two connector plugs 31 and 32. The connectors 31 and 32 are protected by adjacent and interleaved protrusions 36 of the housing 14, which protrusions extend somewhat below the connectors. An exemplary embodiment of the data terminal 10 is intended to withstand a drop of about 1.2 meters to a solid surface. The exemplary connector 31 is an input-output port, as may be used for such data collection as bar code reading, for example. In such instances, the connector 31 is preferred to be a 9-pin D-subminiature connector with pins interfacing to typical 5 volt scanning peripherals. The connector 32 or substituted surface contacts may be used for accessing external power sources or provide for combined power and data communication. A circular miniature DIN-type connector 32 may be used in the exemplary embodiment. A top end 40 of the preferred embodiment of the base module 16 typically will not include connectors. An antenna 41 shown to extend above the top end 40 is further described in reference to FIG. 2. The described frontal, substantially rectangular configuration of the data collection terminal 10 has a length of approximately 17.78 cm and a width of approximately 6.98 cm. The size is such that it is convenient to hold the terminal in one's hand, and, as will be understood from the description of FIG. 2, the thickness or depth of the data terminal 10 permits the terminal 10 to be carried about in a user's pocket.

FIG. 2 shows depth or thickness features of the data terminal 10. The base module 16 of the data terminal 10 with the described frontal face 12 includes an elongate upper housing portion 43 which defines the longitudinal and lateral extent of the data terminal 10. Attached to the upper housing portion 43 and disposed adjacent the bottom end 30 is a lower battery compartment 44. In such an embodiment, the battery compartment 44 is assembled as a lower housing portion to the upper housing portion 43. Adjacent the top end 40 of the data terminal 10 a data collection and communications module 48 is attached to the lower edge of the upper housing portion 43. The antenna 41, as is typical for external antennas, extends upward from the data collection and communications module 48 above the top end 40 of the data terminal 10.

One of the features of hand-held data terminals related to this invention and as disclosed in the PCT application PCT/US90/03282, incorporated herein by reference, relates to the exchangeability of modules of different shape and varied function. It is of course desirable to have the various modules, though of different shape, substantially of the same size. In this manner, the feel and handling of the family of data terminals 10 remain substantially identical.

The data collection and communications module 48 in FIG. 2 includes a radio transceiver 49 (FIG. 5) and a long range CCD reader apparatus 50 (FIG. 5). As to both modules 48 and 51 (FIGS. 3 and 4), the presence of the radio transceiver 49 is of course indicated by the external antenna designated by reference numeral 41 in FIG. 2. The radio subassembly may be a commercially available pretuned 1-watt (UHF) frequency modulated (FM) radio transceiver, or any similar type, such as a Motorola P10 radio model. Further modules may incorporate other types of transceivers, including technologically improved units and the like.

Figure 3:
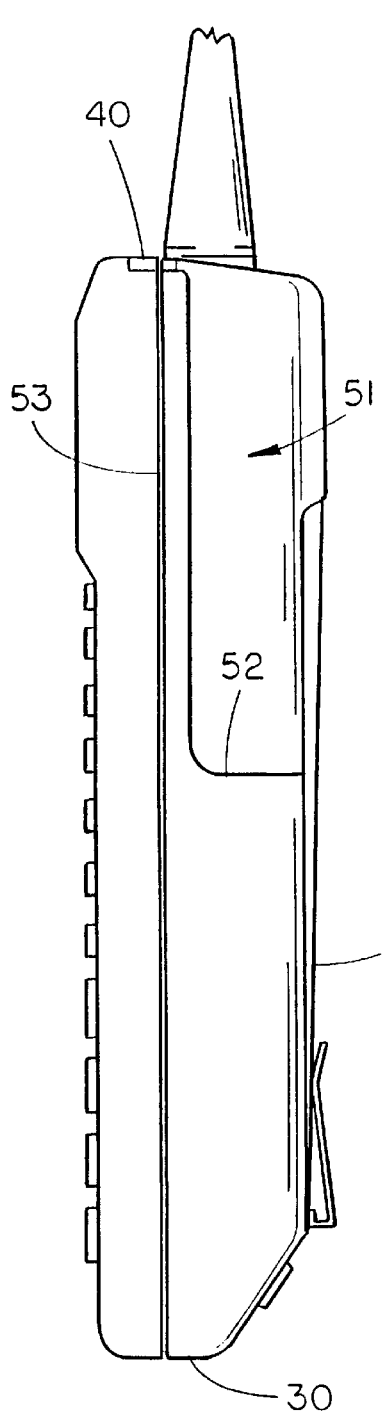
FIG. 3 is a side view of a related data collection terminal having a communications module without a bar code reader.
Figure 4:
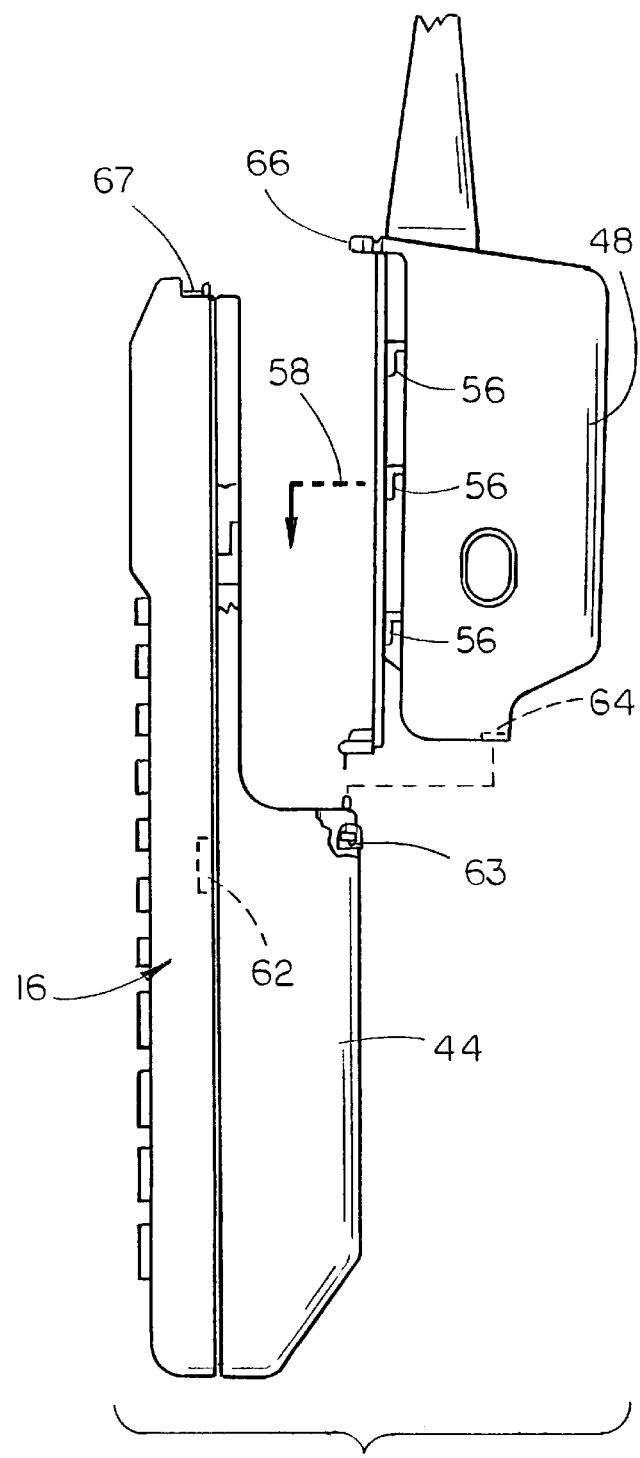
FIG. 4 is a side view of the data terminal shown in FIG. 2 in preparation for assembly.

In accordance herewith it is contemplated to provide the data collection and communications module 48 as a module which is capable of readily replacing another module, such as a radio communications module 51 which is shown in FIG. 3, for example, and which does not include an image reader. Each of these interchangeable modules feature a quick exchange mounting mechanism, such as is more clearly illustrated with respect to FIG. 4. As shown in FIG. 4, the data collection and communications module 48 is matched in a contour continuation along a juncture line 52 to the adjacent edge of the battery compartment 44 and along a longitudinal parting line 53 of the base module 16. The juncture line 52 defines a cavity within the base module 16 within which modules such as the module 48 may be received. The module 48 features a plurality of laterally disposed latch hooks 56 which become engaged by respective latch seats 57 disposed along the adjacent edge of the base module 16 when the module 48 is moved toward and into engagement with the adjacent edge and then toward the battery compartment 44, as shown by dash line 58. Electrical communication is established via a power and communications connector 61 the pins of which engage a mating connector socket 62 within the base module 16. A set of screws 63 may be tightened through the battery compartment 44 into a set of threaded seats 64 disposed in the adjacent wall of the module 48 to securely retain the attached module as an integrated part of the data terminal 10. At the top end of the data terminal 10, a lip or extending stop edge 66 of the module 48 engages a complementary shaped seat 67 to securely interlock the data collection and communications module 48 with the base module 16.

FIGS. 3 and 4 depict a comparison of relative depths or thicknesses between the data collection and communications module 48 and the radio communications module 51. The radio communications module 51 is also shown equipped with a preferred hand strap 68 attached longitudinally to the rear of the data terminal 10. Though not presently contemplated for use on the data terminal 10 featuring the data collection and communications module 48, it is clearly possible to use the hand strap 68 on the data terminal 10 having the module 48. As seen in FIG. 3, the radio communications module 51 fits generally with its thickness into the contour of the housing of the data terminal 10. The additional long range CCD reader apparatus 50 will utilize an increased thickness or depth in the general contour of the housing 14. However, in accordance herewith, an increase in the thickness of the terminal has been minimized, as will become apparent from further description of the improved arrangement of the long range CCD reader apparatus 50, but the increase in the depth has been employed to provide for ease of manually holding the data terminal 10 during use even in the absence of strap 68. Either of the modules 48 or 51 blends with the lateral contour of the base module 16. FIG. 2 shows a thickness of the data terminal 10 at its bottom end of only about 3.81 cm while the thickness at the top end 40 of the data terminal with the data collection and communications module 48 is approximately 5.08 cm. In FIG. 3, both top and bottom ends 40 and 30 of the data terminal 10, with the radio module 51, measures substantially the same depth or thickness of about 3.81 cm. The increase in the thickness of the module 48 over that of the module 51 is formed in a transition 69 which has been found to advantageously provide a resting ledge for the index finger of a user of the data terminal 10, providing added stability during use of the data terminal 10. With the index finger of the user resting against the transition or ledge 69, the thumb of the user is conveniently located along a lateral surface 70 of the module 48. A pushbutton 71 is disposed in the general area of the surface 70 to be readily accessible for activation by the user's thumb. The pushbutton 71 is hence used to activate an image reading operation of the long range CCD reader apparatus 50, or the like. The pushbutton 71 may be duplicated in an identical location on the opposite lateral wall of the module 48. In this manner both left-handed and right-handed users of the data terminal 10 would be able to use the image reader operation trigger pushbutton 71. The location of the pushbutton 71 in FIG. 2 denotes both oppositely facing pushbutton locations on the opposite side walls of the module 48. The overall lengths of the modules 48 and 51 are substantially identical at approximately 8.25 cm.

FIG. 5 best illustrates the physical interrelationship between various elements of the radio 49 and the long range CCD reader apparatus 50 which results in the described minimal increase of the overall thickness of the data collection and communications module 48 over the radio module 51. The module 48 is contained within a molded protective shell 75 of a high impact plastic material, preferably identical to the material employed for the housing 14. The outer contour of the shell 75 also blends into that of the housing 14, such that when edges 76 and 77 (FIG. 5) and the stop edge 66 are placed and locked against the respectively matching juncture lines 52, 53 and the seat 67, the protective shell forms part of the housing 14. The edges 76 include the latch hoods 56 (FIG. 4) which lock the shell 75 to the housing 14. Interiorly of the shell 75 a plurality of spaced, internally threaded bosses 79 are disposed in a plane to support the mounting of a main circuit board 82, which is also referred to as an analog board 82.

The analog board 82 is a multi-use element, in that it is first of all a circuit board. The circuit board 82 is in particular a four-layer circuit board, having conductive patterns disposed on both major outer surfaces 83 and 84, the conductive patterns including designated sites for mounting electronic components to both sides of the circuit board. Two inner conductive planes provide ground and interconnection planes for the components on the respective outer surfaces of the circuit board 82. The ground plane within the circuit board 82 substantially isolates electrical radio noise from interfering with the long range CCD reader or like components and the preferred image sensor array and minimizes such radio noise from being emitted from the shell 75.

To the surface 84 of the main circuit board 82 there is mounted a long range CCD reader module 910. The long range CCD reader submodule 86 includes a mounting frame 87, preferably a molded structure of a high impact plastic.

An optical analog circuit board 105 is mounted against the frame 87 across from the main circuit board 82 and fastened with typical mounting screws 106 to frame 87. A typical circuit board connector pin arrangement, such as is shown at 108 may be connected to a typical flat cable 109 to electrically couple the optical circuit board 105 to the main circuit board 82.

Mounted to the surface 83 of the main circuit board 82 is a radio support frame 115. The radio support frame 115 is a U-shaped frame which is mounted peripherally about the circuit board 82 extending upward from its surface 83. Formed tongues 116 of the support frame 115 are insertible into apertures 117 of the circuit board 82 to fasten the frame 115 to the circuit board. The frame 115 has a predetermined height between a lower edge 118 and an upper edge 119. Apertured mounting lugs 121 disposed at the upper edge 119 are adapted to receive threaded fasteners 106. The radio 49 is mounted on a circuit board 122. The circuit board 122 is attached, such as by the fasteners 106, to the lugs 121 of the support frame 115, the height of the support frame 115 spacing the main circuit board 82 and the radio circuit board 122 to accommodate the components on both boards. The support frame 115 in conjunction with the ground plane of the circuit board 82 also forms a radio frequency emission cage about the components of the radio circuit board 122, containing radio frequency (RF) emissions in accordance with regulations. The circuit board 122 may in itself contain RF shielding toward the top of the formed cage, or separate shielding such as an additional board 123 having a ground plane may be added.

A circuit board connector pin arrangement 125 receives a typical circuit board connector strip 126 of a circuit routing board 127. The circuit routing board 127 routes power and communicative interconnections between the main circuit board 82 and the base module 16. A conductive ground plane 128 of the routing a board 127 may preferably be coupled to the support frame 115 to complete the RF cage in conjunction with the support frame 115 and the ground plane of the main circuit board 82.

The assembly of the described elements of the main circuit board 82, e.g., a long range CCD reader assembly 50 and the radio 49 into the housing shell 75 spaces the elements compactly, placing the plane of the image focussing optics and image sensor array of the image sensor submodule 912 on the analog circuit board 105 adjacent a reading window 131 in the shell 75. The illumination source beams, for example, and the reflected light image of optically readable information pass through the window 131 in the outgoing and incoming directions, respectively. Spacing the described components at minimum distances adjacent one another is made possible by a cutout 132 (FIG. 5) in the main circuit board 82. It has been found that the cutout 132 in the main circuit board 82 and hence in its ground plane does not adversely affect RF shielding of emissions from the radio 49. Further, in reference to the main circuit board 82 as shown in FIG. 5, the circuit board 82 includes on opposite edges 136 and 137 electrical actuator switches 138. The switches 138 are the electrical components which work in conjunction with the external element of the pushbutton 71. The external portion of the pushbutton 71 is disposed in the shell 75 to become aligned with the electrical actuator switches 138 when the main circuit board 82 is assembled into the shell 75 as shown in FIG. 5).

It should be noted that not all possible control leads to the radio 49 are connected to the CPU or to the main circuit board 82, though it is conceivable that additional functions may be implemented and connected in variations of the preferred embodiment with respect to which the invention is described.

It should be realized that not all connections from any commercially available radio 49 and the main circuit board may be used. Various types of radios are known, of which certain radios may function on more than one frequency or a radio type referred to as spread spectrum radio may require various controls. It is contemplated that such radios referred to as spread spectrum radios may be used in conjunction with and as part of the invention described herein. Additionally, the present invention may be adapted to function with a number of such different types of radios and with radios of progressively advanced technology as such become available.

Figure 6A:
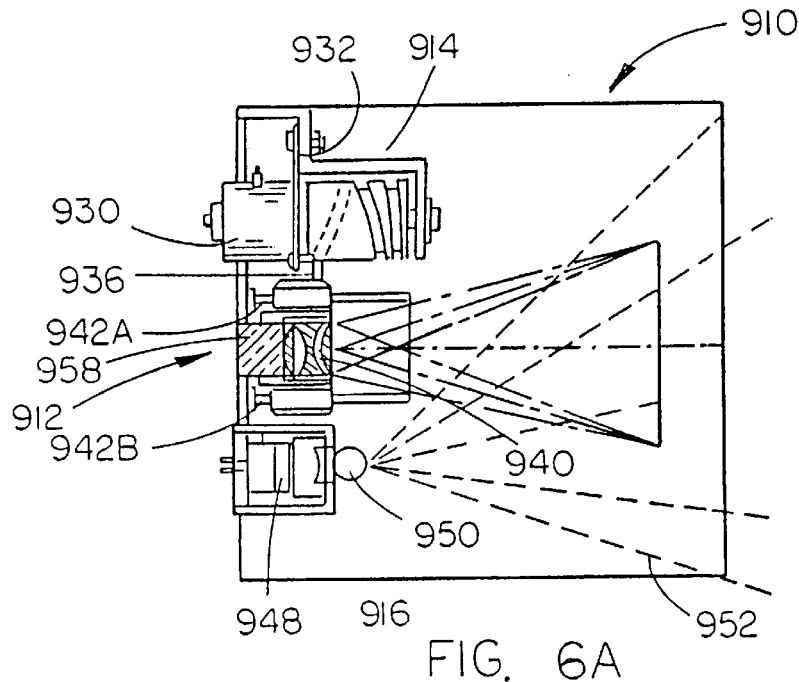
FIGS. 6A and 6B are simplified top plan sectional views of a first long range CCD reader of the present invention illustrating the lens barrel for minimum and maximum range respectively.

In an exemplary embodiment, a long range CCD reader module 910 (FIG. 6A and B) may be constructed according to the following detailed description. The CCD reader module 910 includes an optical and sensor assembly 912, an optical system drive assembly 914, and a fan beam illumination assembly 916.

Figure 7A:
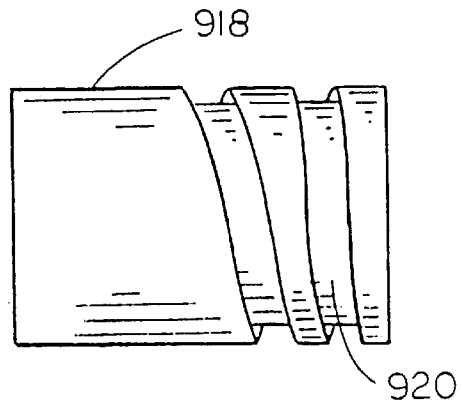
FIGS. 7A, 7B and 7C are various views of the auto-focus helical cam of the long-range CCD reader of FIG. 6.
Figure 7B:
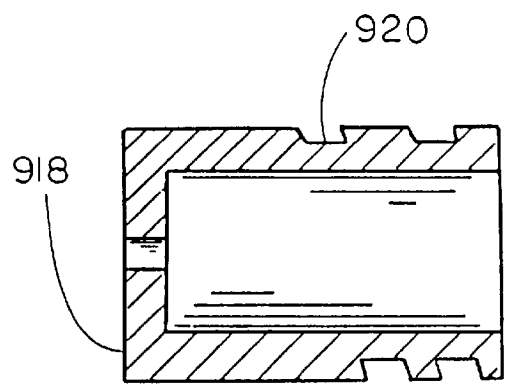
Figure 7C:
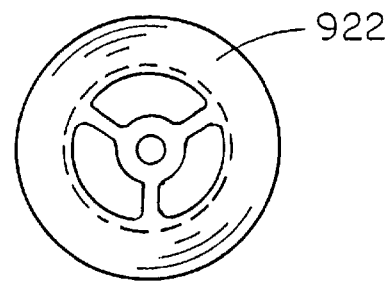
Figure 8A:
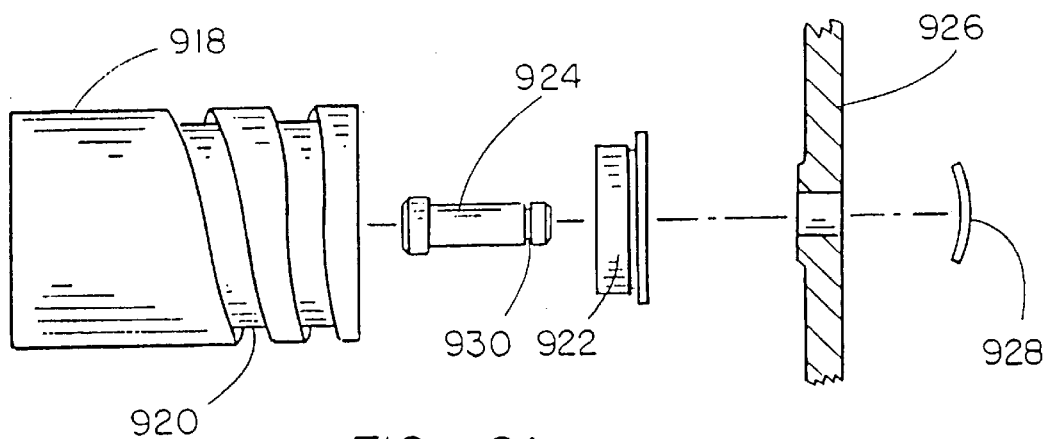
FIG. 8A is an exploded view of the auto-focus helical cam front bearing mount.
Figure 8B:
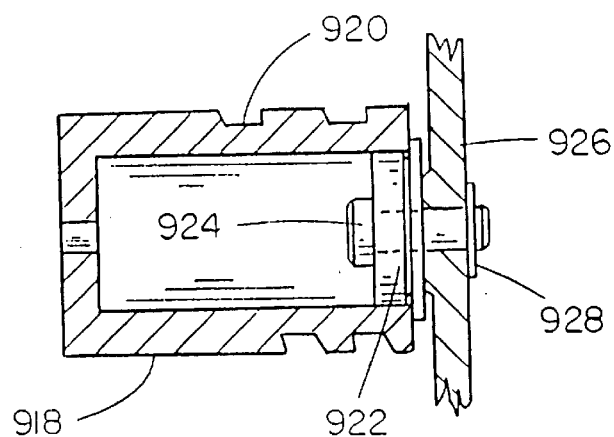
FIG. 8B is a side elevational sectional view of the auto-focus helical cam front bearing mount.

The various components of the optical system drive assembly 914 are best illustrated in FIGS. 7A, 7B, 7C, 8A, 8B, 9A, 9B, 10A, 10B and 11. Turning first to FIG. 7A, there is illustrated a auto-focus helical cam 918 having a helical channel portion 920. The cam 918 includes a front portion internal bearing pin support 922 which is adapted to receive a bearing pin 924 (FIG. 8A) which is rotatable secured by a bearing assembly bracket 926 via a spring retainer clip 928 which fits into an annular groove 930 in the bearing pin 924. A shaft adhesive may be used to fix the pin 924 to the inner bearing races to facilitate assembly.

Figure 6B:
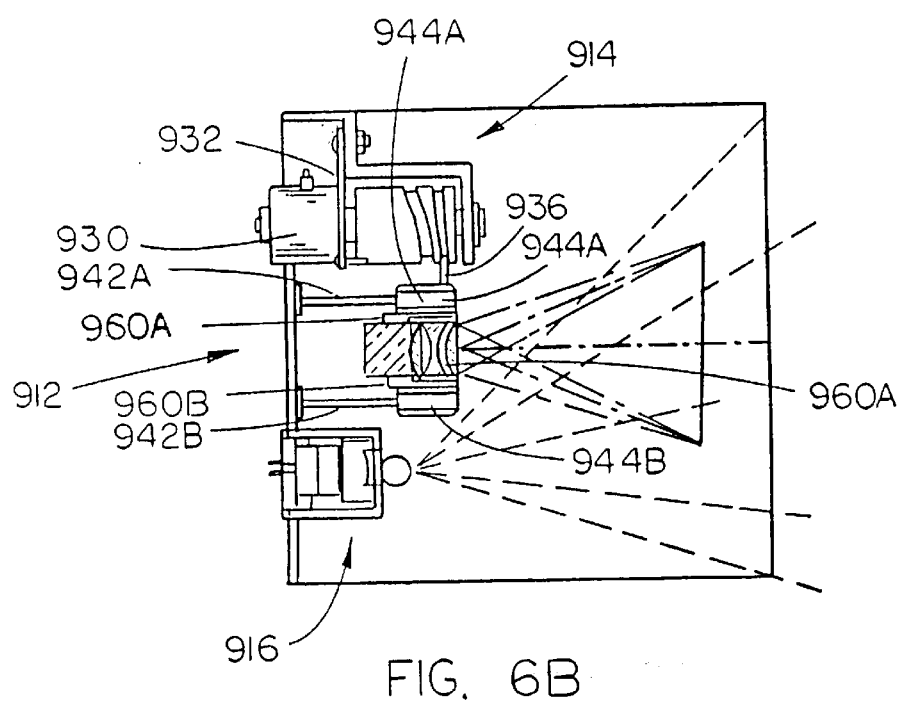
Figure 9A:
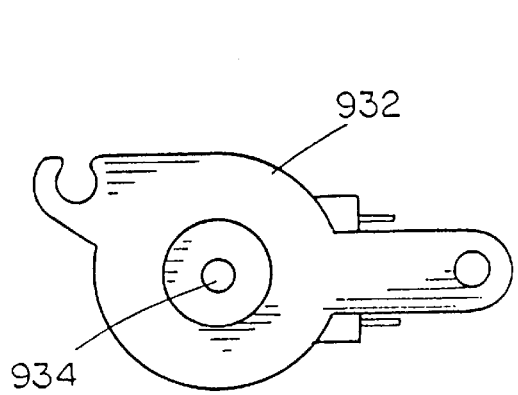
FIGS. 9A, 9B and 9C are various views of the stepper motor driver of the auto-focus helical cam.
Figure 9B:
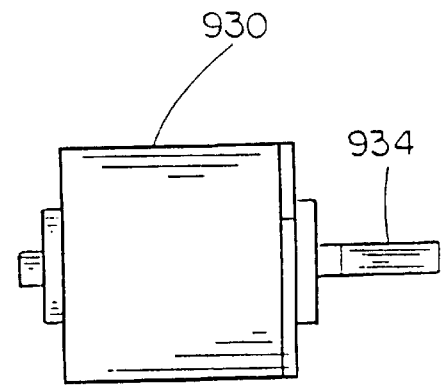
Figure 9C:
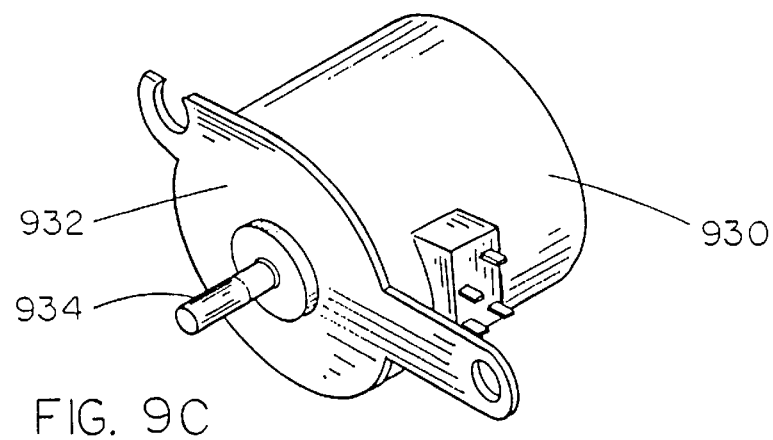
Figure 10A:
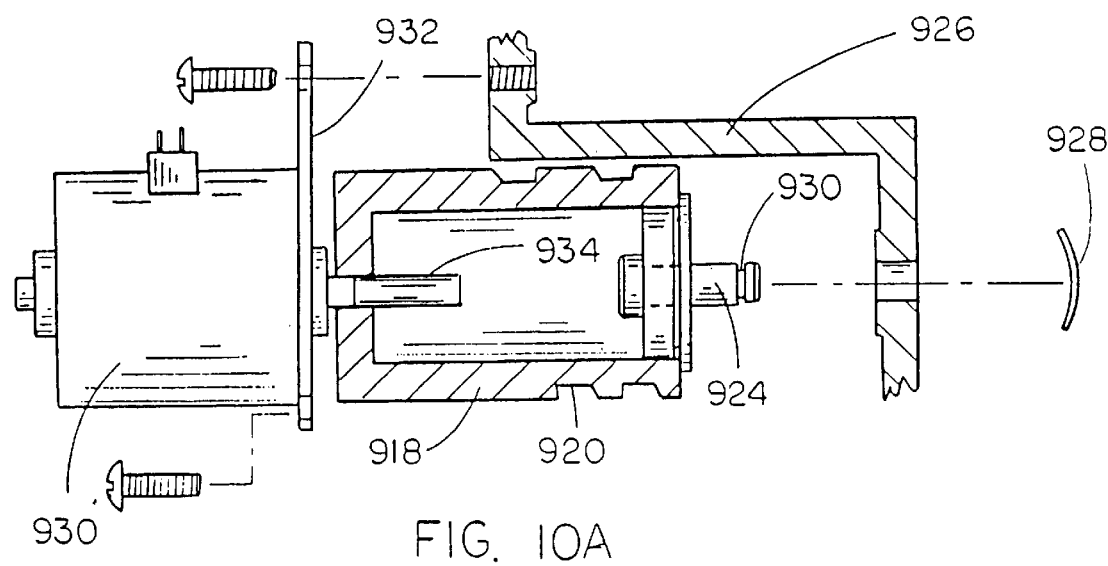
FIG. 10A is a partially exploded view of the auto-focus helical cam front bearing mount and motor mount.
Figure 10B:
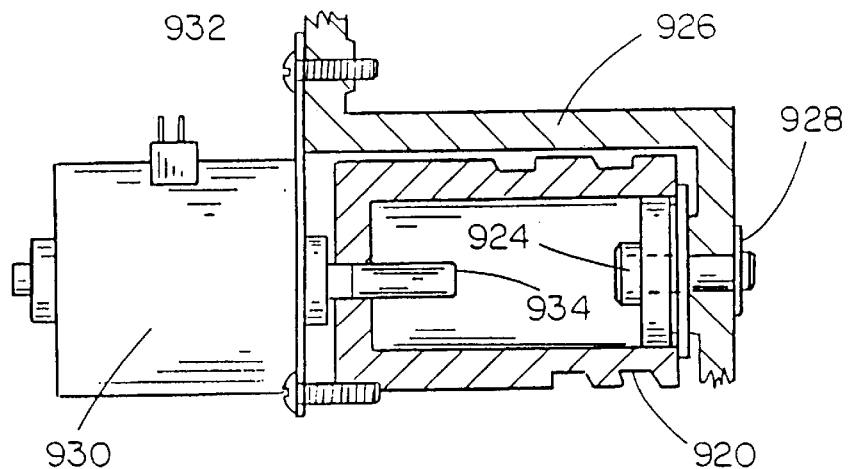
FIG. 10B is a partial sectional view of the auto-focus helical cam front bearing mount and motor mount.
Figure 11:
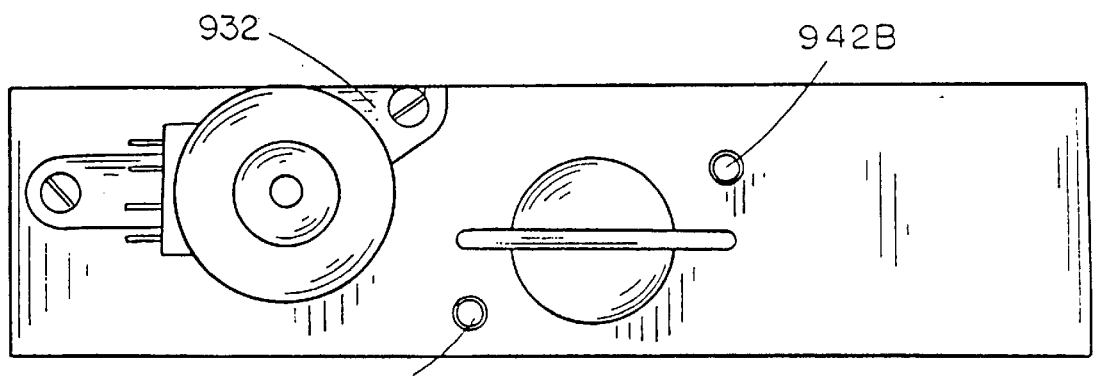
FIG. 11 is a simplified back elevational view of the long range CCD reader of FIG. 6A.

A stepper motor 930 (FIGS. 9A, 9B, and 9C) is attached to the bracket 926 via mounting plate 932 (FIGS. 10A & 10B) for drivingly engaging the auto-focus helical cam 918 via a knurled motor shaft 934. A steel pin cam follower 936 (FIG. 6A and 6B) having a rounded head rides in the cam channel 920 of the auto-focus helical cam 918. The pin 936 is attached to the composite lens system 940 and moves therewith acting as a cam follower as it moves within the cam channel 920.

Consequently, as the cam 918 is rotated either clockwise or counter-clockwise by the stepper motor 930, the cam follower guide 936, and thereby the composite lens system 940, is moved back and forth accordingly for focusing purposes.

Guide rods 942A, 942B extend through openings in two flanges 944A, 944B so that the composite lens system 940 will not rotate, but merely move back and forth on the guide rods 942A, 942B.

Referring now to FIGS. 6A, 6B, 12A, and 12B, a laser light source means 948 emits a beam through a polarization system 950 which causes the beam to be dispersed horizontally as indicated by lines 952. Fan light beam 952 is then reflected from a bar code through a window 954 as represented by beam 956 in FIG. 12A. This strikes a prism 958 disposed within the module 910. The prism 958 moves with the lens system 940, for example, as shown in a maximum range position in both FIGS. 6A and 12A and in a minimum range position in both FIGS. 6B and 12B. The lens system 940 and prism 958 move as one on brackets 960A, 960B. However, the prism 958 may be fixed with the structure in another embodiment. These brackets 960A, 960B are connected to flanges 944A, 944B which slide on rods 942A, 942B. The reflected beam 956 passes through the prism 958 and through the composite lens system 940 such that the beam 956 is reflected from a mirror 962 onto a photosensor array 964. In another, further embodiment, the lens system 940 may be fixed and the prism 958 may he driven. Such an embodiment may be advantageous for certain purposes since the prism 958 only has to be moved half as far as the lens.

In an exemplary embodiment the photosensor array 964 is a CCD device available from Toshiba as part N°TCD1301D. The TCD1301D is much taller than it is wide and has a sensitivity range from 36 to 54 volts per lux second under tungsten illumination. Under 660 nm illumination the CCD has a sensitivity of 272 to 408 volts per lux second. The TCD1301D is a 3648 pixel device with an approximate manufacturer's specified minimum dynamic range of 300. Sony parts ILX 503, ILX 505, and ILX 703 may also be utilized.

When the apparatus is initially used to read a bar code, the position of lens system 940 is rarely in the proper position for properly focusing a reflected bar code image on the sensor 964. In order to properly focus the image, the output of the sensor 964 is converted via the analog-to-digital converter and sent to a microprocessor as a first electrical signal corresponding to the initial position of the lens system 940.

An instruction set may control the microprocessor such that it causes the stepper motor 930 to move the cam 918 which causes at least one element of the optical string to move in one direction by a predetermined amount. This will either decrease or increase the focus of the image incident on the sensor 964. The microprocessor will then compare the first electrical signal to another electrical signal corresponding to the second position of the lens system 940. The microprocessor then determines which of the initial and subsequent signals represents a faster rate of intensity change with respect to time. The microprocessor then sends a signal to adjust the focus of the lens system 940 according to this determination. A method for making such a determination is discussed at length infra. In an exemplary embodiment the Z86C94 Zilog Z8 based microprocessor is utilized. The Z86C94 functions as an 8 bit machine with a 16 bit DSP coprocessor on board and operates at 24 MHz. A Texas Instruments TMS320C51 may also be utilized.

Focusing changes are accomplished by causing the stepper motor 930 to rotate in the proper direction, as described supra, for changing the position of the lens system 940 in relation to the sensor 964. In an exemplary embodiment a Seiko-Epson STP10NI 20S or STP-10S stepper motor may be utilized.

Figure 13:
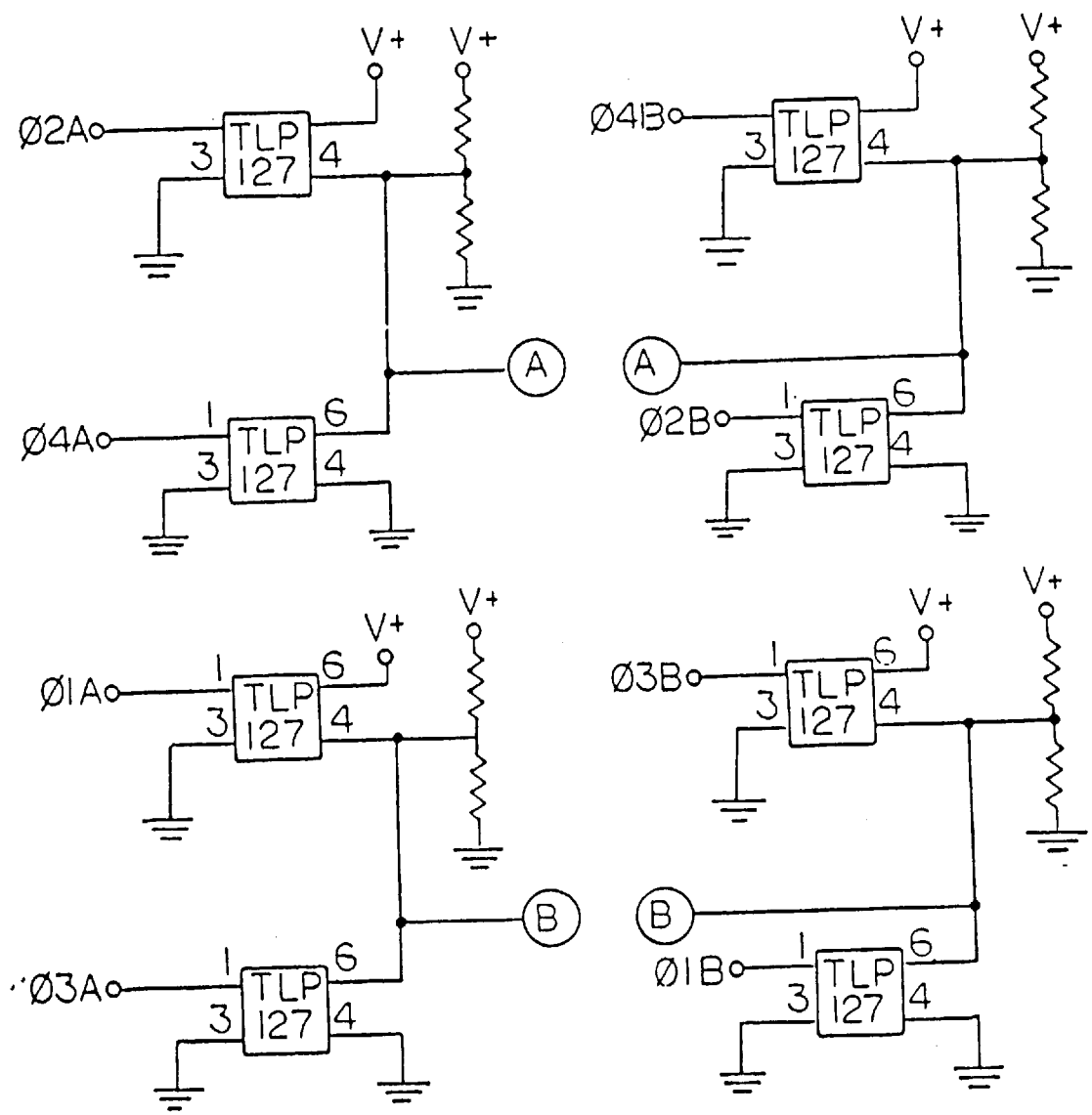
FIG. 13 are electrical schematics of circuits for driving an exemplary long range CCD motor.
Figure 14:
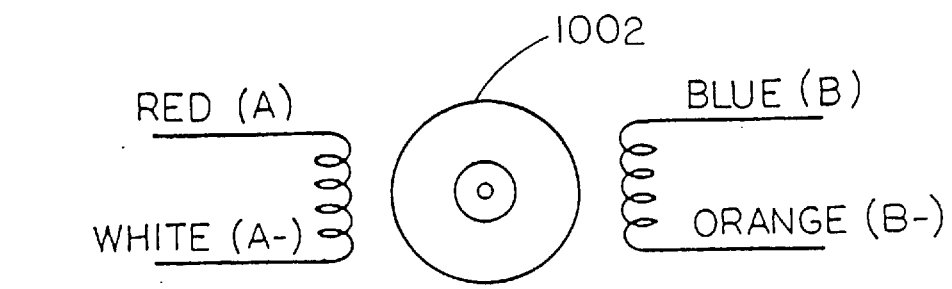
FIG. 14 is a simplified electrical diagram illustrating the motor connection to the circuits of FIG. 13.

FIG. 13 illustrates an exemplary circuit for operating a Seiko-Epson STP-10S stepper motor 1002 (FIG. 14). The stepper motor 1002 may be operated in either a 1–2 Phase Excitation Mode (Half Step Mode) or a 2 Phase Excitation Mode (Full Step Mode). FIG. 15 provides a table illustrating circuit control in a 1–2 Phase Excitation Mode. Likewise, FIG. 16 provides a table illustrating circuit control in a 2 Phase Excitation Mode. It should be noted that the 1–2 Phase Excitation Mode makes smaller demands upon the supply current than the 2 Phase Excitation Mode. Full Step Mode may be utilized to achieve fast slewing, and Half Step Mode may be utilized for fine focus adjustments.

The process of comparing two positions of the lens system 940 and moving the lens toward the position that produces the highest definition image is then repeated over and over until the rate of intensity change with respect to time is maximized. Because of the speed of the computer and the fast response time of the stepper motor 930 the focusing process can be accomplished very quickly.

Figure 12A:
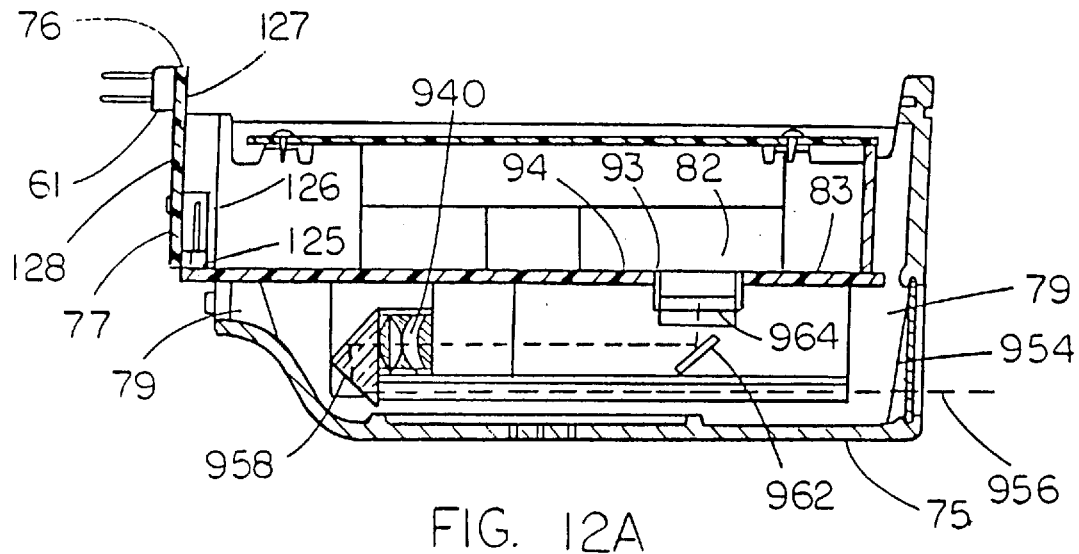
FIGS. 12A and 12B are simplified side elevational sectional views showing a first embodiment of a data terminal module of the present invention which includes the long range CCD reader of FIG. 6 and illustrates the lens barrel adjusted for minimum and maximum range respectively.
Figure 12B:
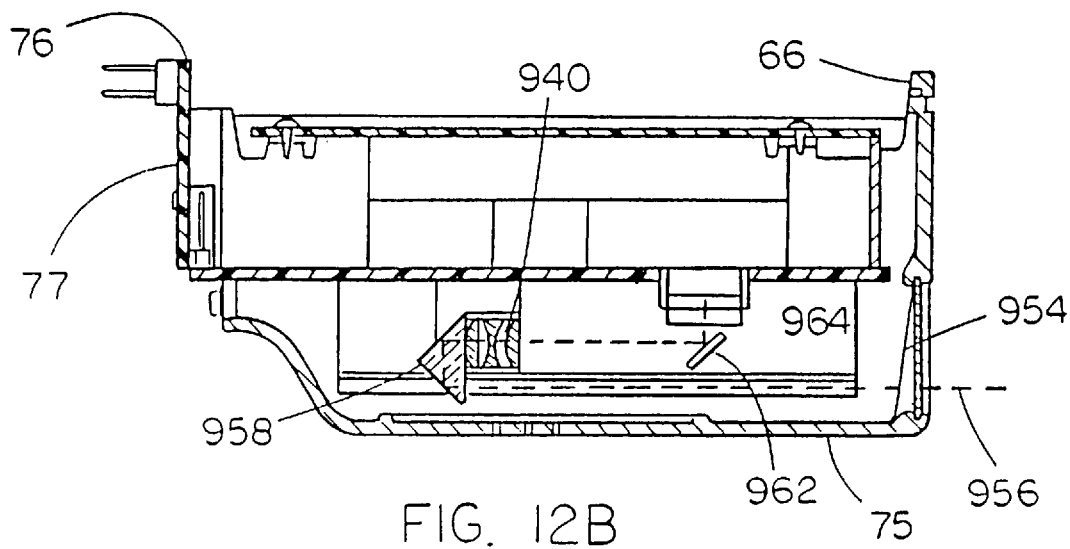

Referring again to FIGS. 12A and 12B, it is noted that in FIG. 12A the lens system 940 has moved to the extreme minimum range position. In FIG. 12B, the lens system 940 has moved to the extreme maximum range position. It should be appreciated that the lens system 940 can be positioned anywhere in between the extreme positions illustrated by FIGS. 12A and 12B.

In an exemplary embodiment the long range CCD reader may be operated according to the following description. This description assumes a bar code reader of the CCD type. It further assumes microprocessor control and an analog-to-digital converter means. In such an embodiment the microprocessor utilizes the incoming data stream to determine the focus condition of the image. A preferred CCD device utilized in such an embodiment, such as the TCD1301D, should have an inter-element spacing of between seven microns (7 $\mu$m) and fourteen microns (14 $\mu$m). However, the inter-element spacing is preferably at the smaller end of this range. The clock speed may vary with the CCD device. A reasonable resolution for the analog-to-digital converter would be eight bits. This would give 256 steps between zero and full scale. A clock frequency for moving data from such a CCD device would be five megahertz (5 Mhz).

Figure 17:
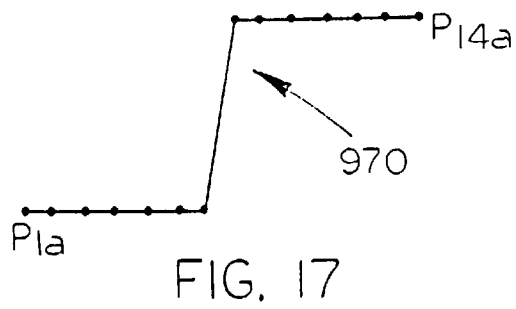
FIGS. 17, 18, 19A, 19B, 20 and 21 are graphical representations of the prophetic signal level of an analog-to-digital converter electrically coupled to a CCD type image sensor.
Figure 18:
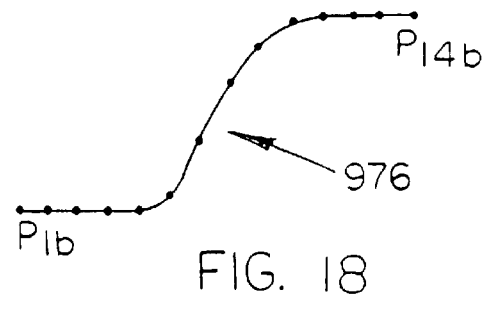

If a sharp dark to light transition is focused upon a CCD device with excellent fidelity, the transition as read out of the CCD device will reflect an abrupt shift, and the output from the analog-to-digital converter will respond with a commensurately abrupt shift in signal levels, e.g., as in FIG. 17. In an out of focus condition, this abrupt light to dark transition is spread out over a wider area and the data stream from the sensor reflects this shift in a much reduced measure of abruptness, e.g., as in FIG. 20. It should also be noted that an out of focus condition has the following additional attributes: (1) maximum levels in the signal are reduced; and (2) the minimum levels are generally elevated somewhat and the signal related noise is attenuated. This noise is related to code quality and not electrically introduced noise. Thus an "in focus" condition has higher highs, lower lows and noisier transitions. Line 970 in FIG. 17 represents the limiting "in focus" condition. The other lines, 972–978, FIGS. 18–21, represent the curves described by the sequences of data points from the CCD device as converted by the digital-to-analog converter. Each line is formed from a series of discrete disconnected data points, such as P1a–P14a and P1e–P14e, and represents various states of focus condition.

The approach to controlling focus is to maximize the slope of any line segments drawn between these discrete points. This is analogous to finding derivatives and then moving the lens to force the highest mean transition value (derivative value). In order to eliminate any directional effects the slope is found for the interval in which the data point resides by splitting that interval into two slope segments and finding the mean of the absolute values of the slopes in both intervals.

Figure 19A:
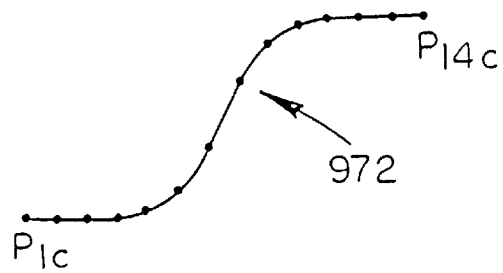
Figure 19B:
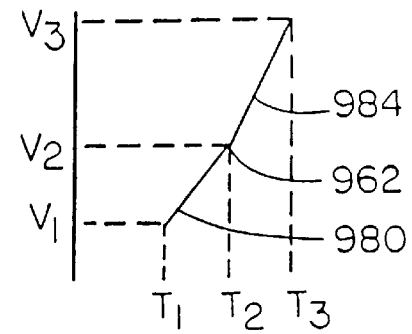
Figure 20:
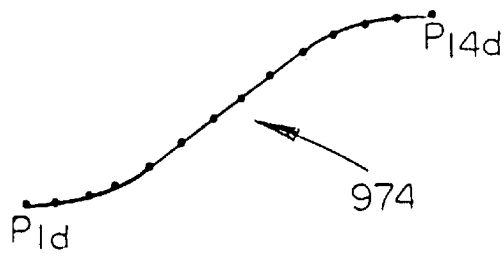
Figure 21:
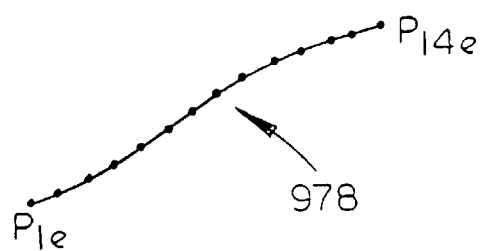

Using FIG. 19B, the first slope segment 980 is between $t_1$ and $t_2$ and the second slope segment 984 is between $t_2$ and $t_3$. In this example the calculated values of interest are the shifts in signal level over these half-intervals. In the first half-interval this value is $(V_2-V_1)/(t_2-t_1)$ or $\Delta V_{12}/\Delta t$. In the same fashion, in the second half-interval the value is $(V_3-V_2)/(t_3-t_2)$ or $\Delta V_{23}/\Delta t$. We assume that $\Delta t$ has the same magnitude for all half-intervals. Thus, the mean slope for the full interval in the region of point 2 is:

$$\left[\left|\frac{(V_3-V_2)}{(t_3-t_2)}\right|+\left|\frac{(V_2-V_1)}{(t_2-t_1)}\right|\right]/2$$

or simply:

$(V_3-V_1)/(t_3-t_1)$.

The change in slope across this interval also conveys information.

The mean slope for each data point is first located. In other words, each pixel value is first digitized by the analog-to-digital converter before the microprocessor stores the pixel value ($V_1$, $V_2$, $V_3$, etc) in memory. The approach, then, is to sum the resulting collection of digitized values and divide that sum by the number of values stored in memory. However, as a focused condition is reached, more and more slopes approach values of zero as indicated in FIGS. 17 through 21. In fact, unfocused conditions spread the local slopes out over broader ranges; this provides a significant number of non-zero slopes. Conversely, focused conditions have fewer discernable non-zero slopes with generally greater magnitudes. One method of remedying the problem created by these zero slopes is to only consider non-zero slopes in the generation of the overall mean slope. Thus, a focused condition may be achieved by the motion of a lens where a numeric value is first given to a focus state. This numeric value may not be unique to a given focus condition but can function as a relative index for comparison with the next focus condition attempted by the scanner. A numeric value may also be assigned to a given focus condition that represents the highest slope value across the range of values calculated or the greatest slope in a specified sub-interval of this range.

A second method of overcoming the problem created by zero slope values is to utilize an abruptness algorithm. In the previous solution a great deal of effort was placed on finding mean slopes across an interval containing each data point. With this method a relatively homogenized value is obtained. However, no consideration was given to how the slope varied within the interval. The abruptness in the change in slope from the first half-interval to the second half-interval is a better indicator of focus condition than the mean slope across the full interval. As illustrated by FIG. 19B, the slope for the first half-interval is exactly $(V_2-V_1)/(t_2-t_1)$. Similarly, the second half-interval has a slope $(V_3-V_2)/(t_3-t_2)$. Again, the time intervals are equivalent and the voltages $V_1$, $V_2$, and $V_3$ are all digitized values which are integrally represented. An "abruptness quotient" may be found by determining the difference between the two slopes, this could be expressed:

$$\frac{(V_3-V_2)}{2\Delta t}-\frac{(V_2-V_1)}{2\Delta t}$$

Thus, the abruptness value for a full interval about point 982 is $(V_3-V_2)-(V_2-V_1)$ or $V_3-2V_2+V_1$. To maximize these values, their mean must be taken across all non-zero values. The relatively gentle and continuous slopes of out of focus conditions have low abruptness. Sharp focus situations will exhibit high abruptness. A single maximum abruptness value may be forced to occur across the range of values or a predefined sub-interval of that range of values. This approach may be excessively sensitive to noisy signals and the appropriateness of locating the mean across the range becomes significant. As before, the assumption is that mean abruptness may be affected by changing the lens position.

Fixed laser diodes may also be used to illuminate the bar code. This may be accomplished by taking advantage of the laser diode's astigmatism and using a cylindrical plano-convex lens to amplify the asymmetry. Two lasers may be used to illuminate the field of view from opposite sides in order to minimize light intensity variations across the bar code. A visible laser diode might also be used but reasonable intensities may be attained more easily and more cost effectively using infrared laser diodes.

In another embodiment a holographic lens might be used to record the interference pattern between a point source of monochromatic light and a slit source similar to the space between two razor blade edges emitting light of the same monochromaticity. Likewise, a reflective (rather than transmissive) hologram could be utilized with a reflective holographic lens in order to produce a focusing mirror. In this way the number of optical components in the system could be minimized. If the target is then flooded by using the laser diode pair, this lens or mirror could be rotated to scan the code. The orientation would be different for the sensor in both embodiments. The size of the holographic element would again, as in most optical systems, have a major impact upon the overall system sensitivity.

FIGS. 22A, 22B, 23A, 23B, 24, and 25 diagrammatically illustrate yet another exemplary embodiment of a long range CCD reader 1010. Such a reader may be adapted as a single interchangeable module for use with the hand-held data capture system described herein.

Figure 22A:
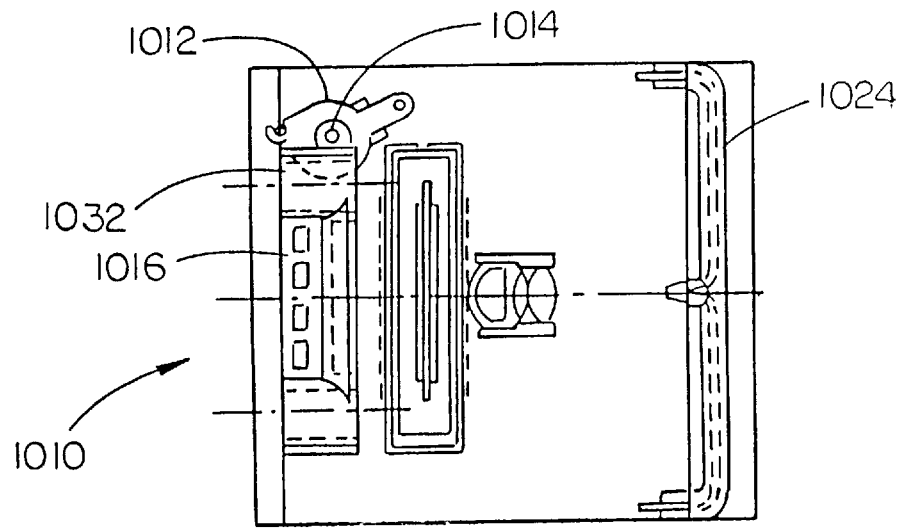
FIG. 22A is a simplified top plan view of a second long range CCD reader of the present invention illustrating the prism adjusted for minimum range.
Figure 22B:
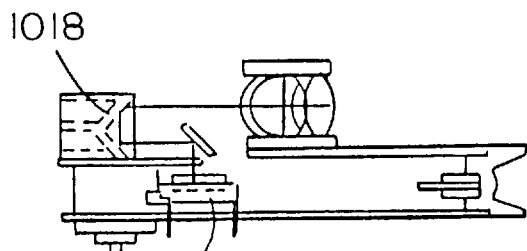
FIG. 22B is a side sectional view of FIG. 22A.
Figure 23A:
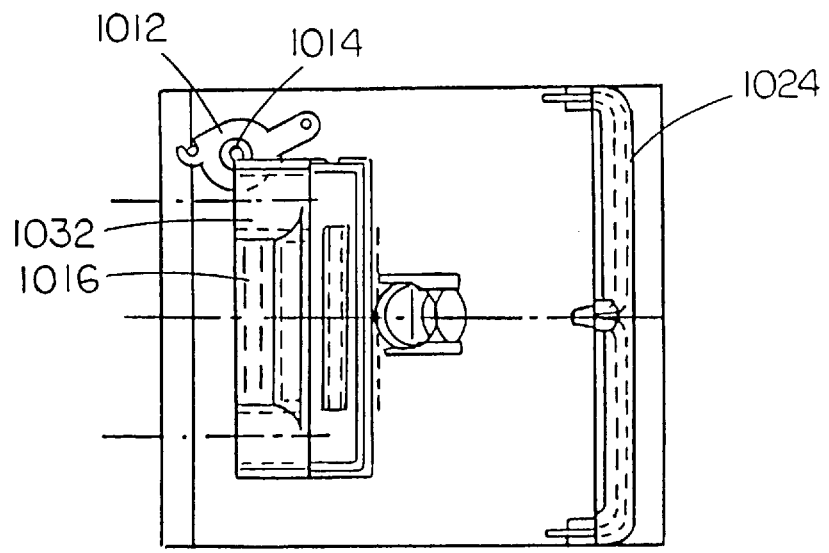
FIG. 23A is a simplified top plan view of the second long range CCD reader illustrating the prism adjusted for maximum range.
Figure 23B:
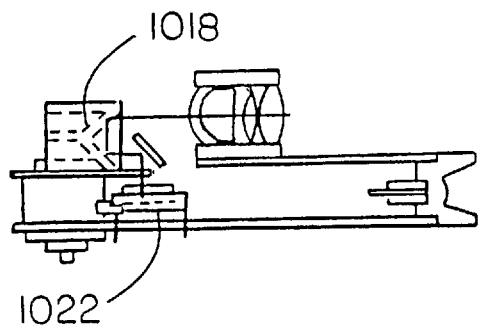
FIG. 23B is a side sectional view of FIG. 23A.
Figure 24:
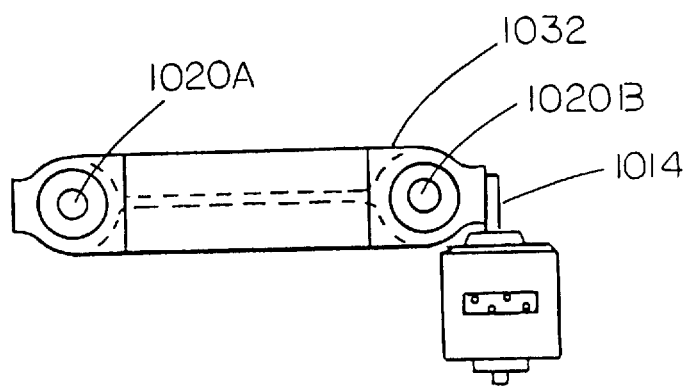
FIG. 24 is a bottom elevational view of the long range CCD reader of FIGS. 22 and 23.
Figure 25:
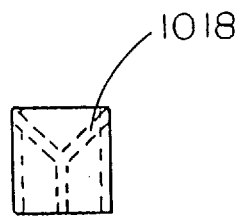
FIG. 25 is a side elevational view of the prism of FIGS. 22 and 23.
Figure 26:
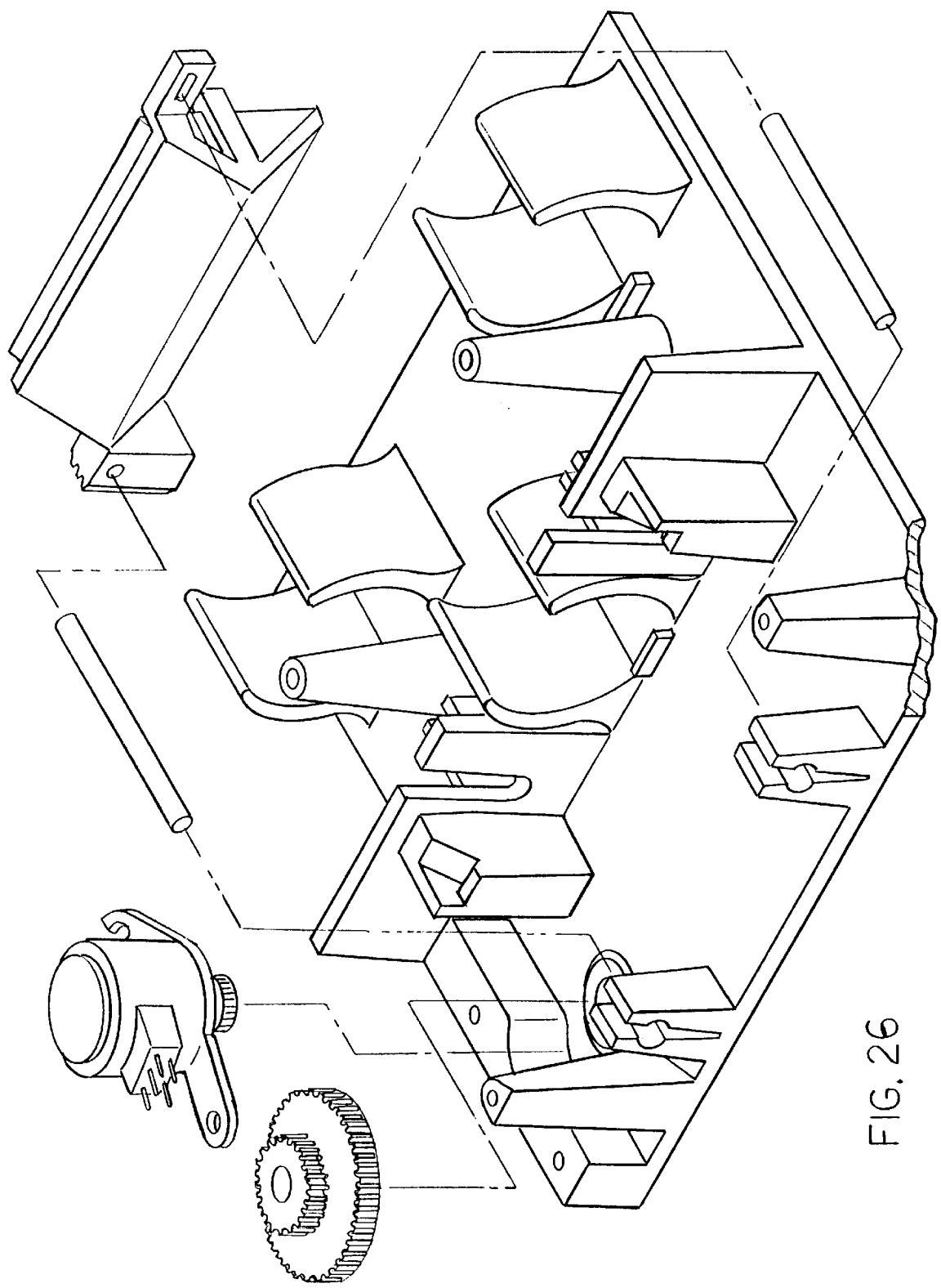
FIG. 26 is a perspective view of a third long range CCD reader of the present invention.
Figure 27:
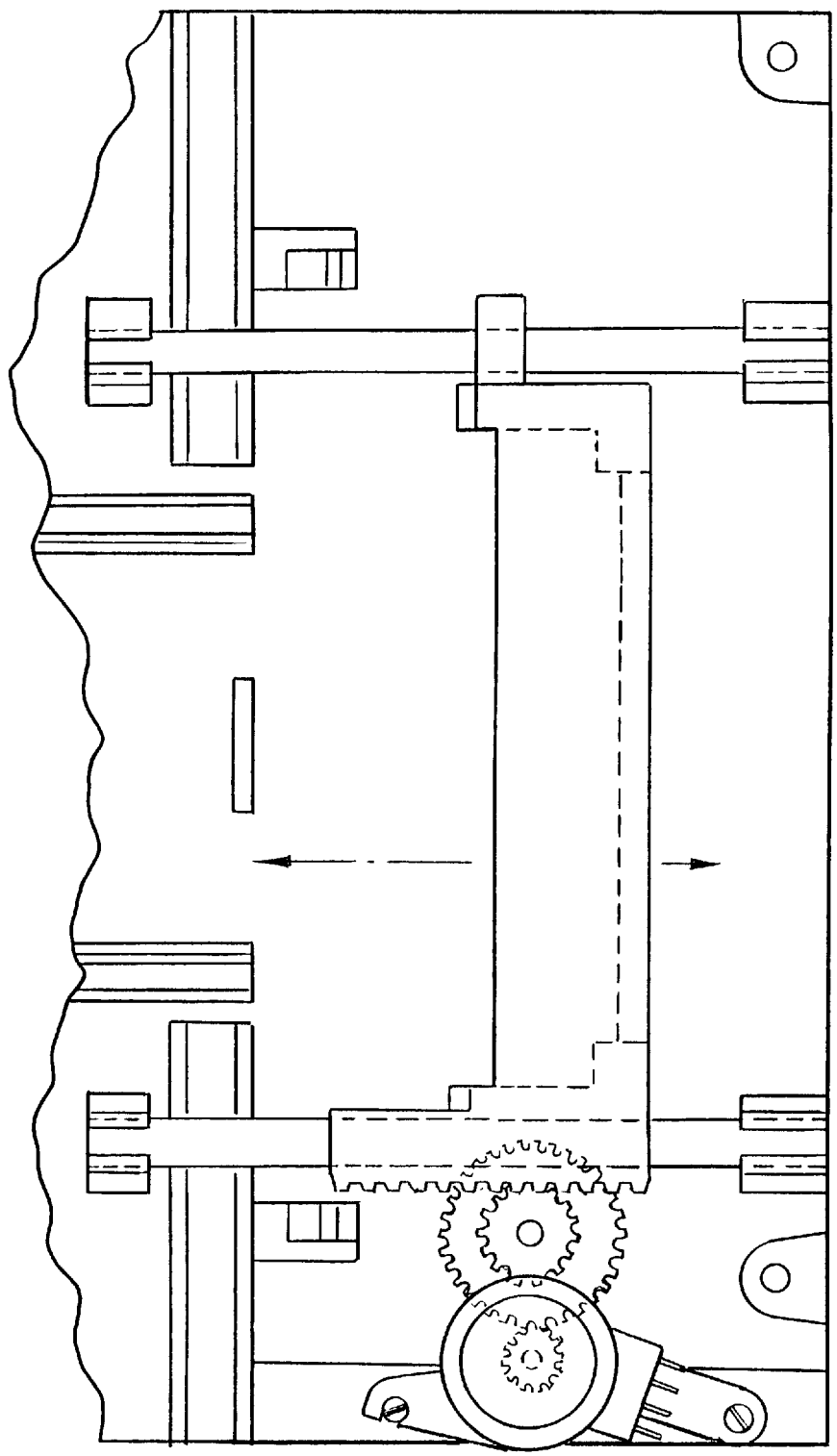
FIG. 27 is a top plan view of the CCD reader of FIG. 26.
Figure 28:
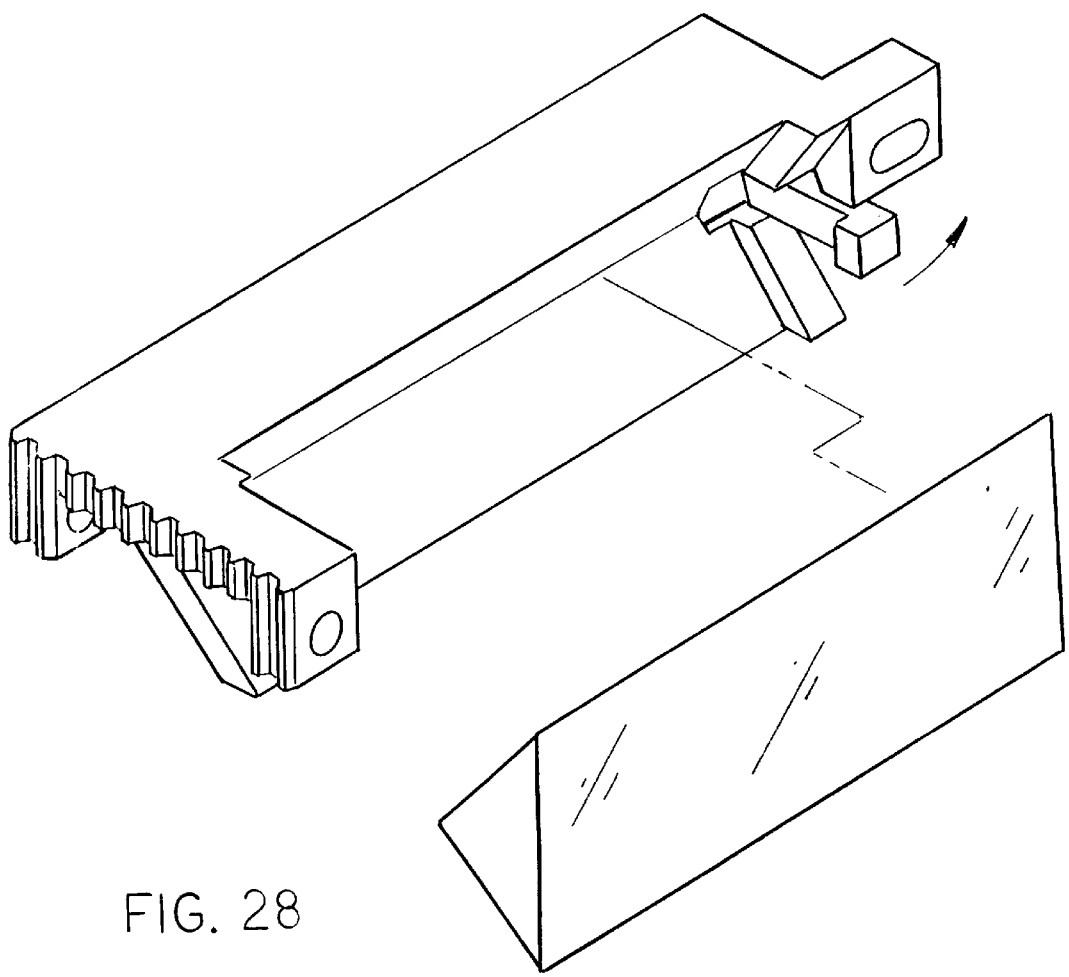
FIG. 28 is a perspective view of the prism and prism mount of FIG. 26.
Figure 29:
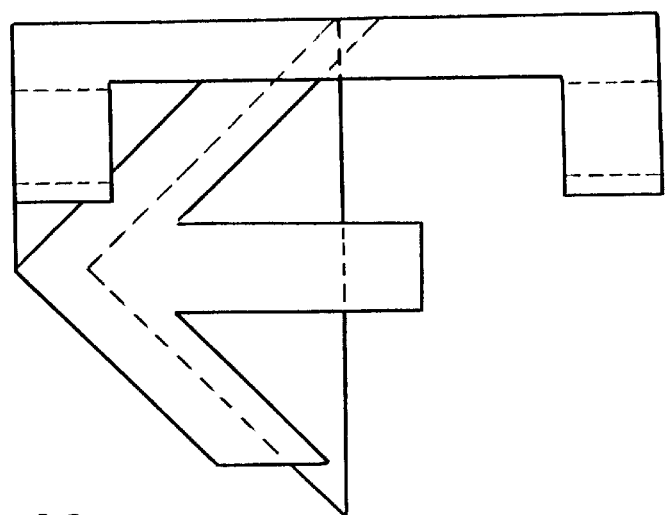
FIG. 29 is a side sectional view of the prism mounted within the prism mount.

FIGS. 22A, B and 23A, B are top plan and elevational views of an exemplary embodiment wherein a cam driving system is not utilized. In such an embodiment the drive shaft 1014 of the motor 1012 is coupled in friction engagement with a shuttle 1032 attached to prism housing 1016. The prism housing 1016 symmetrically houses a prism 1018 for folding light such that it is incident upon a photosensitive array 1022. Rotation of the motor drive shaft 1014 causes the shuttle 1032, prism housing 1016, and prism 1018 to move in a linear direction on two shafts 1020A and 1020B (FIG. 24). In this fashion, and by reversing the direction of rotation of the motor, an image incident on the photosensitive array 1022 may be brought into sharp focus. A xenon lamp 1024, or the like, may be utilized in low ambient light conditions to illuminate any optical information which is to be read. Such an illumination source may be disposed as is illustrated in the FIG. 22A, B and 23A. It will be apparent to those skilled in the art that the embodiment of FIGS. 33 through 25 may be operated and utilized in an analogous fashion as the previous embodiments.

FIGS. 26–29 diagrammatically illustrate a third exemplary embodiment of a long range CCD module which may be constructed by analogy substantially in accordance with the description of the previous embodiments.

FIGS. 30–33 illustrate a further embodiment of an image reader/RF module for assembly with the base module 16. Shown is an image reader/RF module 210 which is interchangeable with module 48, FIG. 4, and Module 51, FIG. 3, with respect to base module 16. The image reader module 210 is provided with an edge face 214A mating with edge faces such as 52 and 53 of the base module 16 in the same way as described for the module 48 of FIG. 2. A downwardly protruding wall portion 214B advantageously provides a gripping margin for the index finger of a user of the data terminal providing secure support for the terminal even in the absence of a hand strap such as 68 (FIG. 3).

The module 210 is shown as being provided with latch hooks 216 (FIG. 32), for interengaging with respective latch seats 57 (FIG. 4) as with modules 48 and 51. Module 210 is also equipped with a stop edge 214C (FIG. 32), with a recess 217 for interlocking with a projection 218 of the seat 67 (FIG. 4) as the module 210 is moved longitudinally into its final position. Threaded seats are indicated at 219 (FIG. 31, 33) for receiving screws 63 (FIG. 4) so as to fasten module 210 as a fixed part of the data terminal.

During longitudinal movement of module 210 into its final assembled position, the pins of connector 222 (FIG. 30) interengage with the receiving connector 62 (FIG. 4). The relative longitudinal positions of latch parts 216, 57 assure that the pins of connector 222 are moved upwardly to a position just in front of and aligned with connector 62 before the longitudinal movement can begin. The levels of mating edges 53, 214D of the base module 16 and of the module 210 assure that the pins of connector 222 must be at the proper level during longitudinal movement as permitted by the interfitting configurations of latch parts 216, 57.

In the implementation of image scan/RF module 210 shown in FIG. 30, a main analog board 228 underlies a radio subassembly 230 including an RF board 234. The main analog board 228 essentially corresponds with main analog board 82 of FIG. 5 and the RF board 234 is essentially the same as RF board 122 of the previous embodiment. An open rectangular metal shielding frame 236 surrounds the RF components. The RF board 234 may in itself contain RF shielding toward its upper surface, or separate shielding such as an additional board having a ground plane may be provided immediately above the RF board 234 as shown at 123 in FIG. 5.

In an embodiment where the RF transmitter is not active at the same time as the scanner subassembly, no special RF shielding need be included with the RF board 234.

In a specific implementation, the shielding frame 236 is provided with projecting tabs which are inserted into receiving slots of the analog board 228 and soldered in place so as to be directly electrically connected with the inner ground plane of the analog board 228 (in the same way as for tongues 116 and apertures 117, FIG. 5).

FIG. 32 shows a cross section of the module shell 214 taken along line 24—24 of FIG. 23. This Figure shows integral rib means 251 which also appears in FIGS. 22 and 23, and which adjoins a through-aperture 252 accommodating the threaded end of antenna 253. A thin metal plate 254 fits into the space 255 and is captured therein and prevented from rotation when the antenna is threadedly engaged therewith.

A boss 260, FIG. 32, integral with the shell 214 has a threaded insert for use in securing the RF assembly 230 to the shell. A transverse rib 263, (FIG. 33), extends near edge face 214A and bosses 264 for receiving threaded seats 219.

Referring to FIG. 32, the shell 214 has thickened end wall portions 270 and 271 with respective sets of cylindrical bores 281 for receiving respective light emitting diode units such as 291 (FIG. 30) for directing illuminating beams along respective beam axes 301–306, (FIG. 31), toward an image plane 307.

Centrally of the shell frontal wall there is an inwardly extending boss 310 having a cylindrical chamber 312 which opens through the front wall and accommodates insertion from the exterior of an optics subassembly such as diagrammatically indicated at 314, FIG. 30. The optics 314 collects reflected light from a bar code or the like at the image plane 307 via an entrance portion which communicates with optics chamber 312 and which is diagrammatically indicated at 312A in FIG. 31. A reduced diameter aperture 318 of boss 310 accommodates the passage of the focused reflected image along an axis 320 (FIG. 30). A reflecting mirror 322 secured at a seat 324 formed by shell 214 redirects the reflected bar code image to an image sensor 326 which is mechanically and electrically connected to the image reader board 266.

In the exemplary embodiment, the optics 314 focuses a bar code image onto image sensor 326 for positions of the bar code along optical axis 330, (FIG. 30), which are beyond the end of the antenna 253. In this way a simple optical arrangement can be utilized, even an optical arrangement with minimal depth of field of approximately 2.54 cm.

In the exemplary embodiment, the lens system 314 was from a commercial CCD reader of Norand Corporation which utilized a folded optical path generally as shown in U.S. Pat. No. 4,894,523 issued Jan. 16, 1990. It was possible to eliminate two reflectory mirrors of the folded optical path by placing the bar code sensing region beyond the antenna.

In the exemplary implementation it was found that a substantially more uniform illumination of a bar code could be obtained at an operating range beyond a 7.62 cm antenna by adjusting the axes 301–306 somewhat in comparison to directions parallel to the optical axis 330 as indicated in FIG. 30, such that the axes 301–306 of the beams intersect the image plane 307 at uniformly spaced points.

Figure 34:
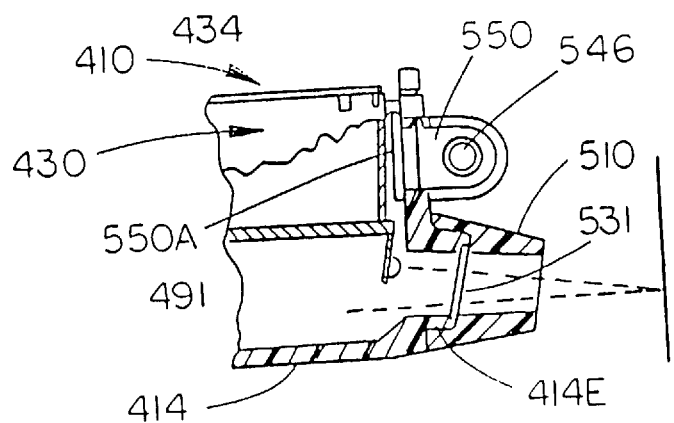
FIG. 34 is a partial sectional view of the present invention utilizing a fifth type of data terminal module.
Figure 35:
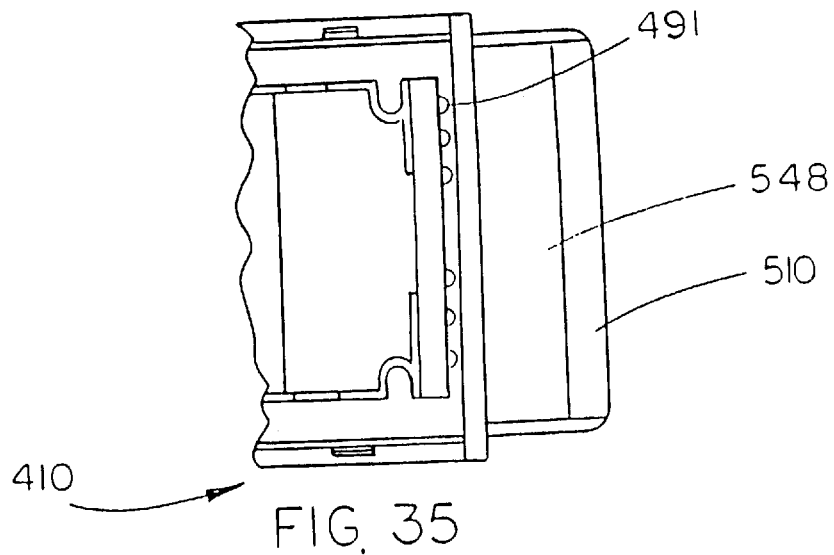
FIG. 35 is a partial top sectional view of the data terminal module of FIG. 34.

FIGS. 34 and 35 show another embodiment of the invention having image reader/RF module 410 which is interchangeable with modules 48, 51 and 210. Elements 414, 430, 434, and 491 of FIGS. 34, 35 substantially conform with elements 214, 230, 234 and 291 of FIGS. 30–33, so that the description of these elements will be understood by reference to the description of FIGS. 30–33.

As seen in FIG. 34, housing 414 is provided with an outwardly protruding seat 414E which receives a snap-on cowl piece 510 which serves to retain an optical window 531 covering an elongated generally rectangular opening at the front of housing 414. The module 410 has a transverse extending antenna 546 housed within a dielectric cover 548 completely within the confines of the length of housing 14 with cowl 510, and within the width dimension of housing 14. The antenna may be a helical wound wire type, and may be carried by a fitting 550 having an enlarged base 550A for coupling with the RF circuits 430.

A further embodiment of the invention is shown in FIG. 36–40. In the submodule 600, the reflected image from a bar code impinges on a reflecting mirror surface 610A of a segmental spherical aluminum mirror 610 whose height corresponds to the height of module 600. Mirror 610A reflects the incident image to a surface mirror region 620A of a cover glass 620. The image is again reflected and is then focused by lens assembly 630 onto an photodetector image array 640. A linear actuator 650, FIG. 37, may be coupled with the lens assembly 630 and control the axial position thereof for optimum focus of the information image onto array 640, e.g., as in referenced U.S. Pat. No. 4,877,949 issued Oct. 31, 1989).

Figure 36:
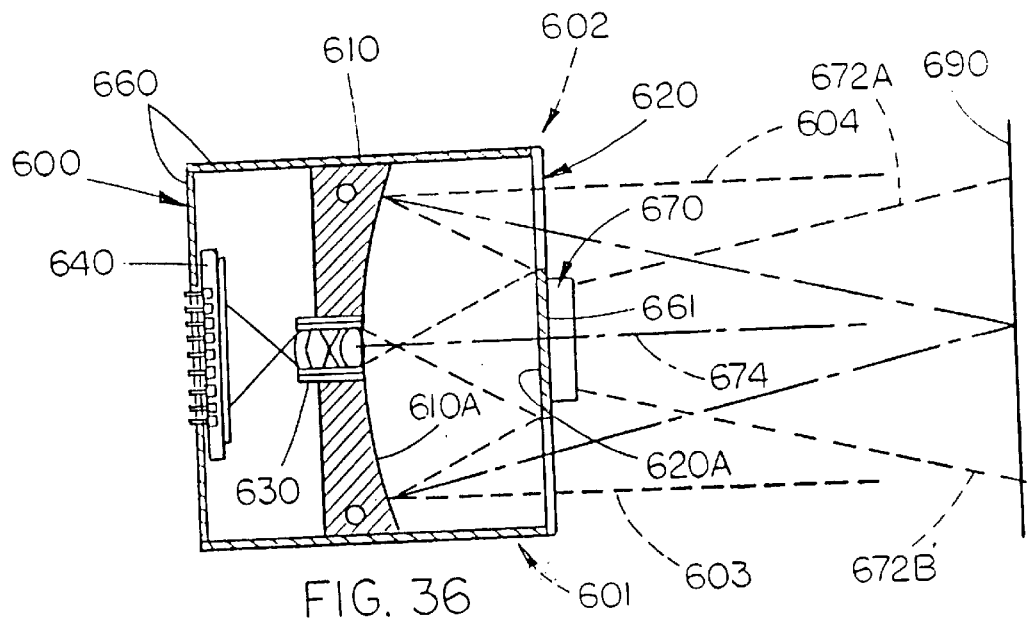
FIG. 36 is a diagrammatic horizontal sectional view of a sixth embodiment of a data terminal module of the present invention.
Figure 37:
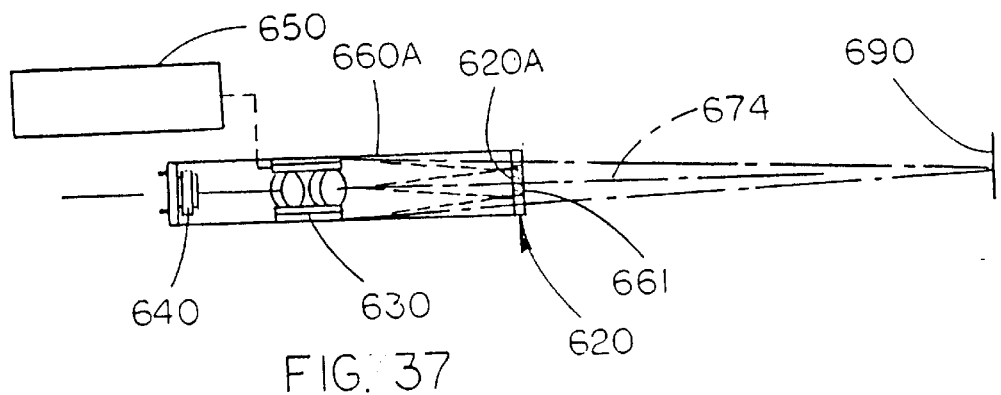
FIG. 37 is a diagrammatic longitudinal sectional view of the data terminal module of FIG. 36.
Figure 38:
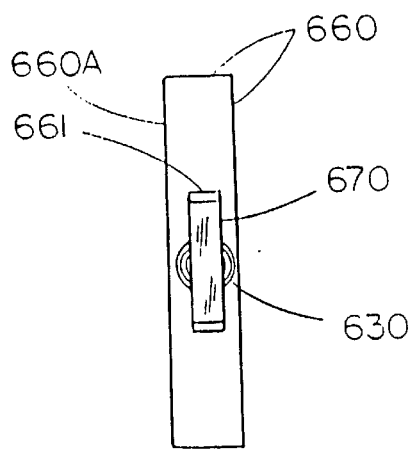
FIG. 38 is a front view of the data terminal module of FIG. 36.

The aluminum spherical mirror 610 may function not only as an optical element, but also as a structural element for supporting the lens assembly 630 and autofocus linear actuator 650. The use of large mirror surface 610A as seen in FIG. 36 allows the size of the subsequent optical string to be reduced since the lenses 630 (an achromatic doublet has been indicated) are not relied upon as the principal light gathering structure.

Figure 39:
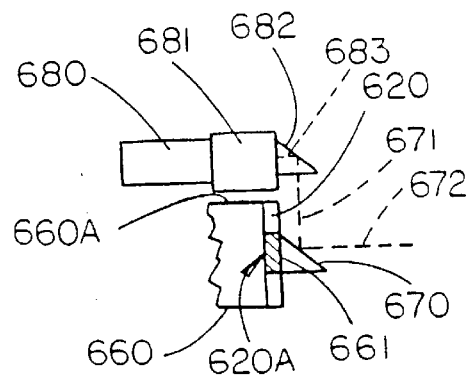
FIG. 39 is a diagrammatic illustration of the manner of applying a fan-type laser line generator to the embodiment of FIG. 36.

A preferred approach to integrating a fan beam generator with the photodetector submodule 600 is illustrated in FIG. 39). The housing of the module 600 is shown with light proof walls 660 and with the window 620 opaque at 661 in front of mirror surface 620A. Then a mirror surface is provided at 670 for transmitting a vertically incident fan-shaped laser beam 671 into a fan beam plane at 672 which is coplanar with the optical axis 674 (FIG. 36). FIG. 39 shows a laser diode source 680, spreading optics 681 and a right angle prism or mirror surface 682 for redirecting a horizontal fan-shaped laser beam at 683, these components 680–682 being carried at a top wall 660A of submodule 600. The configuration of the fan beam with central axis 672 is indicated by marginal rays 672A and 672B in FIG. 36, and an exemplary image plane is indicated at 690 for a given axial position of optics 630.

The submodule 600 may also operate from ambient light or from light from an auxiliary spot-light like light source on a vehicle and separate from the hand-held bar code reader.

Figure 40A:
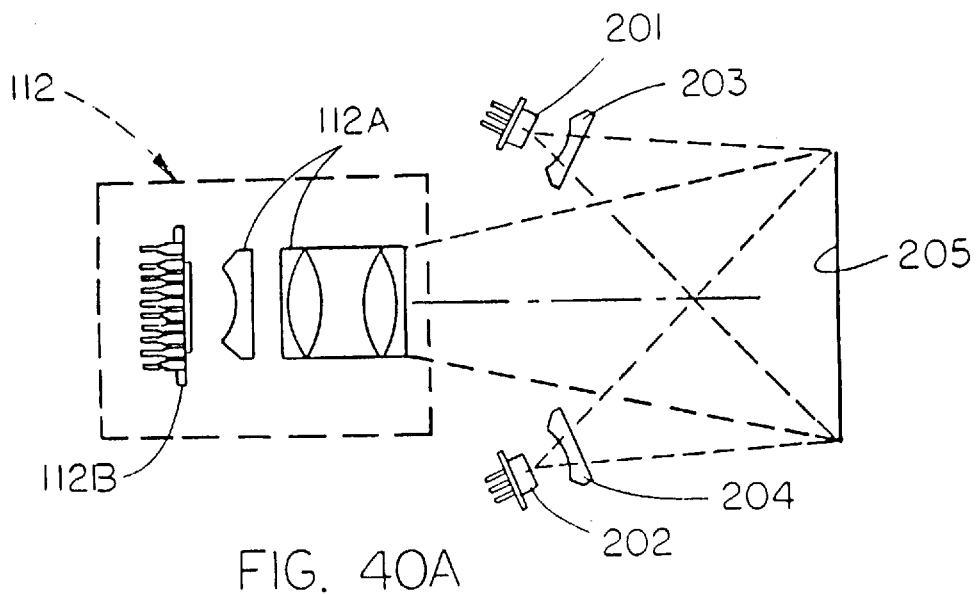
FIG. 40A shows an image sensor system utilizing a laser line type beam generator and an image focusing and sensing system for reading a reflective bar code image.
Figure 40B:
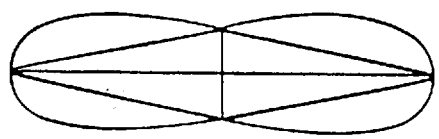
FIG. 40B shows the cross section of shape of the beams produced by the laser sources of FIG. 40A.

FIG. 40A and B shows the use of two line-type laser sources 201, 203 and 202, 204, each illuminating a total field of view 205 in common. The image sensor array and optics system 112, including optics 112A and image type photo-sensor array 112B, e.g., a CCD image sensor array, is located within the protrusion of module 48, 210, 410 or 600. FIG. 40A shows certain components of a non-scanning laser illuminated bar code scanner wherein two solid state laser sources 201, 203 and 202, 204 are placed off axis from the centerline of the CCD optical path. The sensing device does not require a folded light path. Since mirrors are not required, sensitivity is increased up to five percent per optical interface removed. The half power radiation line for the solid state laser sources (201, 203 and 202, 204), after passing through the dispersive optics (203, 204) normally have an elliptical cross-sectional shape. When the ellipse is altered by non-axisymmetric propagation it is fanned out into a distorted pattern which no longer fully resembles an ellipse (FIG. 40B). This may be corrected by using two laser sources with outputs which overlap a target bar code. Such a configuration acts to partially compensate for this pattern distortion. Further compensation may be achieved by utilizing a flash A/D converter and applying conventional digital high pass filtering techniques on the converted data to eliminate the residual effect on uneven illumination. The two laser sources are preferably high powered devices which are pulsed rather than used on a continuous basis. This provides intense illumination for a brief period of time. In such an embodiment the high voltages required by a Xenon flash are not necessary.

For the embodiment of FIG. 40A the mounting frame 87 (FIG. 5) may be omitted and the image reader circuitry associated with system 112 and laser diodes 201, 202 may be placed at side 84 of the main circuit board 82. The laser sources 201 and 202 may be accommodated by cutouts such as 132, FIG. 5, to minimize any required extra thickness E of the image reader/RF module containing the components 112 and 201–204 of FIGS. 40A and 40B.

Such coplanar light sources may also be used within a submodule, such as 600 (FIG. 36), for example at 601, 602 outside the margins 603, 604 of the collecting zone for the reflected light image.

The problem of synchronization does not arise when a laser line projector or laser line projectors, as in FIGS. 40A and B, simultaneously illuminate all elements of the bar code. The illuminated complete bar code is then imaged at all of the elements of the sensor array at the same time, so that the integration time can be selected solely from the standpoint of formation of an optimum output signal from the image array.

In FIGS. 40A and 40B, the output from each laser diode has a beam cross section which is of an elongated elliptical configuration. The semi-major axis of the beam cross section is oriented so that as it strikesthe respective cylindrical lens 203, 204, the elongated nature of the cross section is enhanced and it spreads out to a length preferably to cover a complete line of a bar code. If some collimation is provided in the plane of the semi-minor axis, then the elliptical cross section becomes an approximation of a line.

It will be understood that the line type solid state laser light sources 201, 203; 202, 204 of FIG. 40A are readily substituted for the LED arrays 291, (FIG. 31), or 491 FIGS. 34–35.

In an embodiment according to FIGS. 30–33, the light sources 201, 203; 202, 204 would be generally in the horizontal plane of the central reflected light ray 330 and at opposite sides of the reflected image receiving aperture 312A, FIG. 31, to provide a coplanar light source/image receiver arrangement.

In an embodiment according to FIGS. 34–35 if the solid state light sources 201, 203; 202, 204 of FIG. 40A were positioned above the horizontal plane of the central reflected ray 532, and were directed somewhat downwardly as represented by ray 533, FIG. 34, and if the angle of the sloping plane of rays 533 was not adjustable this non-coplanar arrangement would limit the depth of effective illumination since it is intended that the laser beams have a relatively narrow effective thickness dimension in comparison to that provided by the LED arrays 291 and 491. Thus a useful modification of FIGS. 34–37 for increased illumination depth would be to place solid state laser light sources 201, 203; 202, 204, FIG. 40A, coplanar with the horizontal plane of central reflected ray 532, FIG. 34.

Exemplary Range and Angle Measurement System

Figure 41:
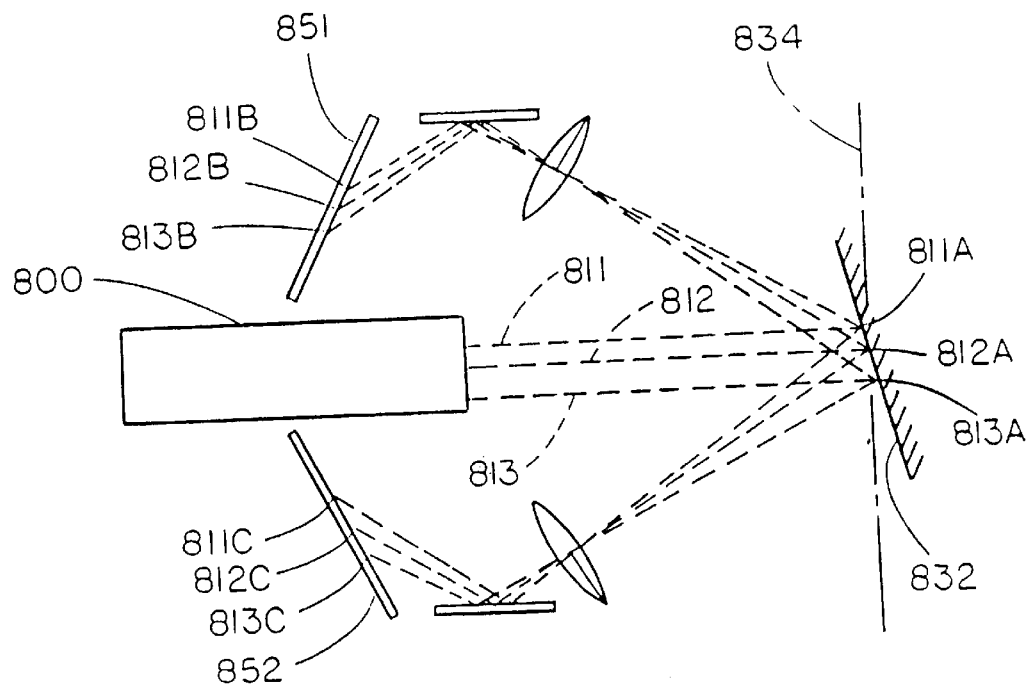
FIG. 41 is a diagrammatic illustration of a range and angle measurement system.
Figure 42:
FIG. 42 is a front elevational view of a conventional horizontally disposed bar code illustrating the impingement of a fan beam illuminating the bar code.

FIG. 41 illustrates a range and angle measurement system based on U.S. Pat. No. 4,373,804, first figure. In the present embodiment, laser light source means 800 may comprise laser diode means 801, FIG. 43, spreading optic means 802 and selector means 803, 804 for selectively providing a vertically oriented fan beam or a horizontally oriented fan beam. Further beam divider means 805–810, FIG. 43, of source means 800 may serve to generate three vertically oriented fan beams such as indicated at 811, 812, 813 or a single horizontally disposed fan beam such as indicated at 831, FIG. 42, at bar code label 832.

Where the three vertically oriented fan beams 811, 812 and 813 are directed toward a horizontally disposed bar code 833, FIG. 42, they may impinge on the bar code as vertical lines with axes 811A, 812A, 813A distributed over a substantial portion of the bar code length so as to adequately sample any skew of the label 832 relative to a normal axis 834, FIG. 41. Range measurements at 811A, 812A and 813A, for example, will differ as indicated by the displacements of point 811A and 813A from normal axis 834 in FIG. 41. Where beams 811, 812, 813 diverge so as to intersect bar code 833 at respective generally equal segments, and the range measurements to points 811A, 812A, 813A, FIG. 41, differ substantially, linear actuator 650, FIG. 29, could be set in succession to the three measured ranges for reading the respective bar code segments 833-1, 833-2, and 833-3, whereupon these three segments could be combined to obtain a complete bar code reading. Processing procedures for joining partial bar code readings are known in the art.

Figure 43:
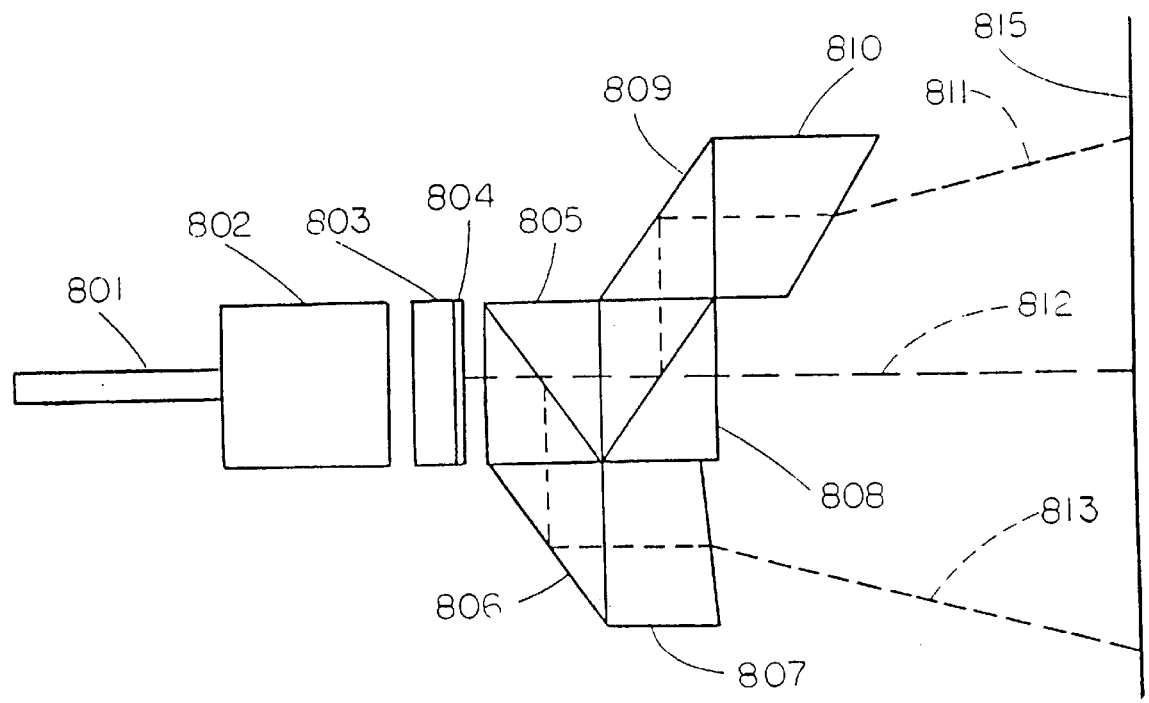
FIG. 43 is a diagrammatic illustration of a vertically and horizontally adjustable fan beam selector.

If it is desired to use crossed fan beams generated by a common laser diode source 801, FIG. 43, then an analyzer plate 804 may be provided for transmitting only a horizontally polarized fan beam 831, but blocking a vertically polarized fan beam. An LCD cell 803 when energized may rotate the polarization of the input crossed fan beam such that beam 831 is blocked and cross hair type fan beams 811, 812, 813 are produced.

In this case, LCD cell 803 is energized to provide the range and slope measurement mode of FIG. 41, and thereafter the LCD cell 803 is de-energized to permit a bar code reading.

With the LCD cell 803 de-energized, the vertically disposed fan beam is intercepted at 804, and the horizontally disposed fan beam with horizontally polarized light is transmitted by analyzer plate 804 to the prism or mirror type beam splitter 805–810 which spreads an incident fan beam disposed in the horizontal plane of FIG. 42 to cover a bar code such as indicated at 833. The constituent beams making up the overall beam 831 are indicated by marginal rays 831A, 831B, 831C, 831D and 831E, 831F in FIG. 44.

Two laser diodes at 801 with junction planes at right angles can supply the respective fan beams, using spreading optics such as 203, 204 FIG. 32A, B for component 802, FIG. 43.

The photodetector arrays such as 851, 852, FIG. 41, could be of the two dimensional matrix type, for example, so as to both sense the variable positions of the incident cross hair beams at 811B, 812B, 813B, 811C, 812C, 813C and to sense the spacial modulation of the reflected light beam 831 due to bar code 833. However, a linear CCD would most likely sense the bright spots at the code in most cases.

Exemplary Noise Filtering Means

In the current means of bar code scanning, the regional voltage on a series of photodetectors is referenced against a set of dummy detectors and the difference is compared against a threshold value. The output of the circuitry then becomes the sequence of rail to rail transitions coming from the comparator that is responsible for producing processor input. This type of circuit then feeds the pulse train to the processor which counts time intervals between transitions and provides the associated decimal sequence for a given pulse train. When such a system is used, the illumination of the code must be fairly even or transitions may be missed altogether, resulting in "bad reads." If the code is illuminated by using laser diodes, this type of reading and decoding will not provide optimum accuracy and reliability.

In an uneven illumination system, calculations must be made in order to eliminate the errors driven into the data stream by the reading and illumination means. The output from the CCD is a voltage which can take any value between zero and the full rail supply voltage. It is reasonable to then digitize this value directly using an analog-to-digital converter. Because throughput is a concern, a high speed or flash analog-to-digital converter could be used to convert data at the maximum output rate of the detector. The data from the analog-to-digital converter is then stored in RAM as a sequence of numbers representing the output voltage levels across the detector.

Having accomplished this much, a discussion of the types of data corruption is appropriate. The first form of intrinsic inaccuracy included in the data is the overall skewing of the data due to a significant variation in the mean data value from one side of the code to the other. This can come about due to code substrate conditions or uneven illumination.

Figure 45A:
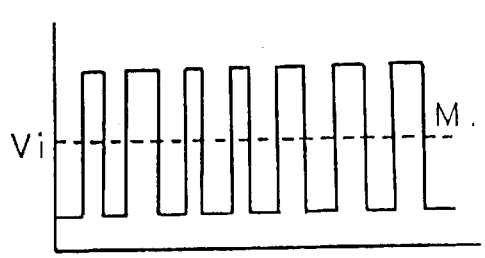
Figure 45B:
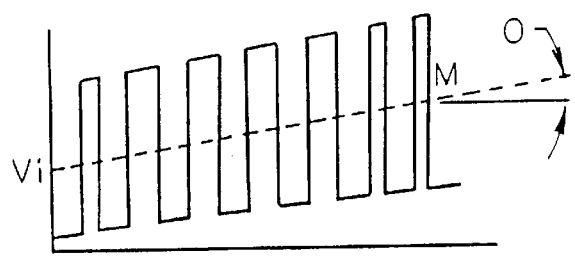

FIGS. 45A and 45B illustrate linear data skewing. Such skewing can be detected by determining the best fit line for the field of data. If that line has a non-zero slope then all of the data can be corrected by adding or subtracting a correction factor dependent on the tangent of the angle of slope over the sample number i. A partial correction for skewed illumination levels may be accomplished by storing away a representative specimen of the illumination levels across the reader by reading blank test patterns. The reference value could then be quickly subtracted from the scanned value. However, this does not cure signal variation due to substrate characteristics.

Figure 46A:
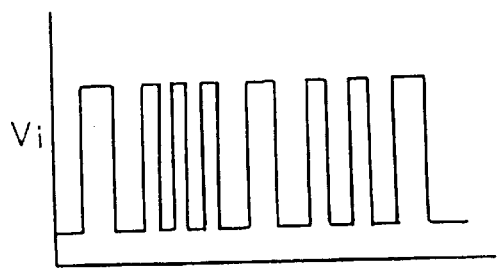
Figure 46B:
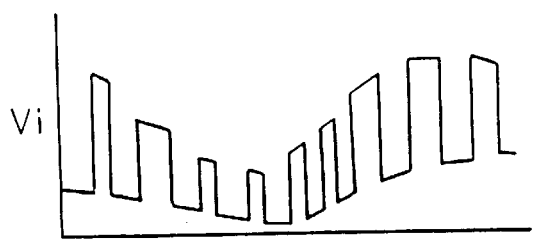

Data corruption of the second kind is periodic and may result almost directly from uneven illumination. This is more difficult to correct but will respond to a number of filtering techniques. This type of data corruption is illustrated in FIGS. 46A and 46B. Periodic illumination effects may be filtered. The characteristics of this form of variation are typically very low in frequency. A high pass filter on the data stream should be able to eliminate enough of the effect to extract data. Such filtration may be accomplished numerically.

If the coded data is assumed to be periodic in nature then it represents a function D(i). This function is represented by i discrete data points read from the sensitive section of the detector. This function D(i) can be approximated by the series:

$$D'(i) = A_n \cos(nwt) + B_n \sin(nwt).$$

This is the Fourier series approximating function D(i) which is assumed to be continuous over i. The important characteristic of the Fourier series is that the data is now represented in the frequency domain. Each term in the series adds more precision to the approximation. With i data points, the highest frequency that can be ascertained is $$\frac{(i-1)}{2}$$

Figure 47A:
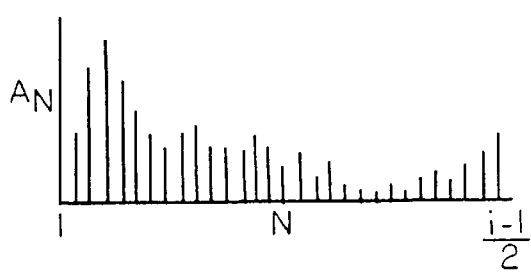
FIGS. 47A and 47B are graphical representations of the prophetic representative power spectra.
Figure 47B:
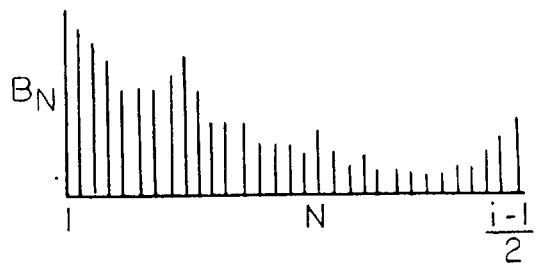

The coefficients $A_n$ and $B_n$ represent the power spectrum over the integral multiples of the base frequency. FIGS. 47A and 47B illustrate power spectrum for D'(i). FIGS. 47A and 47B are representative power spectra and do not show data for actual scans. $A_n$ or $B_n$ may not be represented in this series due to characteristics of the scanned data. Attenuation of the low frequency components of such power spectra can in effect filter out the low frequency noise present. The waveform may then be reconstructed and the filtered data points evaluated.

The third form of noise is random spurious noise due to dirty codes or dirty optics. The previous procedure can be repeated and the very high frequency coefficients can be attenuated to remove this form of data corruption. Noise of this nature is a high frequency phenomenon. Combining these operations may be utilized to significantly improve data quality. However, renormalization may be necessary to reconstruct a filtered wave form, and most filtering operations attenuate the signal. For an 8 bit system the following equation can renormalize a data stream.

$$Vi' = \frac{255 * Vi}{Dig(V_{imax} - V_{imin})}$$

The range of the data output by the filter is re-expanded to fill the full range allowed by the system. At this point the data can be fed to that section of the circuit that assigns a decimal string value.

Solid State Non-Scanning Laser Illumination System

The following provides a description of the use of solid state lasers in non-scanning bar code illumination systems of the present invention.

Preliminary information:

All glass optics are assumed to have indices of refraction of approximately 1.5.

Conventional laser diodes are known to exhibit astigmatic propagation characteristics dependent upon the die orientation and the radiated wave polarization state. As an example the Sony SLD102U/V diode has a full width at half maximum in the direction parallel to polarization of 13°. In the direction perpendicular to propagation the full width at half maximum is 28°.

Only cylindrical lenses with one curved face have been analyzed.

The Sony laser diode is chosen only as an example since its spectrum may be inappropriate where different optics are utilized.

Conventional 5.0% interface losses are not considered at this point but may be brought into the calculations to provide a more accurate design.

It is sufficient for this analysis to define the half brightness perimeter and reasonable dimensions would be 1.27 cm in the vertical and 5.08 cm in the horizontal.

Figure 48:
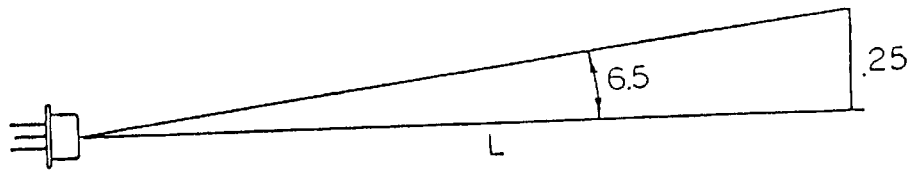
FIG. 48 is a diagrammatical illustration of an illumination source showing a means for computing the offset angle for such a source.

Procedure:

If the full width angle at half maximum is, as was mentioned 13°, then the half angle is 6.5° and the total optical length of the system can be found by the following construction (FIG. 48), wherein it may be determined:

$$L = 0.25/\text{Tan}(6.5), \text{ thus } L = 5.57 \text{ cm}.$$

Figure 49:
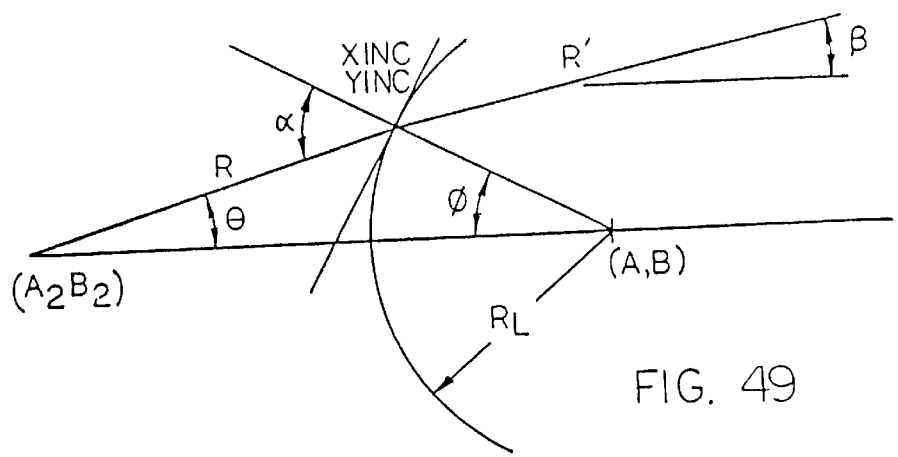
FIG. 49 is a graphical representation depicting a procedure for determining total optical length.

The following is a geometric analysis of the propagation of rays through discontinuous indices at non-normal intersections as is illustrated by FIG. 49. Theta ($\Theta$) is the ray deviation angle from the horizontal for a ray initiating at the radiant ($A_2$, $B_2$) and incident with the interface at (xinc, yinc). PHI ($\phi$) is the angle of the normal measured from the horizontal to the incident point (xinc, yinc). Gamma ($\gamma$) is the angle between the incident ray and the interface normal at the incident point. Beta ($\beta$) is the angle of propagation of the refracted ray as measured from the horizontal. $R_c$ is the radius of curvature for the interface. R is the incident ray. R' is the refracted ray.

Figure 50:
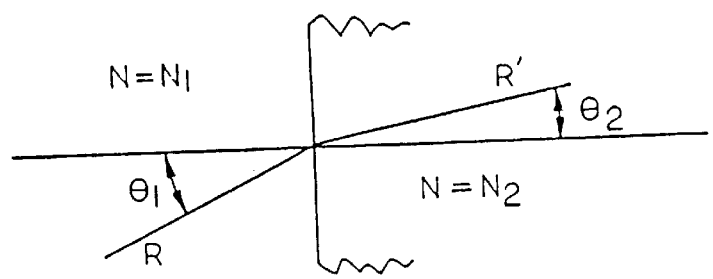
FIG. 50 is a graphical representation of a geometric analysis of the propagation of rays through discontinuous indices at non-normal intersects.

The degree of refraction depends upon the ratio of the indices and the incidence angle as shown in FIG. 50. For the example, wherein, $N_2 \sin\Theta_2 = N_1 \sin\Theta_1$.

Geometric analysis:

The equation for a circle with it's center at ($A_1$, $B_1$) is $(x-A_1)^1 (y-B_1)^2 = R^2$ where the equation of a line radiating from point ($A_2$, $B_2$) at an angle $\Theta$ measured from the horizontal is $y = \tan\Theta (x - a_2) + b_2$ using these two equations to solve for the x coordinate of the point of incidence:

$$R^2 = TAN^2\Theta x^2 + 2TAN\Theta B_2 x - 2TAN^2\Theta A_2 x - 2TAN\Theta A_2 B_2 + B_2^2 + TAN^2\Theta A_2^2 + x^2 - 2A_1 x + A_1^2$$

Restating the equation
$$0 = \tan^2\Theta \chi^2 + 2\tan\Theta B_2 X - 2\tan^2\Theta A_2 X - 2\tan\Theta A_2 B_2 + B_2^2 + \tan^2\Theta A_2^2 - R + X^2 - 2A1 \times A1^2$$

Solving for x using the standard solution to the quadratic equation:

$$x_1 = \frac{-B + \sqrt{B^2 - 4AC}}{2A} \quad x_2 = \frac{-B - \sqrt{B^2 - 4AC}}{2A}$$

where $$A = \tan^2\Theta + 1$$

$$B = 2\tan\Theta B_2 - 2\tan^2\Theta A_2 - 2A_1$$

$$C = -2\tan\Theta A_2 B_2 + B_2^2 + \tan^2\Theta A_2^2 - R^2 + A_1^2$$

yields $X_1$ and $X_2$ where if both solutions are real, one is inappropriate. Selecting the correct point allows the analysis to proceed. Knowing the correct intercept X (Xinc), Y can be easily equated using the previous line equation. Calculating the line from the center of curvature ($A_1$, $B_1$) to the intercept (Xinc, Yinc) generates the local arc normal and allows the calculation of Pm1 ($\Theta$). The angle Gamma ($\gamma$) corresponds to the angle $\Theta$, in the index of refraction example. Gamma is easily ascertained by geometric analysis and is the sum of theta and phi. Knowing the ratio of the indices then, the angle beta can be calculated quickly by performing the following calculation:

$$\beta = \sin^{-1}\left(\frac{N_1}{N_2} \sin\gamma\right)$$

Calculating intersection points of refracted rays from differing radian points can define characteristics of the lens and can actually verify the Huygenian equations. Although this discussion is not concerned with light other than monochromatic, chromatic aberration can be analyzed by providing frequency dependent indices of refraction. Light exiting the plane surface of a cylindrical lens is again affected by the equations accompanying the refractive interface example. Having completed this analysis of refraction at discontinuous interfaces in the general sense, we can now return to the specific example where the total optical length was calculated to be 2.194". The smaller vertical propagation angle allows the system to take advantage of the much greater horizontal propagation angle. In fact, with no optics at all, the horizontal dimension at this range would be 1.094 inches. The required lens is obviously dispersive and thus concave. The appropriate lens here is a plano concave cylindrical lens.

Figure 51:
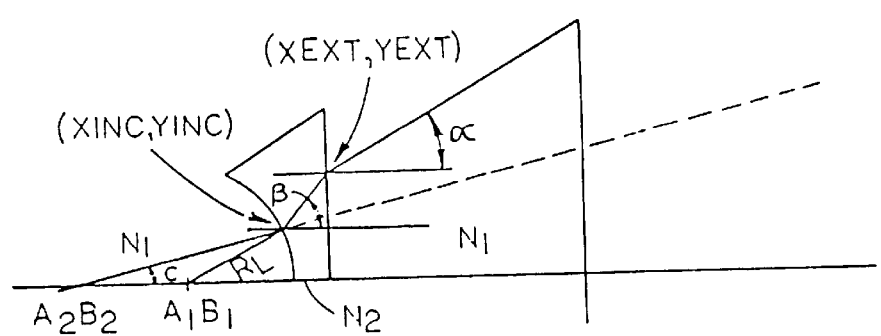
FIG. 51 is a graphical representation of how the degree of refraction depends upon the ratio of indices and the incidence angle.

FIG. 51 is provided to illustrate the following analysis regarding horizontal propagation. The analysis is done for a half lens and mirrored for the full analysis. FIG. 51 is not to scale.

Assumptions:
1. The lens thickness at its thinnest point is 0.254 cm.
2. The radiant is at (0,0) and the middle of the code is at (2.194,0).
3. It is a given that the direction of propagation of the "half power angle ray" is 14° above the horizontal.
4. The goal of the calculations is to orient the "half power angle ray" through the optics so that it passes through (2.194,1).
5. The direction of propagation within the lens is Beta ($\beta$) and the direction of propagation outside of the lens is alpha ($\alpha$).

These equations then apply:

$$\tan(\alpha) \times (2.194 - XEXT) + YEXT = 1.0$$

$$\sin(\beta) N_1 = \sin(\alpha) N_2 \text{ where } N_1 = 1.5 N_2 = 1$$

so $$\alpha = \sin^{-1}(1.5 \times \sin(\beta))$$

XEXT=A1+$R_c$+0.1(T=0.1)
YEXT=TAN $\beta$(XEXT−XINC)+YINC
and the calculation of XINC and YINC has already been shown.

Results:

There are two interrelated variables in these equations which force the solution to be interactive. These two variables are the radius of curvature and the center of curvature. The center of curvature is considered as a distance from the radiant. Thus, the following table of specific solutions:

| Center of Curvature | Radius of Curvature |
|---|---|
| .05 | .0859 |
| .10 | .1504 |
| .20 | .2427 |
| .225 | .2606 |
| .25 | .2771 |
| .30 | .3059 |
| .31 | .3111 |
| .312 | .3121 |
| .001 | .0020 |

When a 4th degree curve fit routine is applied using $R_c$ as the independent variable the following polynomial is generated (−13.0309) $R_c^4$+12.84487 $R_c^3$−5.872017 $R_c^2$+ 1.977166 $R_c$ 9.901152E-05 This solution curve is valid within the range 0. to .312.

Signal Processing

Figure 52:
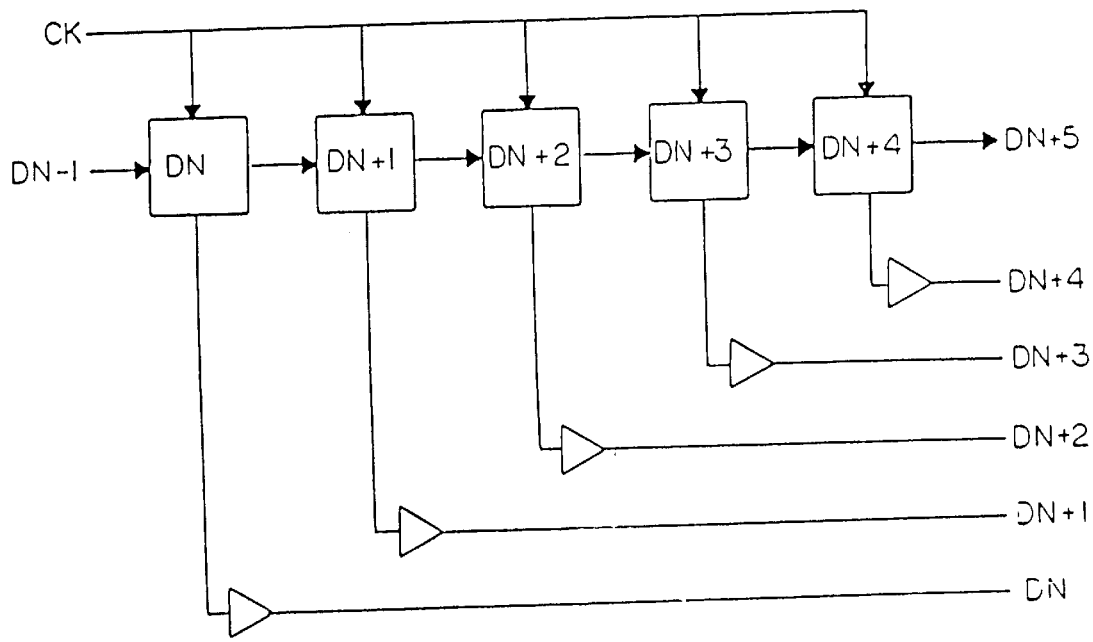
FIG. 52 is a graphical representation depicting horizontal propagation.
Figure 53:
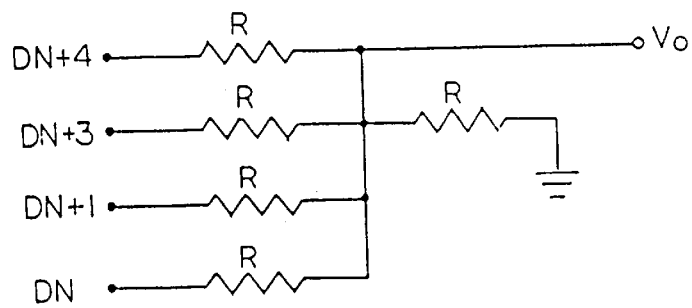
FIG. 53 is a flow diagram of the output stages of a CCD device.
Figure 54:
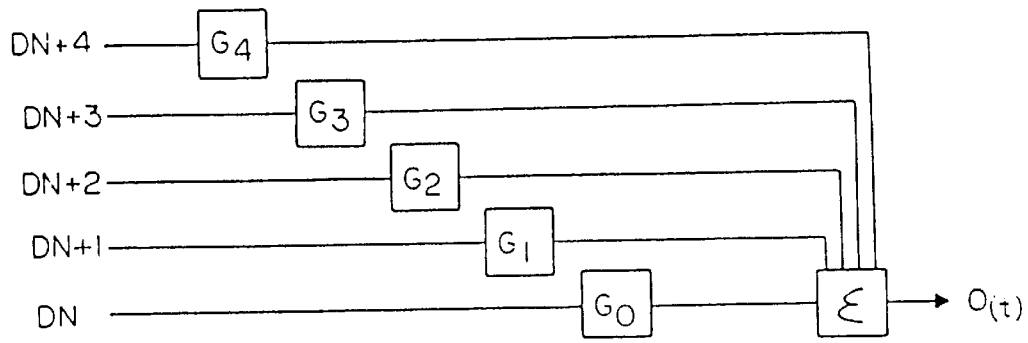
FIG. 54 is an electrical schematic of a circuit for averaging a group of voltages.

FIGS. 52, 53, and 54 illustrate a means for processing signals within a bar code reader of the present invention such that bar codes may be read which are partially obscured or difficult to read for other reasons.

First, it is assumed that these techniques are of primary interest in bar code readers of the CCD type where data are progressively read from the scanning circuitry in a serial fashion.

Second, it is further assumed that the CCD chip may be preferentially modified to accommodate these techniques by the addition of data stream taps other than the single output line found on most common CCD devices. Failing this, it is assumed that suitable circuitry may be interposed into the data stream to approximate this addition of data stream taps.

Third, both digital and analog versions of these techniques may be implemented. Analog or digital approaches may be preferentially appropriate for specific procedures.

The output stages of a CCD device actually approximate an analog shift register. In such a register analog signals are shifted along a sequence of storage locations in synchrony with the clock signals applied to the device at the appropriate clock signal. Data from each storage location is then moved into the next sequential location (FIG. 52).

In thresholding systems it may be desirable to define the variations of a particular data value stored at a location in the data stream from the mean value of the surrounding locations. The average of a group of voltages may be achieved in the following fashion. Data values are taken from FIG. 52 and fed into the circuit of FIG. 53.

In the case of FIG. 47, Vo is:

$$(D_{n+4} + D_{n+3} + D_{n+2} + D_{n+1} + D_n)/5$$

In general in such a network the output voltage will be given by the following equation:

$$Vo = \sum_{i = \frac{1}{N+1}}^{N} V_i$$

where N is the number of data points averaged at the junction. To recover the average value then the value Vo must be fed through an amplifier whose gain is fixed at (N+1)/N. In this example then, the value $D_{N+2}$ is compared to the threshold value defined by the local average of its surrounding data. The output of such a comparison will have value in the decoding algorithm. Thus, each sample of data is compared to the local mean and the threshold is allowed to fluctuate across the sequence of data. This partially compensates for uneven illumination. A realization of this circuit can be accomplished either in an analog or digital fashion and may be approximated in software.

It may be convenient in the decoding algorithm to enhance the edges that occur at variations in the data stream. In effect this is an attempt to accomplish the following equation in circuitry.

$$g(t) = Af(t) + B\left(\frac{d(f(t))}{dt}\right) + C$$

A, B and C are constants which may be defined by the circuit designer. In the event that the decode algorithm relies completely upon the derivative (edges), then the constants A and C may be zero. The local derivative about some data point Dn may be found by the following approach using a discrete approach:

$$\frac{df(t)}{dt} = B\left(\frac{D_n - D_{n-1}}{2} + \frac{D_{n+1} + D_n}{2}\right)$$

This averages the slope ahead of the data point and behind the data point to produce a mean slope in the region of Dn. The constant B includes gain factors and spacing values for a particular CCD device. The units of the final value will be millivolts per millimeter as an example. Some decode algorithms may rely heavily on the use of such edge detection means. As shown in the equation, this derivative may be summed back into the data stream to sharpen edges for subsequent analyses. It may in some cases be useful to modify the equation such that the absolute value of the derivative is used as shown:

$$g(t) = Af(t) + B - ABS\left(\frac{dF(t)}{dt}\right) + c$$

Again, this image enhancement technique can be implemented in either a digital or analog fashion and can be approximated in software.

Multiple taps in the data stream may be used to accomplish a digital filter. Such a filter can be utilized to reduce low frequency variations in a signal due to uneven illumination. A digital filter could also be defined which would enhance the high frequency variations in the data stream which arise from the code. Such a filter implementation is shown in FIG. 54. FIG. 52 uses the outputs from FIG. 52 as inputs.

$$O(t) = \sum_{i=o}^{N} G_i D_{N+i}$$

The values Gi are gain values. There will be an associated gain for each data tap and the output is then the summation. This is again an approach which may be implemented in either analog or digital circuitry and may be simulated in software.

Filtering, Exposure Control, and Depth of Field

Ambient light poses a real problem in the CCD reader art. Resort must often be made to shading or shrouding the sensor so that only the illumination means light striking the code registers on the sensor. The problem with ambient light is that on certain code substrates the specular reflection from certain regions of the code can cause a kind of "blooming" effect and swamp the code. This affect is enhanced if the reader has a very narrow dynamic range, if the reader integration time is fixed, or if the deciphering algorithm is of the simple thresholding type. The prior art does not disclose the use of a polarizer in an optical string to selectively reject light having a polarization vector which is characteristic of specular reflections. Nor does the prior art use of filters to pass light with spectral characteristics which match the output of the illumination means. Performance of such readers can be enhanced by the addition of polarizer filters ahead of the optical string. The preferred orientation of this filter would be such that it preferentially passed light with vertical polarization vectors.

A true hemispherical radiator would function as shown in FIG. 49A. The surface is the reflecting or radiating surface. The line is a constant intensity line. Usually the constant intensity line represents something like a 3dB line.

Figure 55A:
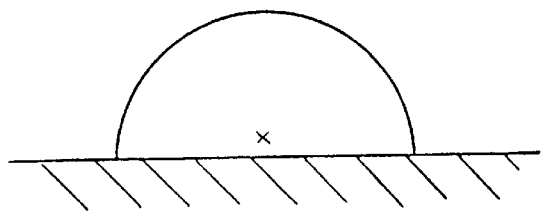
FIGS. 55A and 55B are graphical representations of the effect of a polarization filter placed ahead of the optical string on a true hemispherical radiator (FIG. 55A) and a non-perfect hemispherical radiator.
Figure 55B:
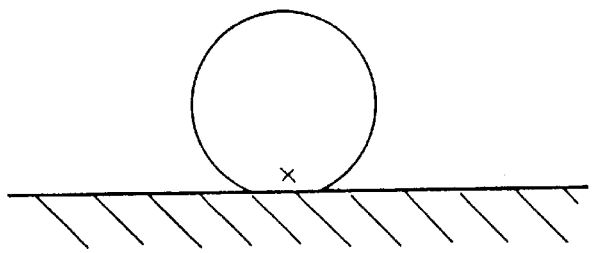

In FIG. 55A point x is a perfect hemispherical radiator and the constant intensity lines describe hemispheres. In FIG. 55B point x here is a more typical radiator with a non-perfect hemispherical radiation pattern. Diffuse reflectors approximate this curve.

Figure 56A:
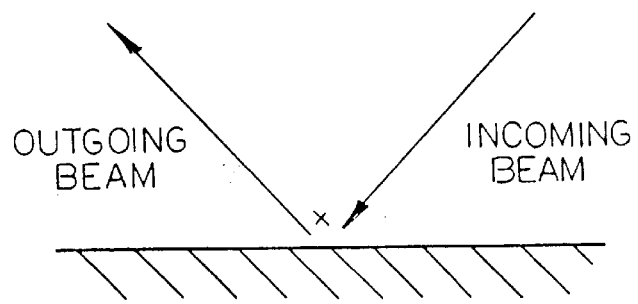
FIGS. 56A and 56B are graphical representations of both a perfect spectral reflector apparatus (FIG. 56A) and a real spectral apparatus (FIG. 56B)

In FIG. 56A a perfect specular reflector apparatus, such as a mirror, is illustrated which only re-orientates the incoming beam by the following transformation matrix:

$$\begin{vmatrix} -1 & 0 \\ 0 & 1 \end{vmatrix}$$

Figure 56B:
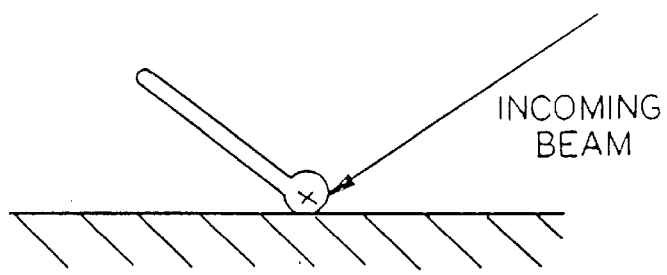
Figure 57A:
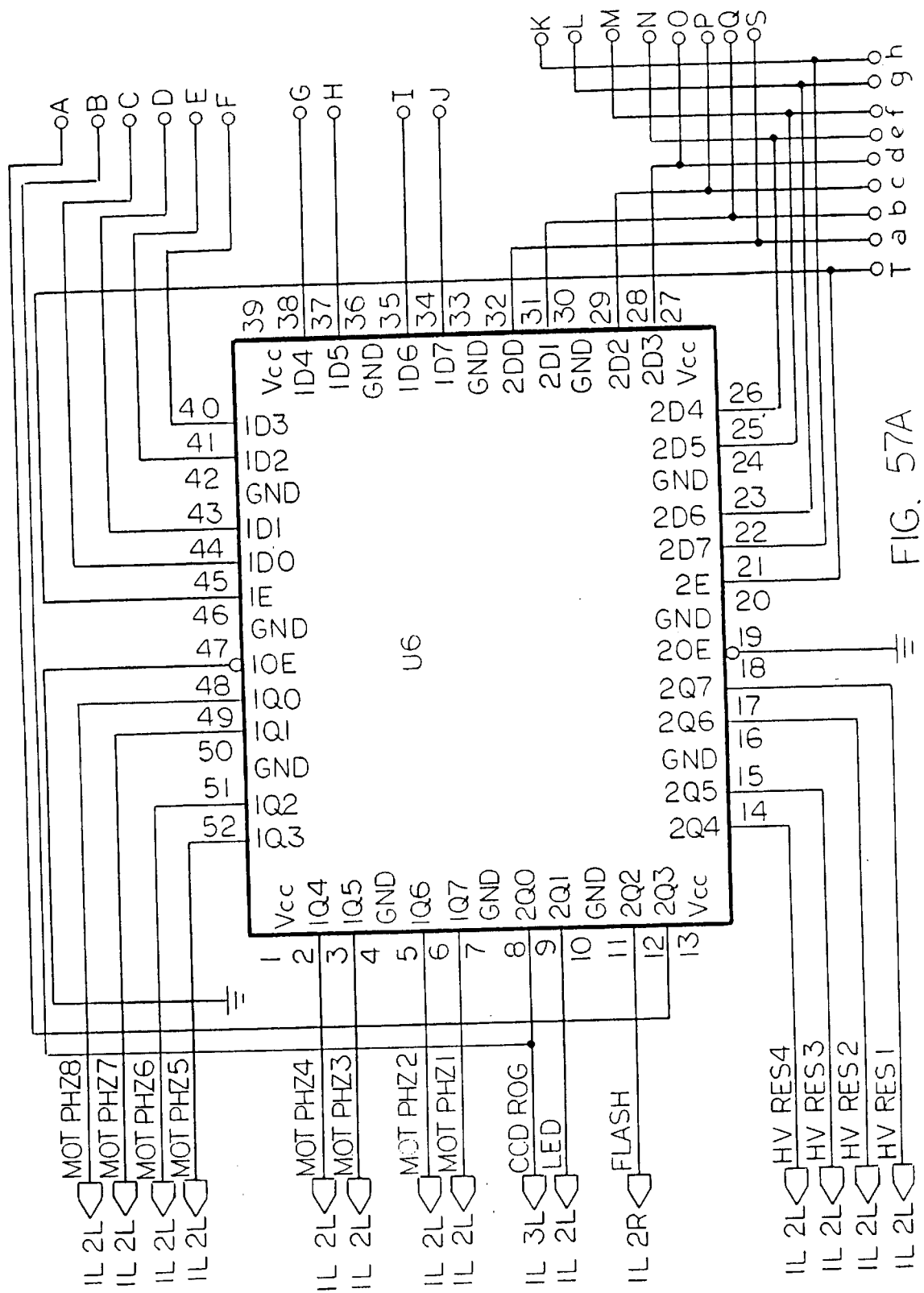
FIGS. 57A through 57E are an electrical schematic of an exemplary embodiment of a long range CCD reader module.
Figure 57B:
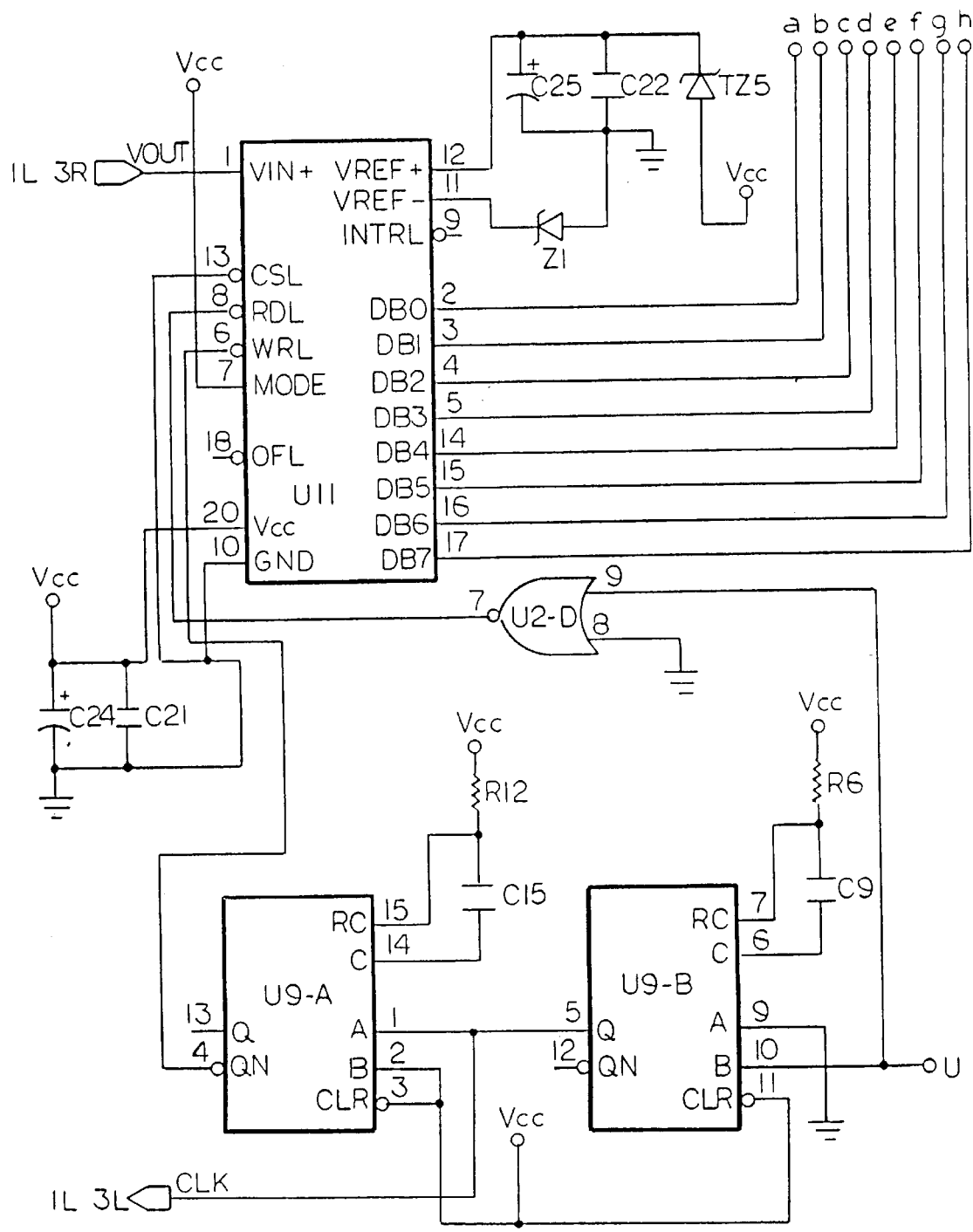
Figure 57C:
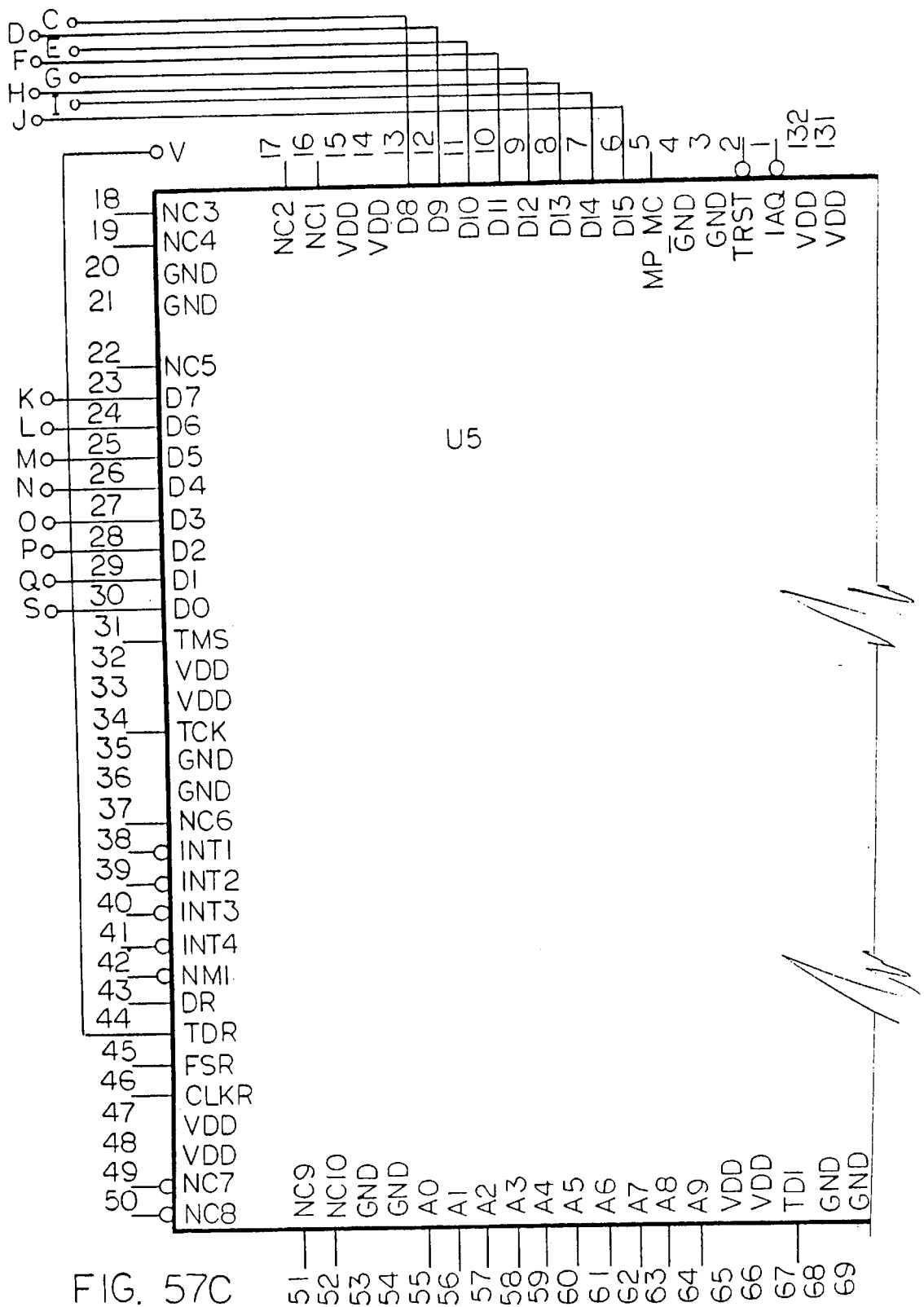
Figure 57D:
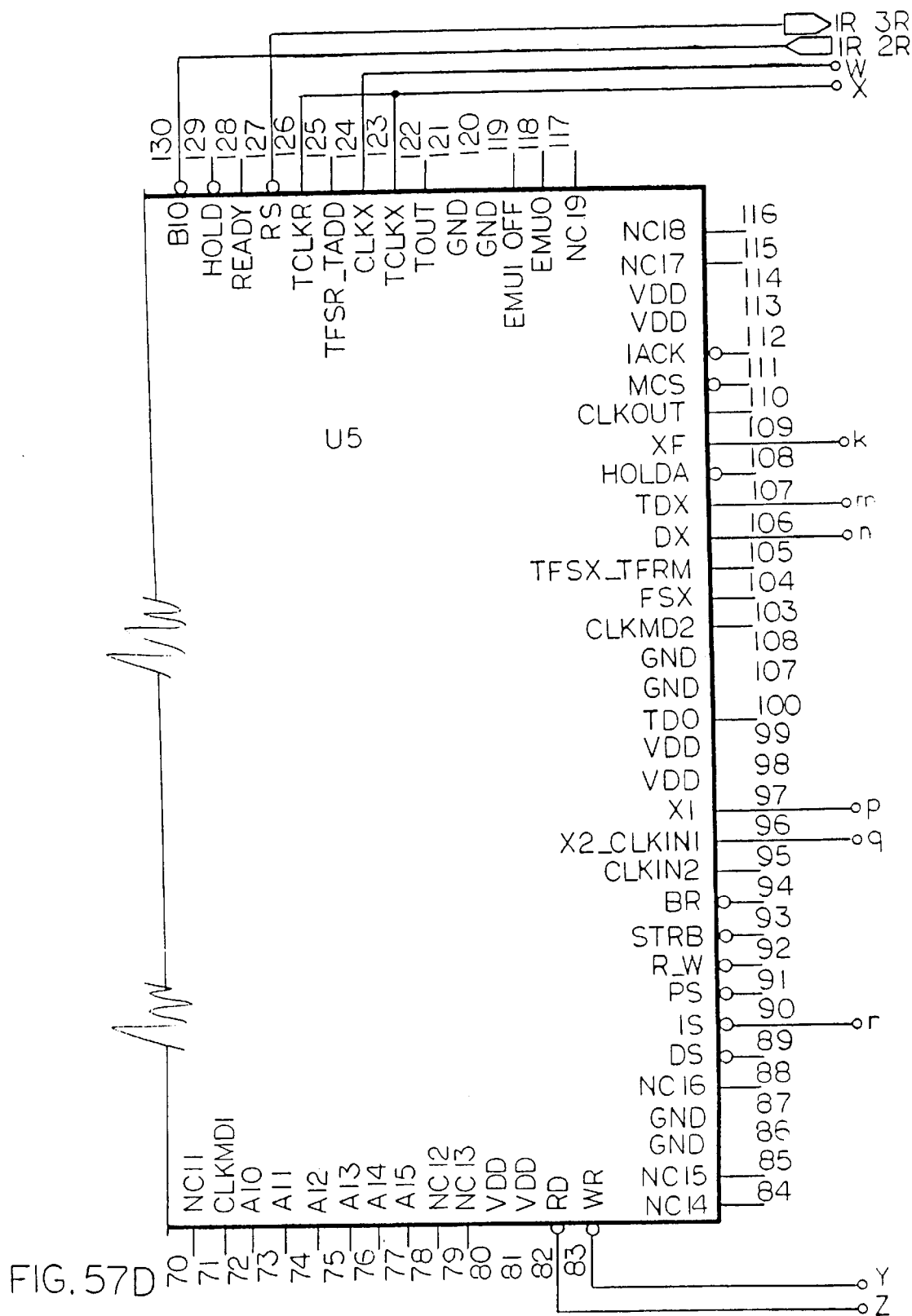
Figure 57E:
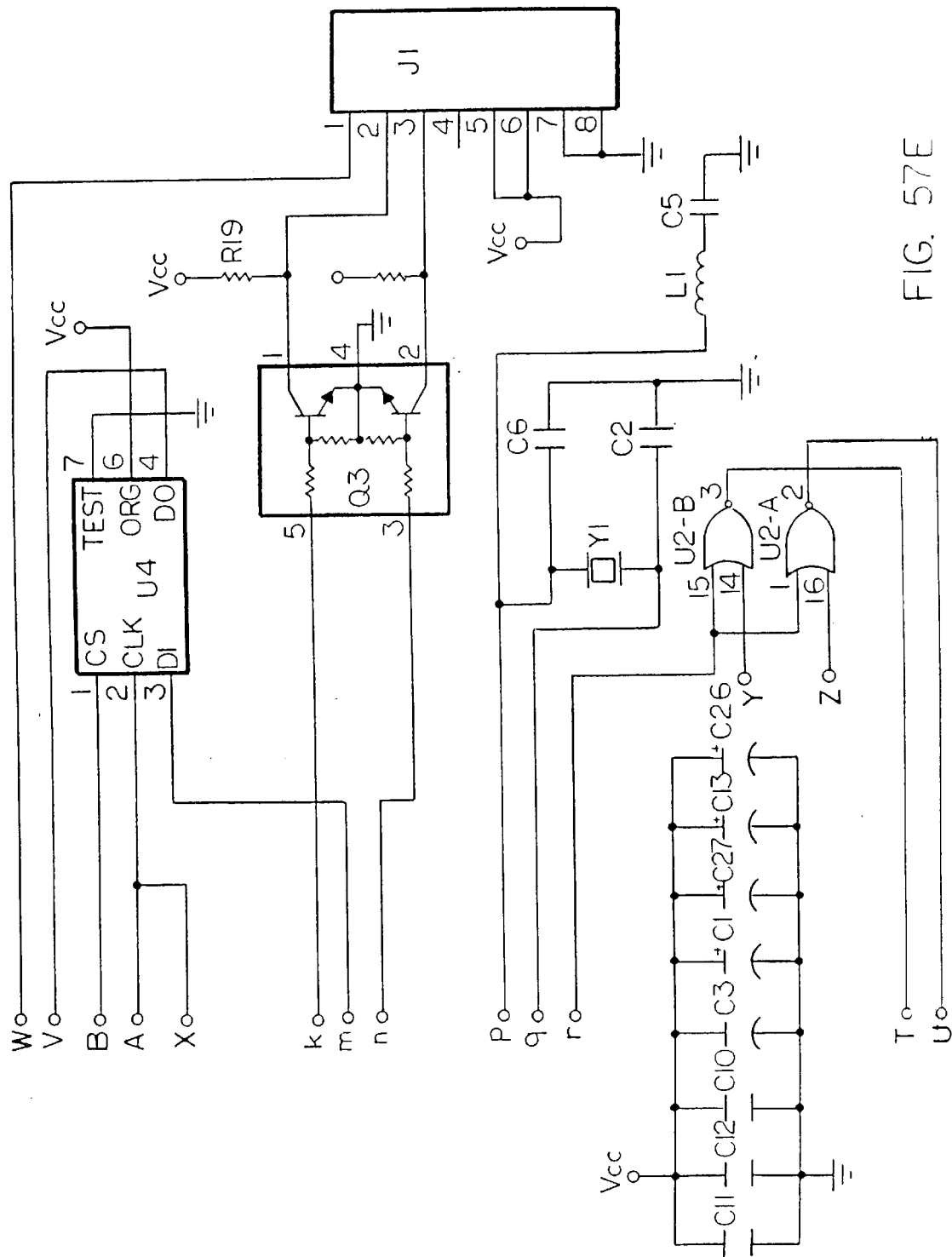
Figure 58:
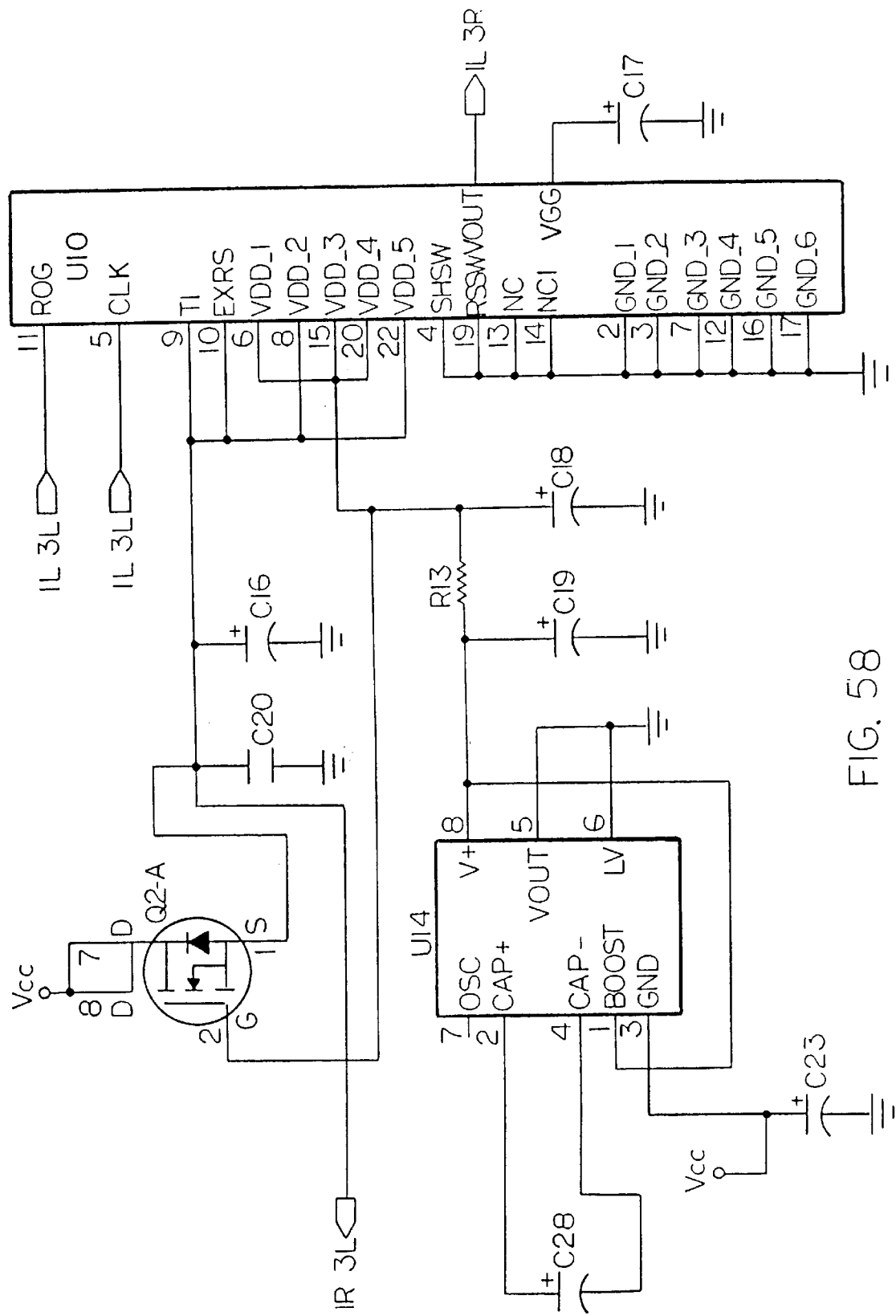
FIGS. 58 through 61 are miscellaneous electrical schematics utilized in the operation of the exemplary embodiment of a long range CCD module.
Figure 59:
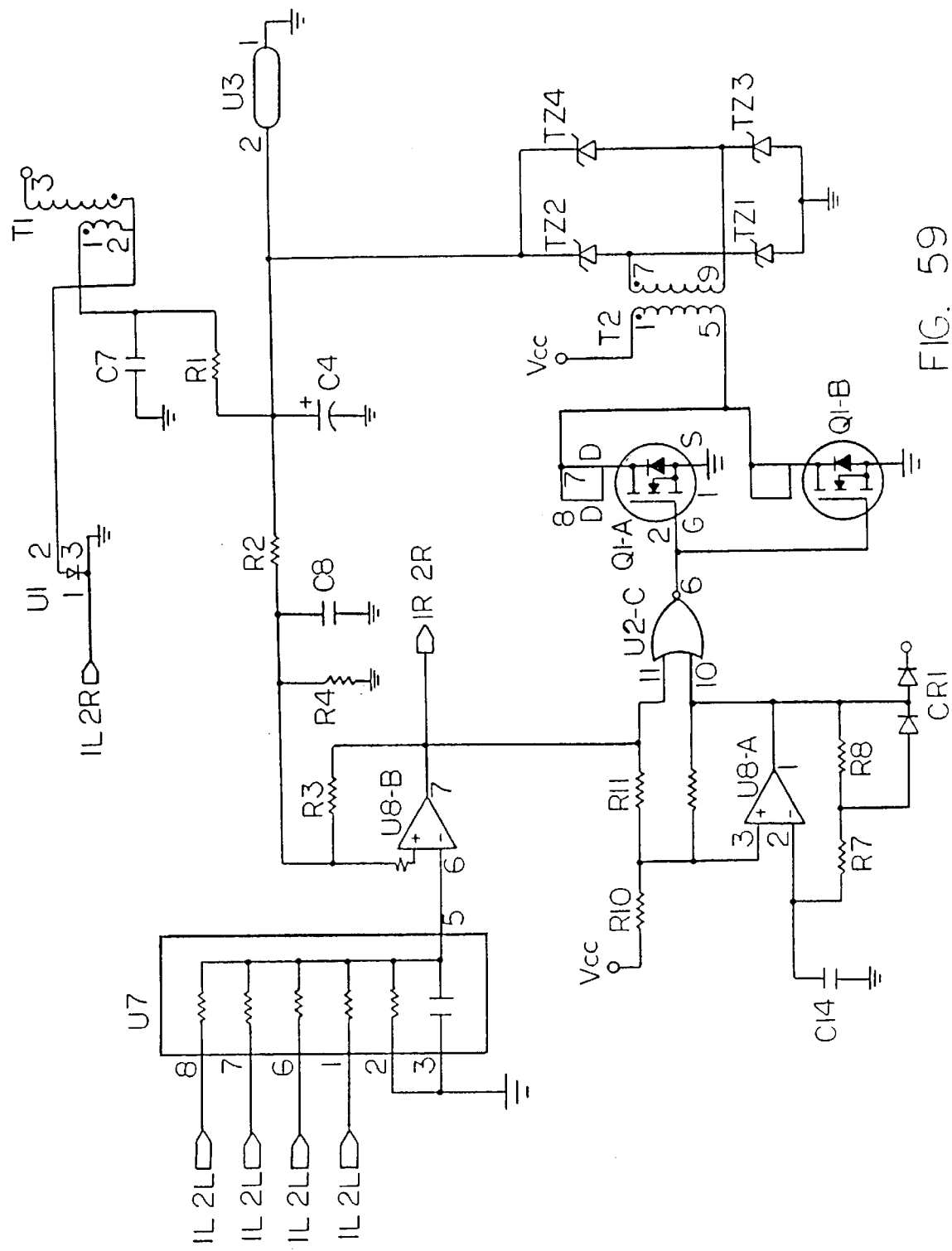
Figure 60:
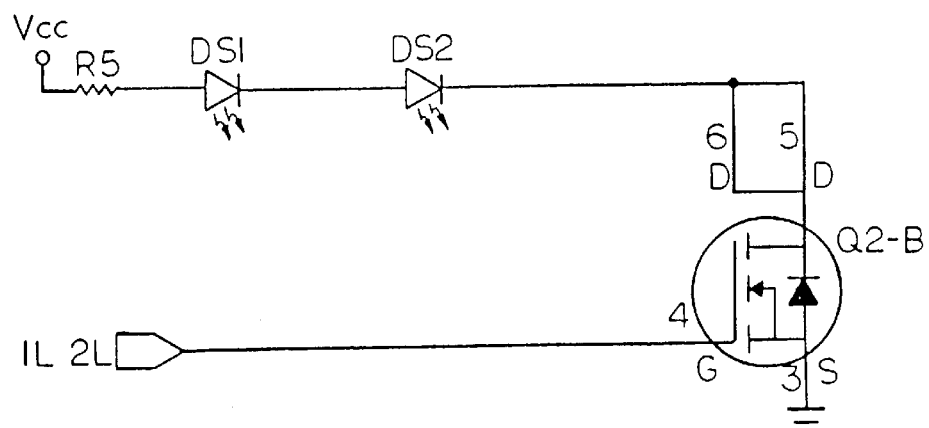
Figure 61:
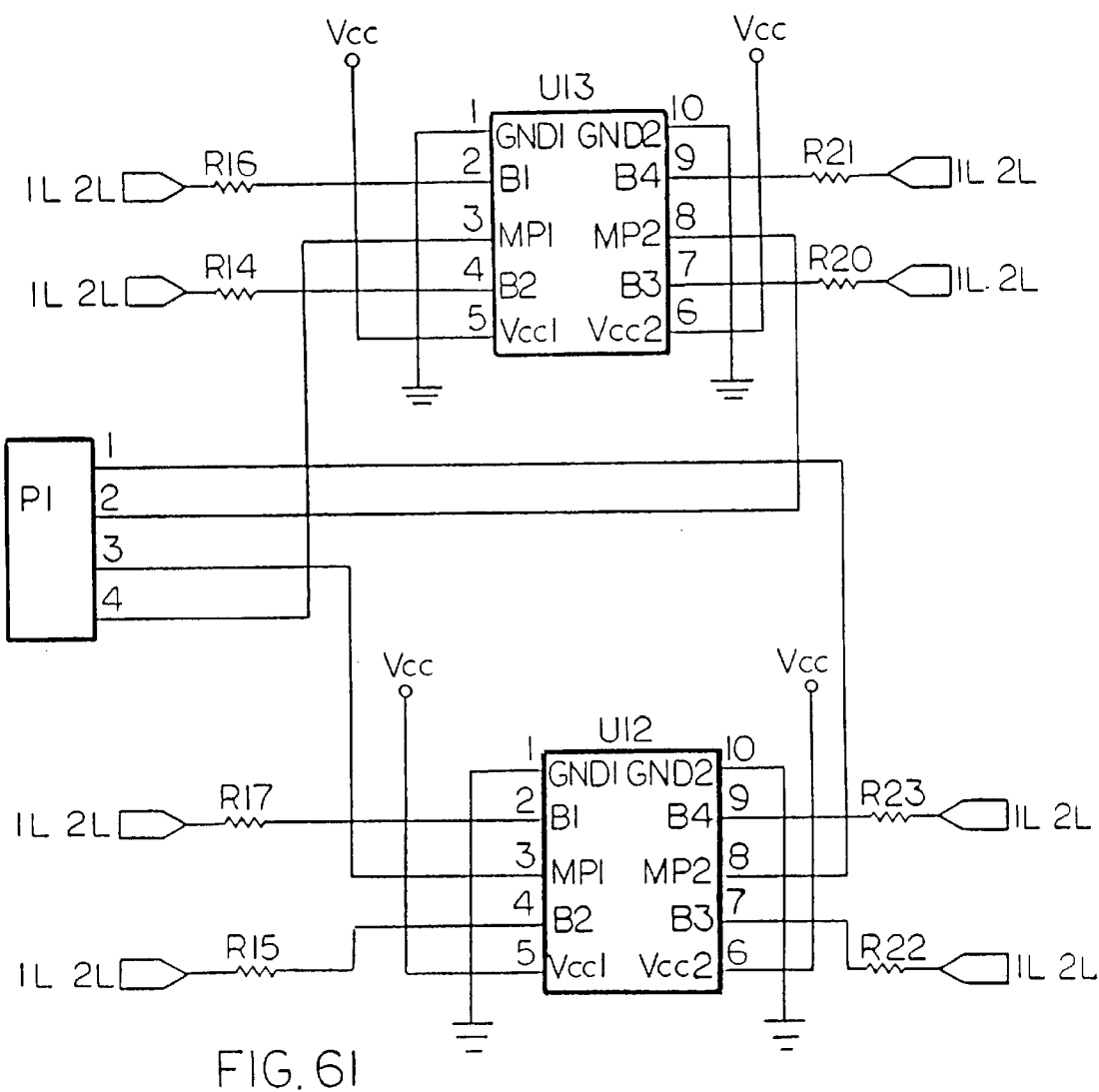
Figure 62A:
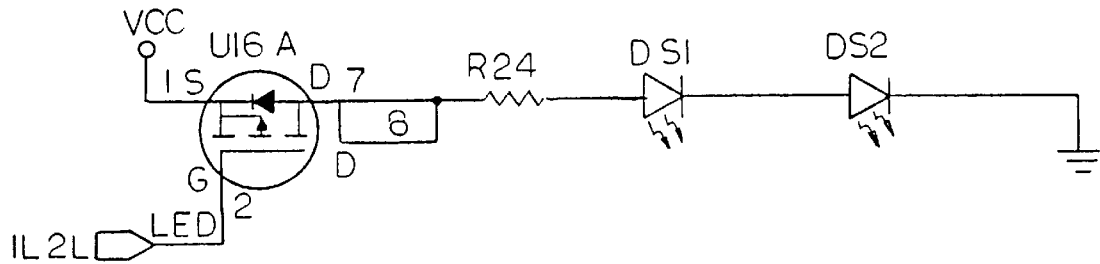
FIGS. 62A and 62B are electrical schematics of an alternative exemplary embodiment of a long range CCD module.
Figure 62B:
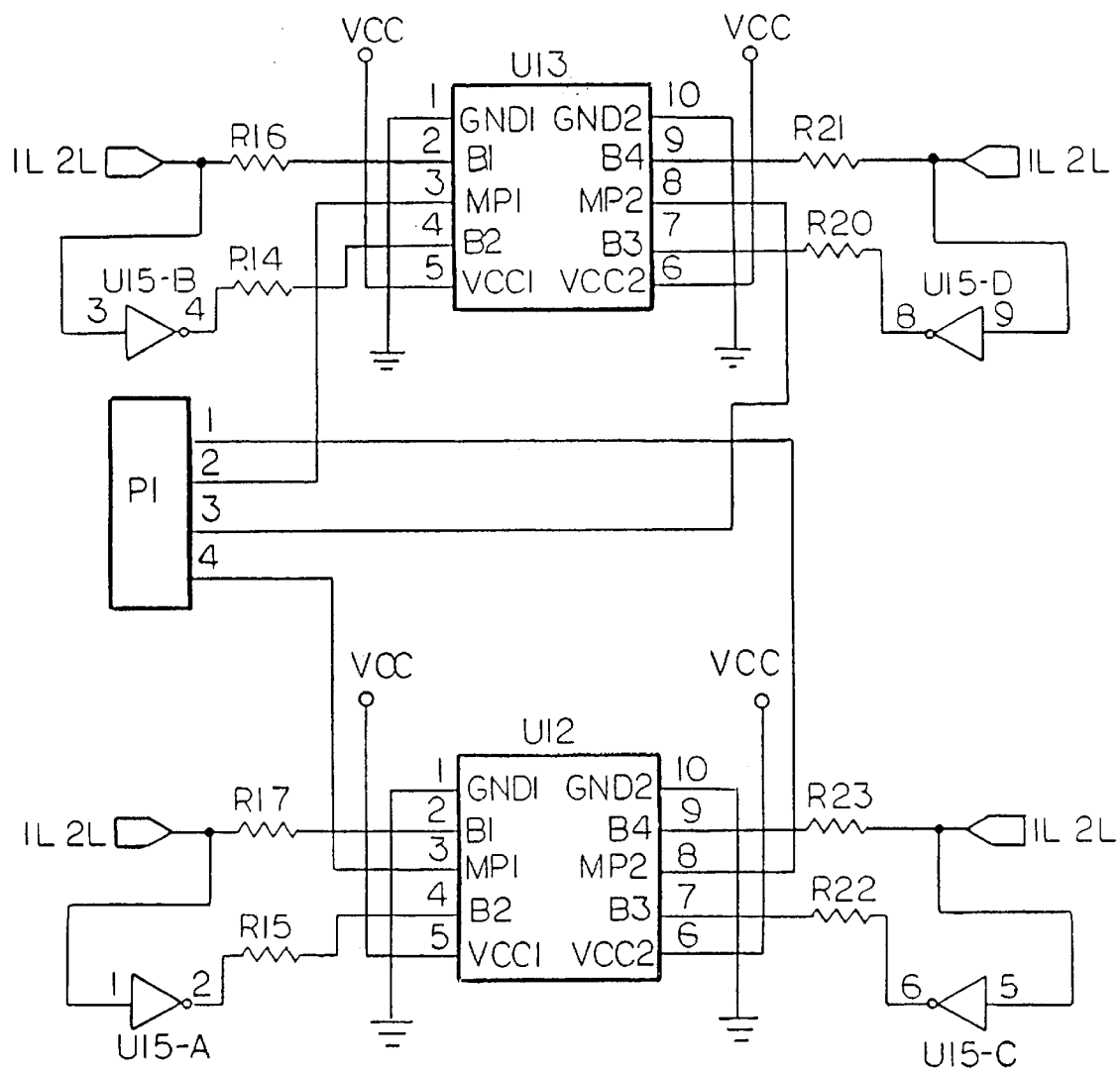

In FIG. 56B point x represents a real specular reflector apparatus. In this Figure the outgoing beam is widened and there is always a residual diffuse reflection approximating the pattern shown in FIG. 56B.

The orientation of the outgoing beam corresponds to that of a beam transformed by the matrix associated with FIG. 56A. Specular reflections retain their polarization vector orientation. Diffuse reflections do not. Specular reflections cause blooming at the sensor due to their anomalous intensities. The present invention utilizes a polarization means with an analyzer plot to excise the specular components from the image of the code.

CCD readers can, for the sake of illustration, be considered, as cameras that take a single line picture. All of the features of more conventional cameras have their homologs in the CCD device. Exposure control can be critical. Typically, the exposure is either controlled by adjusting the integration time or by controlling the illumination means. One additional means of controlling exposure amounts to controlling the contrast control voltage on an LCD device and sequencing the driving voltages in such a way that the LCD device becomes an electrically controlled variable neutral density filter. As yet, this approach has not been incorporated into either camera or CCD readers. The actual LCD device amounts (electrically) to one single large area "pixel" that limits the intensity of light entering the optical string ahead of the CCD device. In fact, this could also be accomplished by using a mash of smaller pixels that could all be driven synchronously.

In this type of exposure control the contrast control voltage could be varied by the logic in the system to optimize exposure dynamically where it may be inconvenient to adjust the integration interval or to adjust the illumination means intensity. The applicability of this type of exposure control becomes greater as the sensitivity of the CCD devices available increases. A recently developed sensor that is under consideration as a scanning device has 30 times the sensitivity of previous devices. With this type of sensitivity to work with, exposure control becomes an important issue.

Figure 44:
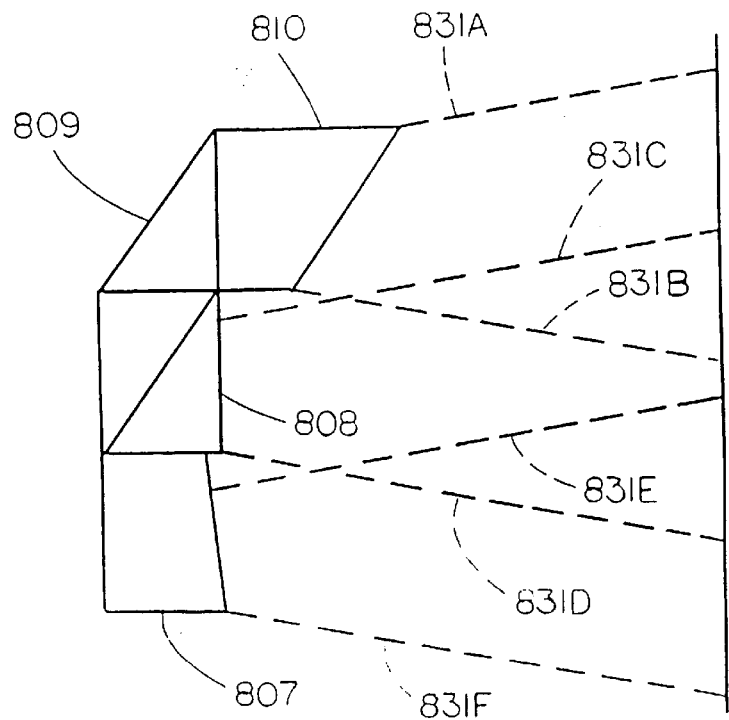
FIG. 44 is a diagrammatic illustration of the vertically and horizontally adjustable fan beam selector of FIG. 43 providing a fan beam output.

Depth of field is always an issue in CCD bar code readers. It is desirable to be able to scan codes as far as possible on either side of the principal focus plane for the reader. This accommodates codes which may be skewed with respect to the principal focus plane. It also accommodates codes which may be on curved or uneven substrates. As previous discussed, an LCD device may be utilized as a variable neutral density filter (FIGS. 43 and 44). In the same fashion, an LCD device can be used as a variable aperture. If the LCD is constructed with concentric rings that can be driven to an extreme contrast ratio, synchronously with exposure, selectively, the aperture of the lens in the optical string can be directly controlled. Light not traversing the desired aperture is effectively blocked by rings outside of that aperture. Since depth of field is a function of aperture, the use of an LCD for aperture control can control exposure and depth of field. This avoids the use of an electromechanical system to operate an iris/diaphragm to provide the same function. The spacing of the concentric rings can be defined to provide very tight control of aperture. In camera applications, this means could also enhance shutter function. At lower contrast ratios, concentric rings within the desired aperture can provide a neutral density filter function that may be desirable under some situations. It must be repeated here that the means that is typically employed in driving LCD devices makes it necessary that the driving voltages be synchronized with the exposure sequence. In most applications, the smallest possible "electrical aperture" would be used to provide the greatest depth of field possible.

Exemplary Control Means for a Long Range CCD Reader

FIGS. 57A–61 are self-explanatory diagrammatically illustrations of electronic control means for controlling the operation of a long range CCD reader module.

It will be apparent that features of the various embodiments described or incorporated herein may be combined, and that various of the features may be utilized independently of others, and that many further modifications and variations may be effected without departing from the scope of the teachings and concepts of the present disclosure.

We claim:

1. A method of reading optical information over a substantial range of distances, comprising:
   (a) reflecting a fan light beam from an object having an image to be focused;
   (b) optically directing the image of said reflected light beam such that said light beam impinges on the surface of a photosensitive array;
   (c) determining both (1) the variation of a particular data value against the mean value of the surrounding data values of the output of said photosensitive array so as to allow reading of poorly illuminated and partially obscured optical information sets, and (2) the rate of intensity change with respect to time from the output of said photosensitive array; and
   (d) focusing said image according to the output of said photosensitive array.

2. The method of reading optical information over a substantial range of distances as recited in claim 1, further comprising producing a digital information set corresponding to the image of said optical information focused on said photosensitive array.

3. The method of reading optical information over a substantial range of distances as recited in claims 1 or 2, further comprising sequentially repeating said steps until said rate of intensity change with respect to time is maximized.

4. The method of reading optical information over a substantial range of distances as recited in claim 3, further comprising verifying the validity of said information set.

5. The method of reading optical information over a substantial range of distances as recited in claim 4, wherein said information set corresponding to the image of said object focused on said receiving means is verified via an RF link.

6. An apparatus for reading optical information over a substantial range of distances, comprising:
   (a) means for reflecting a fan light beam from an object having an image to be focused;
   (b) means for optically directing the image of said reflected light beam such that said light beam impinges on the surface of a photosensitive array;
   (c) means for processing the output of said photosensitive array such that the rate of intensity change with respect to time is determined;
   (d) means for determining the variation of a particular data value stored at a location in the output of said photosensitive array from the mean value of the surrounding locations so as to allow poorly illuminated and partially obscured optical information sets to be read; and
   (d) means for focusing said image according to the output of said photosensitive array.

7. The apparatus for reading optical information over a substantial range of distances as recited in claim 6, further comprising means for producing a digital information set corresponding to the image of said optical information focused on said photosensitive array.

8. A focusing system for a bar code reader, comprising:
   (a) means for emitting a light beam, such that said light beam is reflected from a surface of a bar code;
   (b) receiving means for receiving said reflected light beam;
   (c) means for converting said reflected light beam into an electrical signal defining a signal level with respect to time;
   (d) focusing means for adjusting the focus of the image to change the image reflected onto the receiving means;
   (e) means for measuring a rate of image intensity with respect to time based on the electrical signal produced;
   (f) means for determining the variation of a particular data value stored at a location in the output of said photosensitive array from the mean value of the surrounding locations so as to allow poorly illuminated and partially obscured optical information sets to be read; and
   (g) computer means for sequentially,
       (1) using said measuring means to produce a first electrical signal corresponding to a first position of said focusing means,
       (2) adjusting said focusing means to produce a subsequent electrical signal corresponding to said subsequent position of said focusing means,
       (3) comparing said first electrical signal to said subsequent electrical signal,
       (4) determining which of said first and subsequent signals represents a faster rate of intensity change with respect to time, and
       (5) adjusting said focusing means toward the position which produced said faster rate of intensity change with respect to time.

9. The focusing system of claim 8, further comprising means for producing a digital information set corresponding to the image of said bar code focused on said receiving means.

10. The focusing system of claim 9, further comprising verification means for determining the validity of the information set produced by said system.

11. The focusing system of claim 8, further comprising means for repeating said sequential operations of said computer means until said rate of intensity change with respect to time is maximized.

12. The focusing system of claim 8, wherein the light emitting means includes a means for emitting a laser beam.

13. The focusing system of claim 12, further including means for diffusing the laser beam emitted.

14. The focusing system of claim 13, wherein the diffusing means further includes means for transforming said diffused beam into a shape having a substantially rectangular cross-section.

15. The focusing system of claim 14, wherein the diffusing means is cylindrical in shape.

16. The focusing system of claim 8, wherein the receiving means is a photosensitive array of light sensitive regions.

17. The focusing system of claim 8, wherein the receiving means is a charge coupled device with an inter-element spacing in the range of seven to fourteen microns.

18. The focusing system of claim 17, wherein the charge coupled device has a clock frequency for moving data therefrom in the range of one to ten megabytes.

19. The focusing system of claim 17, wherein the charge coupled device is operably connected to a circuit board interfaced with a microprocessor.

20. The focusing system of claim 8, wherein the focusing means includes a drive controlled by said computer means.

21. The focusing system of claim 20, wherein the drive is an electrical stepping motor.

22. The focusing system of claim 20, wherein the focusing means further includes a cam operably attached to said drive.

23. The focusing system of claim 22, wherein the focusing means further includes a cam follower operably connected to the cam for moving in response to movement of the cam.

24. The focusing system of claim 23, wherein the focusing means further includes a lens; and means for permitting said lens to move between a first position and a second position.

25. The focusing system of claim 24, wherein the cam follower is operably connected to the lens.

26. The focusing system of claim 25, wherein the focusing means further includes means for restricting the movement of said lens to linear translation.

27. The focusing system of claim 26, wherein the movement restricting means includes a pair of rods and means for slidably attaching said lens to said rods.

28. The focusing system of claim 27, wherein the attaching means includes sleeves disposed around said rods, and a yoke interconnecting said sleeve, and being rigidly attached to said lens.

29. The focusing system of claim 18, wherein the focusing means further includes prism means for receiving said beam and directing said beam through said lens; and means for mounting said prism means, whereby said prism means moves with said lens.

30. The focusing system of claim 19, whereby the focusing means further includes mirror means for receiving the beam passing through said lens and redirecting said beam onto said receiving means.

31. The focusing system of claim 10, wherein said focusing system is enclosed in a modular housing.

32. The focusing system of claim 11, wherein said modular housing is attached to a hand held data terminal.

33. The focusing system of claim 12, further including means for permitting said modular housing to be interchangeable with other modular components.

* * * * *